(12) United States Patent
Lee

(10) Patent No.: US 12,416,991 B2
(45) Date of Patent: Sep. 16, 2025

(54) OBJECT SENSING DEVICE AND SENSING METHOD COMPOSED OF DIFFERENT CDA AREAS

(71) Applicant: Sung Ho Lee, Seogwipo-si (KR)

(72) Inventor: Sung Ho Lee, Seogwipo-si (KR)

(*) Notice: Subject to any disclaimer, the term of this patent is extended or adjusted under 35 U.S.C. 154(b) by 0 days.

(21) Appl. No.: 18/379,662

(22) Filed: Oct. 13, 2023

(65) Prior Publication Data
US 2025/0123701 A1    Apr. 17, 2025

(51) Int. Cl.
G06F 3/041    (2006.01)
G06F 3/044    (2006.01)

(52) U.S. Cl.
CPC ........ *G06F 3/04162* (2019.05); *G06F 3/0441* (2019.05); *G06F 3/0442* (2019.05); *G06F 2203/04106* (2013.01)

(58) Field of Classification Search
CPC .. G06F 3/04162; G06F 3/0441; G06F 3/0442; G06F 2203/04106; G06F 3/0443
See application file for complete search history.

(56) References Cited

U.S. PATENT DOCUMENTS

| | | |
|---|---|---|
| 2011/0074446 A1 | 3/2011 | Chou et al. |
| 2011/0279409 A1 | 11/2011 | Salaverry et al. |
| 2015/0084888 A1 | 3/2015 | Han et al. |
| 2015/0185940 A1 | 7/2015 | Han et al. |
| 2015/0185941 A1 | 7/2015 | Lee et al. |
| 2015/0317012 A1 | 11/2015 | Solven et al. |
| 2016/0188034 A1 | 6/2016 | Bayramoglu |
| 2018/0095567 A1 | 4/2018 | Jae-Won et al. |
| 2019/0018541 A1 | 1/2019 | Han et al. |
| 2020/0019279 A1* | 1/2020 | Xie ............... G06F 3/0441 |
| 2021/0096684 A1 | 4/2021 | Cheng |
| 2022/0308730 A1* | 9/2022 | Lee ............... G06F 3/044 |

FOREIGN PATENT DOCUMENTS

KR    1020160070597 A    7/2016

\* cited by examiner

*Primary Examiner* — Robin J Mishler
(74) *Attorney, Agent, or Firm* — Nicholas Park

(57) ABSTRACT

The present invention presents a method for quickly transmitting and receiving pen Tx and Rx signals by reconfiguring a CDA column consisting of a large number of CDAs into a CDA column consisting of one CDA, and reducing the time of the process by detecting objects by quick search with the same CDA column, thereby preventing loss of signals that may occur in Tx/Rx with the pen and reducing current consumption.

21 Claims, 22 Drawing Sheets

| Vd1 | Vd2 | Cd | Cprs | Ccm | Vp2-Vp1 |
|---|---|---|---|---|---|
| 0 | 5 | 13 | 8 | 1 | 2.955 |
| 0 | 5 | 14 | 10 | 2 | 2.692 |
| 0 | 5 | 15 | 12 | 1 | 2.679 |
| 0 | 5 | 16 | 14 | 2 | 2.500 |
| 0 | 5 | 17 | 8 | 1 | 3.269 |
| 0 | 5 | 18 | 10 | 2 | 3.000 |
| 0 | 5 | 19 | 12 | 1 | 2.969 |
| 0 | 5 | 20 | 14 | 2 | 2.778 |
| 0 | 5 | 21 | 8 | 1 | 3.500 |
| 0 | 5 | 22 | 10 | 2 | 3.235 |
| 0 | 5 | 23 | 12 | 1 | 3.194 |
| 0 | 5 | 24 | 14 | 2 | 3.000 |
| 0 | 5 | 25 | 8 | 1 | 3.676 |
| 0 | 5 | 26 | 10 | 2 | 3.421 |
| 0 | 5 | 27 | 12 | 1 | 3.375 |
| 0 | 5 | 28 | 14 | 2 | 3.182 |
| 0 | 5 | 29 | 8 | 1 | 3.816 |
| 0 | 5 | 30 | 10 | 2 | 3.571 |
| 0 | 5 | 31 | 12 | 1 | 3.523 |
| 0 | 5 | 32 | 14 | 2 | 3.333 |
| 0 | 5 | 33 | 8 | 1 | 3.929 |
| 0 | 5 | 34 | 10 | 2 | 3.696 |
| | | | | min | 2.500 |
| | | | | max | 3.929 |
| | | | | Δ= | 1.429 |

| | | | | | | | | Dual Driving | | | Single Driving | | |
|---|---|---|---|---|---|---|---|---|---|---|---|---|---|
| Vd1,Vcin1 | Vcin2 | Vd2 | Cd | Cin_sd | Ccm | Cobj | Vp2-Vp1 | Vobj | ΔV | Vp2-Vp1 | Vobj | ΔV |
| 0 | 5 | 5 | 13 | 8 | 1 | 0.2 | 4.773 | 4.730 | 0.043 | 2.955 | 2.928 | 0.027 |
| 0 | 5 | 5 | 14 | 10 | 2 | 0.2 | 4.615 | 4.580 | 0.035 | 2.692 | 2.672 | 0.021 |
| 0 | 5 | 5 | 15 | 12 | 1 | 0.2 | 4.821 | 4.787 | 0.034 | 2.679 | 2.660 | 0.019 |
| 0 | 5 | 5 | 16 | 14 | 2 | 0.2 | 4.688 | 4.658 | 0.029 | 2.500 | 2.484 | 0.016 |
| 0 | 5 | 5 | 17 | 8 | 1 | 0.2 | 4.808 | 4.771 | 0.037 | 3.269 | 3.244 | 0.025 |
| 0 | 5 | 5 | 18 | 10 | 2 | 0.2 | 4.667 | 4.636 | 0.031 | 3.000 | 2.980 | 0.020 |
| 0 | 5 | 5 | 19 | 12 | 1 | 0.2 | 4.844 | 4.814 | 0.030 | 2.969 | 2.950 | 0.018 |
| 0 | 5 | 5 | 20 | 14 | 2 | 0.2 | 4.722 | 4.696 | 0.026 | 2.778 | 2.762 | 0.015 |
| 0 | 5 | 5 | 21 | 8 | 1 | 0.2 | 4.833 | 4.801 | 0.032 | 3.500 | 3.477 | 0.023 |
| 0 | 5 | 5 | 22 | 10 | 2 | 0.2 | 4.706 | 4.678 | 0.028 | 3.235 | 3.216 | 0.019 |
| 0 | 5 | 5 | 23 | 12 | 1 | 0.2 | 4.861 | 4.834 | 0.027 | 3.194 | 3.177 | 0.018 |
| 0 | 5 | 5 | 24 | 14 | 2 | 0.2 | 4.750 | 4.726 | 0.024 | 3.000 | 2.985 | 0.015 |
| 0 | 5 | 5 | 25 | 8 | 1 | 0.2 | 4.853 | 4.825 | 0.028 | 3.676 | 3.655 | 0.021 |
| 0 | 5 | 5 | 26 | 10 | 2 | 0.2 | 4.737 | 4.712 | 0.025 | 3.421 | 3.403 | 0.018 |
| 0 | 5 | 5 | 27 | 12 | 1 | 0.2 | 4.875 | 4.851 | 0.024 | 3.375 | 3.358 | 0.017 |
| 0 | 5 | 5 | 28 | 14 | 2 | 0.2 | 4.773 | 4.751 | 0.022 | 3.182 | 3.167 | 0.014 |
| 0 | 5 | 5 | 29 | 8 | 1 | 0.2 | 4.868 | 4.843 | 0.025 | 3.816 | 3.796 | 0.020 |
| 0 | 5 | 5 | 30 | 10 | 2 | 0.2 | 4.762 | 4.739 | 0.023 | 3.571 | 3.555 | 0.017 |
| 0 | 5 | 5 | 31 | 12 | 1 | 0.2 | 4.886 | 4.864 | 0.022 | 3.523 | 3.507 | 0.016 |
| 0 | 5 | 5 | 32 | 14 | 2 | 0.2 | 4.792 | 4.772 | 0.020 | 3.333 | 3.320 | 0.014 |
| 0 | 5 | 5 | 33 | 8 | 1 | 0.2 | 4.881 | 4.858 | 0.023 | 3.929 | 3.910 | 0.019 |
| 0 | 5 | 5 | 34 | 10 | 2 | 0.2 | 4.783 | 4.762 | 0.021 | 3.696 | 3.680 | 0.016 |
| | | | | | | min | 4.615 | 4.580 | 0.020 | 2.500 | 2.484 | 0.014 |
| | | | | | | max | 4.886 | 4.864 | 0.043 | 3.929 | 3.910 | 0.027 |
| | | | | | | Δ= | 0.271 | 0.284 | 0.023 | 1.429 | 1.425 | 0.013 |

FIG. 17
| DAC_r1c1 | DAC_r1c2 | DAC_r1c3 | DAC_r1c4 |
| --- | --- | --- | --- |
| DAC_r2c1 | DAC_r2c2 | DAC_r2c3 | DAC_r2c4 |
| DAC_r3c1 | DAC_r3c2 | DAC_r3c3 | DAC_r3c4 |
FIG. 18A
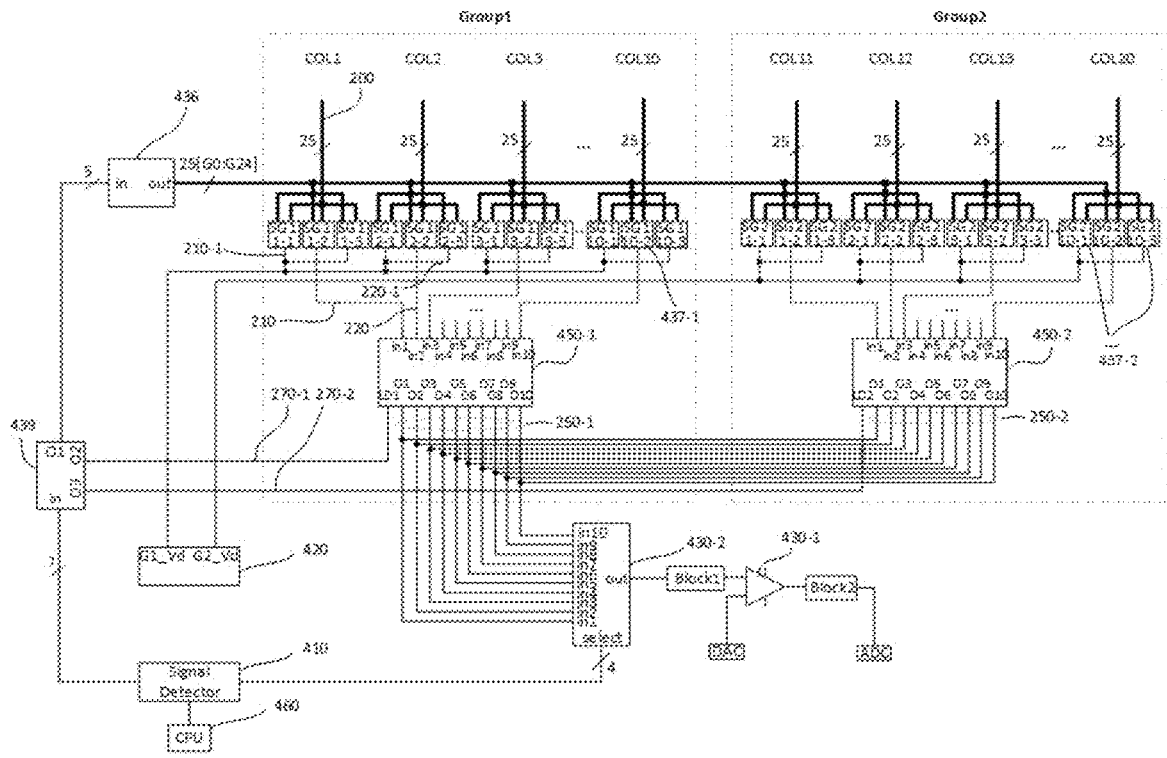
FIG. 18B
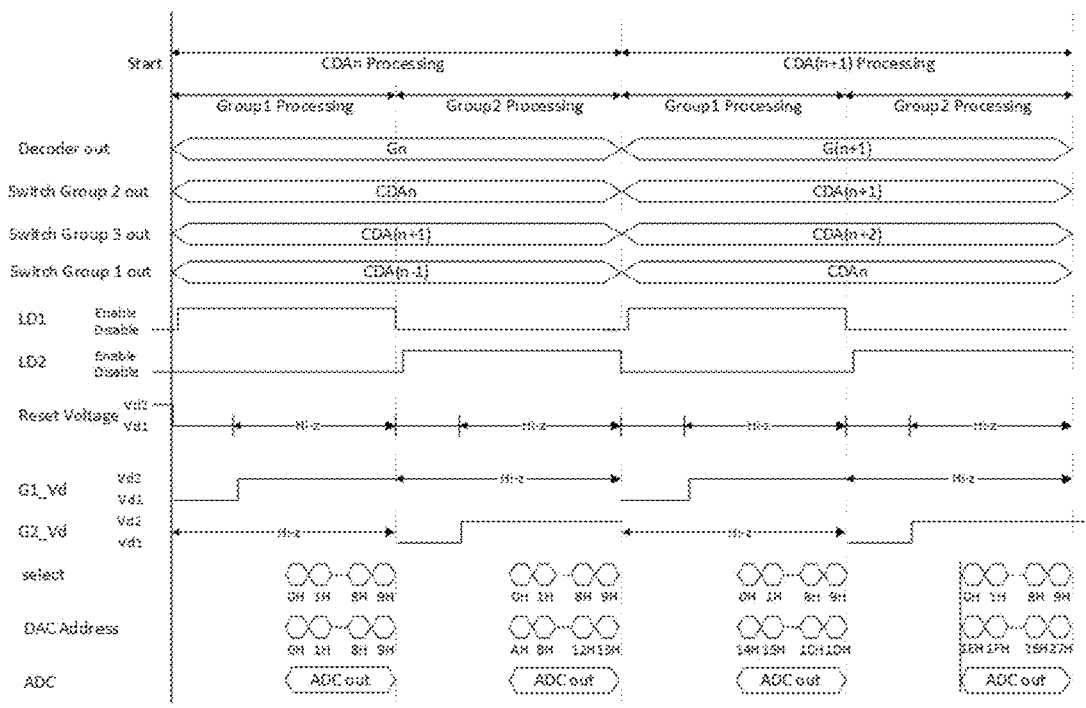

OBJECT SENSING DEVICE AND SENSING METHOD COMPOSED OF DIFFERENT CDA AREAS

BACKGROUND

Technical Field

The present invention relates to an object sensing apparatus and method for detecting an object such as a finger or a pen, wherein a group consisting of one CDA is formed to send a signal to a pen or to detect a finger, and the entire group is used to transmit a Tx signal to a pen or to receive an Rx signal from a pen, so that transmission and reception are possible in a fast time, and when an object such as a finger is detected, it is detected quickly to prevent loss of transmission and reception signals to and from the pen, and the current consumption is reduced by shortening the processing time.

Background Art

In the past, mechanical buttons were used to dial phone numbers on mobile phones, but in recent years, input devices have changed from mechanical to electronic, such as entering phone numbers by lightly touching a finger or pen to the display of a mobile phone, and capacitive type input devices are mainly used as an example of such electronic input devices.

Capacitive input devices detect changes in capacitance or voltage that occur when a finger or pen is placed adjacent to or in contact with a "capacitance sensing area" placed on the top surface of the display, and determine that input at that location is valid, as if a mechanical button had been pressed.

To receive the signal output from the pen, you may need to motivate the pen, such as assigning an ID to the pen and setting up a communication method, and then send a signal to the pen.

In FIG. 2 of the Korean Public Patent 10-2016-0070597 (hereinafter Cited invention), the longitudinal linear sensor patterns 5a are connected to each other to form a column, and the transverse linear sensor patterns 5b are connected to each other to form a row, so it is possible to operate 24 sensor patterns 5 with 6 signal lines. Assuming that the transverse linear sensor pattern 5b is the transmitting part (Tx) and the longitudinal linear sensor pattern 5a is the receiving part (Rx), it is possible to transmit signals to the pen using three Tx signal lines.

However, if the sensor pattern is formed as an independent island as shown in FIG. 6 of the cited invention, the sensor pattern must play the role of both Tx and Rx, and in this case, 20 signal lines are used for Tx, which has the disadvantage of being time-consuming and high current consumption.

In addition, when transmitting a Tx signal with a linear sensor pattern as shown in FIG. 2 of the cited invention, there is a problem that when a sensor pattern is formed through an insulator of several um on the upper surface of the cathode of a display device such as an OLED, the common electrode capacitance between the sensor pattern and the display device becomes excessively large, and This increases the time constant of the circuit composed of resistance and capacitance (RC), and this causes a delay in the rising time and falling time of the sensor pattern, making it difficult to transmit the Tx signal.

SUMMARY

Technical Problem

The present invention is proposed to solve the above-mentioned problems of the prior art, and provides a capacitive sensing device in which a small number of "capacitance sensing areas", such as one or two, are placed adjacent to a column, which is a set of "capacitance sensing areas" organized in the form of independent islands, and the placed "capacitance sensing areas" are responsible for sending signals to the pen, thereby reducing the time required for transmission signals and reducing current consumption by quickly identifying whether an object such as a pen or a finger is present.

In addition, by transmitting Tx using a dedicated power line instead of the Tx transmit signal line provided by the semiconductor IC, the time constant composed of RC is reduced and the speed of the rise and fall time of Tx is improved, and a capacitive sensing device is provided to improve the speed of the rise and fall time of Tx by shortening the charging time of the RC circuit using a boost voltage.

Technical Solution

To accomplish the above objectives, one embodiment of the present invention comprises: An object capacitance detection apparatus comprising: a Capacitor Detect Area (CDA) placed in a display device and consisting of a conductor and an independent area; a CDA signal line connected to said CDA; a first CDA column comprised of said multiple CDAs; a second CDA column comprised of a number of CDAs less than the number of CDAs constituting said first CDA column; and wherein said second CDA column is adjacent to said first CDA column.

More preferably, in the object capacitance detection apparatus, wherein the number of CDAs constituting said second CDA column is one.

More preferably, in the object capacitance detection apparatus, wherein one or multiple column groups are formed by said multiple first CDA columns and another one or multiple column groups are formed by said multiple second CDA columns and for every column group, one Loader or signal line/DC changeover switch is placed respectively and the CDA signal line from every CDA column included in the column group is input to said Loader or signal line/DC changeover switch.

More preferably, in the object capacitance detection apparatus, further comprising: a detection/driving signal line switch group placed between said first CDA column and said Loader or signal line/DC changeover switch and wherein a detection signal line is selected from the detection signal line switch group and a driving signal line is selected from the driving signal line switch group, with the driving signal line being selected adjacent to the detection signal line as one or multiple pairs.

More preferably, in the object capacitance detection apparatus, wherein the selected detection signal line from said detection signal line switch group is input to said Loader or signal line/DC changeover switch.

More preferably, in the object capacitance detection apparatus, wherein the detection signal line output from said Loader or signal line/DC changeover switch is connected with an AMP input signal line selector, and detection signal lines connected to said AMP input signal line selector are sequentially selected one by one for output from said AMP input signal line selector.

More preferably, in the object capacitance detection apparatus, wherein the signal of the CDA signal line or detection signal line input to said Loader or signal line/DC changeover switch is, based on an Enable or Disable state depending on the High or Low status of an output control terminal of the Loader or signal line/DC changeover switch, output during the Enable state and not output during the Disable state.

More preferably, in the object capacitance detection apparatus, wherein from multiple column groups formed by said multiple second CDA columns, a signal line is withdrawn from each CDA column and input into a signal line/DC changeover switch comprised of multiple switching elements by the same output component (or same output position), and the CDA signal line of the activated column group is input to a Loader selector or AMP input signal line selector by the turn-on of one side switching element constituting the signal line/DC changeover switch, while the CDA signal line of the deactivated column group is connected to a specific DC voltage by the turn-on of the other side switching element constituting the signal line/DC changeover switch.

More preferably, in the object capacitance detection apparatus, wherein the gate of the signal line/DC changeover switch composed of multiple switching elements is connected with a single turn-on/turn-off control signal, with one side switching element being turned on by a high voltage of the control signal and the other side switching element being turned on by a low voltage of the control signal.

More preferably, in the object capacitance detection apparatus, wherein multiple detection signal lines of the same output component originating from multiple outputs of the Loader or signal line/DC changeover switch are each connected to a switching element of the Loader selector composed of multiple switching elements, and depending on the high or low state of the turn-on/turn-off control signal individually connected to the gate of the Loader selector, one of the multiple switching elements is turned on, the detection signal line connected to the turned-on switching element is connected to the AMP input signal line selector.

More preferably, in the object capacitance detection apparatus, wherein the plurality of detection signal lines selected from the plurality of Loader selectors are included in the same column group.

More preferably, in the object capacitance detection apparatus, wherein an output control signal of the Loader or the signal line/DC changeover switch is used as a turn-on/turn-off control signal of the Loader selector.

More preferably, in the object capacitance detection apparatus, wherein the width of the CDA forming the second CDA column is narrower than that of the CDA forming the first CDA column.

More preferably, in the object capacitance detection apparatus, wherein when a driving voltage is applied to the driving signal line adjacent to the CDA signal line forming the second CDA column and the shielding region formed therein, the voltage detected in the CDA signal line is given by:

$$Vp2 - Vp1 = \frac{(Vd2 - Vd1) * Cd + (Vcin2 - Vcin1) * \text{Cin\_sd}}{Cd + \text{Cin\_sd} + Ccm}$$

where:
a) Vd1 is the first stage driving voltage applied to the driving signal line adjacent to the CDA signal line.
b) Vd2 is the second stage driving voltage applied to the driving signal line adjacent to the CDA signal line.
c) Vcin1 is the first stage driving voltage applied to the shielding area formed opposite the CDA signal line within the semiconductor IC.
d) Vcin2 is the second stage driving voltage applied to the shielding area formed opposite the CDA signal line within the semiconductor IC.
e) Cd is the interline capacitance formed between the CDA signal line and the driving signal line adjacent to the CDA signal line.
f) Cin_sd is the shielding capacitance formed between the CDA signal line and the shielding area formed opposite the CDA signal line within the semiconductor IC.
g) Ccm is the common electrode capacitance formed between the CDA and the CDA signal line, and the display device.

More preferably, in the object capacitance detection apparatus, wherein the CDA forming the second CDA column comprises between 2 to 4 units.

More preferably, in the object capacitance detection apparatus, wherein one side of the CDA signal line forming the second CDA column is commonly connected to input terminals of at least two switching elements constituting the Tx/Rx changeover switch1, and the CDA signal line output from one side of the Tx/Rx changeover switch1 is connected to the Loader or the signal line/DC changeover switch or the AMP input signal line selector, and the CDA signal line output from the other side of the Tx/Rx changeover switch1 is connected to the Tx driving signal line1.

More preferably, in the object capacitance detection apparatus, wherein the other side of the CDA signal line forming the second CDA column is connected to one side of the Tx/Rx changeover switch2, and the other side of the Tx/Rx changeover switch2 is connected to the Tx driving signal line2.

More preferably, in the object capacitance detection apparatus, wherein one of the switching elements constituting the Tx/Rx changeover switch1 and the Tx/Rx changeover switch2 are simultaneously turned on or off by the same Tx/Rx changeover switch control signal.

More preferably, in the object capacitance detection apparatus, wherein the CDA signal lines drawn out from the plurality of second CDA columns included in one column group are commonly connected to the Tx driving signal line.

More preferably, in the object capacitance detection apparatus, wherein the signal line/DC changeover switch or the Tx/Rx changeover switch1 comprises a plurality of switching elements, and different turn-on/turn-off control signals are connected to the gates of the plurality of switching elements.

More preferably, in the object capacitance detection apparatus, wherein when a driving voltage is applied to the driving signal line adjacent to the CDA signal line constituting the second CDA column, the driving signal line neighboring said CDA signal line is either a driving signal line of the first CDA column that is adjacent to the second CDA column and surrounds the second CDA column or a dedicated signal line that surrounds the second CDA column.

More preferably, in the object capacitance detection apparatus, wherein said signal line/DC changeover switch or said Tx/Rx changeover Switch1 comprises two switching elements, one of which is turned on and the other is turned off by a commonly connected Loader output control signal applied to the gate of the two switching elements.

More preferably, in the object capacitance detection apparatus, wherein said Tx driving signal line1 is located in a non-display area of the display device, either vertically or horizontally.

More preferably, in the object capacitance detection apparatus, wherein said Tx driving signal line2 is located on the other side of the display device relative to the Tx driving signal line1 installed on one side of the display device.

More preferably, in the object capacitance detection apparatus, wherein both said Tx driving signal line1 and said Tx driving signal line2 are connected to a Tx driving signal provided by a semiconductor IC.

More preferably, in the object capacitance detection apparatus, wherein one side of said Tx driving signal line1 and Tx driving signal line2 has separated power lines supplying Tx Low voltage and Tx High voltage, and the Tx driving signal line is connected to one of the Tx Low voltage or the Tx High voltage1.

More preferably, in the object capacitance detection apparatus, wherein a Tx level selection switch is placed between the Tx driving signal line1, Tx driving signal line2, and the separated power line, where one side of multiple switching elements constituting the Tx level selection switch commonly connects to the Tx driving signal line, the other side of a switching element connects to the Tx Low voltage, and another the other side connects to the Tx High voltage, wherein based on the turn-on/turn-off voltage of multiple Tx level selection switch control signals provided by the semiconductor IC, the Tx driving signal line is connected to either the Tx Low voltage or the Tx High voltage by a turned-on switching element.

More preferably, in the object capacitance detection apparatus, wherein the Tx level selection switch comprises two switching elements, with both elements having gates commonly connected to a single turn on/off control signal. Based on the high or low state of the control signal, one switching element turns on while the other turns off.

More preferably, in the object capacitance detection apparatus, wherein the one side of the said Tx driving signal line1 and the said Tx driving signal line2 is equipped with separate power lines that supply the Tx Low voltage and Tx High voltage constituting the Tx signal. On one side of the separate power lines, an additional power line supplying the Tx High Boost voltage or a power line supplying the Tx Low Boost voltage with a negative magnitude is installed. And said Tx driving signal line1 and/or the said Tx driving signal line2 are characterized by being connected to one of the voltages: Tx Low voltage, Tx High voltage, Tx High Boost voltage, or Tx Low Boost voltage.

More preferably, in the object capacitance detection apparatus, wherein between the Tx driving signal line1, Tx driving signal line2, and multiple separated power lines, a Tx level selection switch comprising multiple switching elements is installed. One side of the switching elements of the level selection switch commonly connects to the Tx driving signal line, with the other side of the switching element connecting to the Tx Low voltage, another side of the switching element connecting to the Tx High voltage, another side of the switching element connecting to the Tx High Boost voltage, and another side of the switching element connecting to the Tx Low Boost voltage. Based on the turn on/off voltage of multiple Tx level selection switch control signals provided by a semiconductor IC, one switching element among multiple switching elements turns on, and as a result, the Tx driving signal line connects to one of the provided voltages which are Tx Low voltage, Tx High voltage, Tx High Boost voltage, Tx Low Boost voltage.

More preferably, in the object capacitance detection apparatus, wherein a Tx high boost voltage is applied to said Tx driving signal line, and after a predetermined time has elapsed, a Tx high voltage is applied.

More preferably, in the object capacitance detection apparatus, wherein a Tx low boost voltage is applied to said Tx driving signal line, and after a predetermined time has elapsed, a Tx low voltage is applied.

More preferably, in the object capacitance detection apparatus, wherein the Tx driving signal is applied to the Tx driving signal line only in one column group.

More preferably, in the object capacitance detection apparatus, wherein the Tx driving signal is applied to the Tx driving signal line simultaneously in multiple column groups.

More preferably, in the object capacitance detection apparatus, wherein the driving signal supplied from the semiconductor IC is either a Tx low voltage, Tx high voltage, Tx high boost voltage, or Tx low boost voltage.

More preferably, in the object capacitance detection apparatus, a layer supplying the Tx High voltage, or the Tx High Boost voltage, or the Tx Low Boost voltage is installed opposing vertically to a layer onto which a certain DC voltage is applied.

More preferably, in the object capacitance detection apparatus, wherein the layer onto which a certain DC voltage is applied supplies the Tx Low voltage or the ground power of the system.

More preferably, in the object capacitance detection apparatus, wherein a power supply generating either the Tx high boost voltage or the Tx low boost voltage is turned on only when transmitting a Tx signal to the Pen and is turned off when not transmitting a Tx signal to the Pen.

More preferably, in the object capacitance detection apparatus, wherein said Tx high boost voltage is at least 1.5 times greater than the Tx high voltage, and the Tx low boost voltage is a negative power.

More preferably, in the object capacitance detection apparatus, wherein the Loader or signal line/DC changeover switch or detection/driving signal line switch group or Loader selector or Tx/Rx changeover switch 1 or Tx/Rx changeover switch 2 or Tx level selection switch is installed in the display device.

More preferably, in the object capacitance detection apparatus, wherein said Loader, signal line/DC changeover switch, detection/driving signal line switch group, Loader selector, Tx/Rx changeover switch 1, Tx/Rx changeover switch 2, or Tx level selection switch are manufactured together in the manufacturing process using a mask that produces a switching element of the display device that outputs pixel data of the display device or a switching element of the display device that outputs the Gate turn-on/turn-off voltage.

More preferably, in the object capacitance detection apparatus, wherein all CDAs constituting said first CDA column are interconnected, characterized by applying a Tx driving signal.

More preferably, in the object capacitance detection apparatus, wherein all CDAs constituting the first CDA column are interconnected or separated based on the operation of the Tx/Rx changeover switch.

More preferably, in the object capacitance detection apparatus, wherein the turn-on/turn-off control signal of the switching element constituting the Loader or signal line/DC changeover switch or detection/driving signal line switch group or Loader selector or Tx/Rx changeover switch 1 or Tx/Rx changeover switch 2 or Tx level selection switch is an output signal from a level shifter placed in the display device.

An object detection method comprising one or more of the following steps:
a) Applying a Tx signal to a common connection of multiple CDA signal lines drawn from multiple CDA columns forming a single column group for sending signals to the Pen;
b) Individually breaking the commonly connected CDA signal lines from step a) and connecting them to an Rx receiving unit, such as a Charge AMP or comparator, to receive and detect an Rx signal transmitted by the Pen;
c) Connecting the CDA signal line from step b) to one side of a differential amplifier and applying a driving voltage to the neighboring driving signal line or applying a driving voltage to a shielding area in the semiconductor IC facing the CDA signal line to detect the object capacitance;
d) Extracting coordinates of the Pen when a valid Rx signal from the Pen is detected in step b) and extracting coordinates of the object when the object is detected in step c;
e) In the step of the aforementioned d), if the pen is not detected or in the step of the aforementioned c) if the object is not detected, setting the Wake-up Time of the Timer Interrupt to a predetermined value and the semiconductor IC enters a Sleep or Standby mode;

According to one embodiment of the present invention, a second CDA column consisting of one CDA is placed adjacent to a first CDA column in the form of a plurality of independent islands, and the transmission of Tx signals and reception of Rx signals are performed in a short time by the second CDA column, and the object capacitance is quickly detected, thereby reducing current consumption.

The effects of the invention are not limited to those described above but are to be understood to include all effects that can be inferred from the detailed description of the invention or the composition of the invention as recited in the patent claims.

BRIEF DESCRIPTION OF THE FIGURES

FIG. 17 is one embodiment of the present invention for a memory storing a DAC.

FIG. 18A is an embodiment of the present invention for reducing the number of detection signal lines output from a plurality of loaders.

FIG. 18B is an embodiment of the present apparatus for signal flow between the devices used in FIG. 18A.

DETAILED DESCRIPTION

Figures 1, 2:
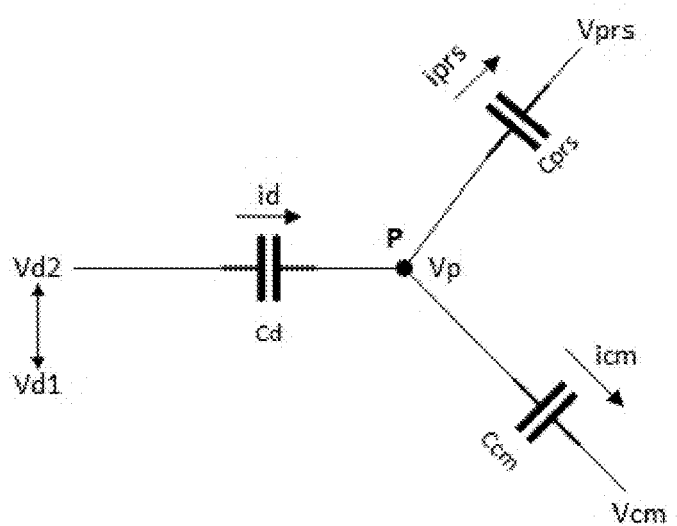
FIG. 1 is an embodiment of the present invention for modeling a capacitive input device.
FIG. 2 is a fictitious data to verify [Equation 1].

The terms used in the present invention have been chosen to be as generic as possible in current popular usage, considering their function in the present invention, but they may vary depending on the intention of those skilled in the art, precedent, or the emergence of new technologies. In addition, in certain cases, terms arbitrarily selected by the applicant have been used, in which case their meaning will be explained in detail in the description of the invention. Therefore, the terms used in the invention should be defined based on the meaning of the term and the overall content of the invention, not simply on the name of the term.

Furthermore, the value and thickness of each configuration shown in the drawings are arbitrary for purposes of illustration, and the invention is not necessarily limited to those shown.

To clearly represent the various layers and areas in the drawings, the thickness, width, etc. may be exaggerated by illustrations such as relative enlargement and relative reduction. When a layer, area, etc. is said to be "above" or "on" or "upper" or "on top of" another part, this includes not only when it is "directly above" another part, but also when there is another part in between. "Below" or "underneath" or "lower" has the same meaning.

Throughout the specification, when a part is said to "include" a component, it is meant to be inclusive of other components, not exclusive of other components, unless specifically stated to the contrary. In addition, terms such as " . . . part," "module," " . . . unit," and the like in the specification mean a unit that manages at least one function or operation, which may be implemented in hardware or software, or a combination of hardware and software.

In addition, when the specification refers to a signal line connecting two devices, it also includes other devices between them. For example, "a detection signal line is connected to a loader" means that a group of sensing switches is included between the detection signal line and the loader.

In this specification, criteria such as up, down, left, and right are set based on the positions of the CDA and the semiconductor IC placed in the display device. In one embodiment, the CDA is defined as being on the upper side of the semiconductor IC, COL1 of group 1 is defined as being on the left side relative to the semiconductor IC, and AUX20 of group 4 is defined as being on the right side relative to AUX1 of the same group. Also, in the CDA column facing the semiconductor IC is the lower side of the CDA and the opposite s is the upper side of the CDA.

Definitions of Terms

The terms "capacitance" and "capacitor" are used interchangeably herein.

Also, the Capacitor Detect Area is abbreviated as "CDA".

In addition, a finger, or a pen, etc. that forms a capacitance opposite to the CDA 100 is specified as an object 20.

In addition, among the multiple CDA signal lines 200, a signal line that detects a voltage (or detects a signal) based on a mathematical formula provided by the present invention is denoted as a detection signal line, and a CDA 100 connected to the detection signal line is denoted as a detection CDA.

Additionally, the signal line, which is adjacent to the detection signal line and forms a capacitance with the detection signal line, and to which a driving voltage is applied, is denoted as the Driving Signal Line.

In addition, signal lines required for operation inside the semiconductor IC 400 other than the CDA signal line 200 connected to the CDA 100, such as the logic signal line, the oscillator signal line, and the power line, are labeled as "different signal lines" to distinguish them from the CDA signal line 200 of the present invention.

In addition, the capacitance symbols described in the specification are used in two meanings: the drawing symbol of the capacitance and the value of the capacitance. For example, Cprs is a capacitor as a drawing symbol indicating the capacitance formed by the sensing signal and the semiconductor bulk (substrate) inside the semiconductor IC, and it can also be a capacitance having a predetermined value. If the meaning is confusing, it is written as "capacitor" or "capacitance value".

Also, the CDA 100 and the detection signal line 200 connected thereto are geometrically distinct, but electrically equivalent. Therefore, the phrase "extracting a sensing signal from the detection signal line 200" is used interchangeably with the phrase "extracting a sensing signal from the CDA 100 connected to the detection signal line 200".

In addition, the output voltage of the differential amplifier that outputs the difference between the first and second detection signal is denoted as "V1" in this specification.

In addition, a DAC is a device that outputs an analog voltage in response to a given input code. In this specification, the analog voltage output for "DAC code" is referred to as "DAC voltage" or "DAC output". When "DAC" is used alone, it may refer to a DAC device that includes both DAC code and DAC voltage, or it may refer to either DAC code or DAC voltage.

Also, the reference of distances such as far/near is based on the semiconductor IC 400, where far means far away from the semiconductor IC and near means close to the semiconductor IC 400.

In addition, a single column formed by a set of CDAs is called "CDA Column" and is denoted as "Column" when it is clear from the context.

Also, multiple CDA columns together form a "column group". Where it is clear from the context, it is labeled as a group.

Further, the switching element in the specification may be a CMOS switch used in a semiconductor IC, or a BJT switch, or a TFT switch in a TFT LCD, or a PMOS or NMOS switch in an OLED. Or it could be a CMOS with a combination of PMOS and NMOS in the OLED. The switching element is energized by a voltage or current applied to the gate or base of the BJT. In this specification, the control signal connected to the gate or base of the switching element to turn on or turn off the switching element is referred to as a "switching element control signal" or "control signal." Therefore, the meaning of applying a "switching element control signal" or "control signal" includes the process of applying a turn-on or turn-off voltage to a signal line connected to the gate of the switching element to turn on or turn off the switching element. To clarify the meaning, a specific operation such as "applying a turn-on voltage to a control signal" is sometimes described.

On the other hand, a single switching element or a plurality of switching elements can be used to create a device. In this specification, a loader is a good embodiment of such a device. When a signal line is connected or a signal is applied to such a device, it is used interchangeably with the meaning that a signal line is connected, or a signal is applied to a one side terminal of a switching element belonging to such a device. In one embodiment, the meaning of "inputting a detection signal line of the present invention through a common connection" to a device comprising three switching elements can be used interchangeably with the meaning that the input terminals of the three switching elements comprising the device are connected together and the detection signal line is connected to a common connection point.

Furthermore, in the present specification, the loader is composed of a plurality of switching elements. The loader has the characteristic that all the plurality of switching elements comprising the loader are turned on when an output control signal of high or low for enabling is applied to the output control terminal LD of the loader. In this specification, it is assumed that the turn-on voltage of the switching elements including the loader is high and the turn-off voltage is low. Therefore, the enable signal of the loader is high and the disable is low.

In addition, when communicating with the Pen for Pen input function, the Transmit process is abbreviated to Tx, and the Receive process is abbreviated to Rx to receive information from the Pen.

Also, a transfer switch is a hypothetical device that transmits an input signal without loss. In one embodiment, The Loader of the present invention is composed of a transfer switch, and due to the loss caused by the turn-on resistor Rds(on) of the transfer switch, the input signal has some loss in the output process, but it is not a problem for processing the signal. For this reason, it is assumed that the device consisting of a transfer switch is output without loss of the input signal.

The following is described in detail, with reference to the accompanying drawings, to facilitate the practice of embodiments of the present invention by one of ordinary skill in the art to which it belongs. However, the invention may be implemented in many different forms and is not limited to the embodiments described herein. To clearly illustrate the invention in the drawings, parts not pertinent to the description have been omitted, and similar drawing symbols have been used for like parts throughout the specification.

FIG. 1 is an embodiment of the present invention for modeling a capacitive input device.

Referring to FIG. 1, Cd is the "capacitance between lines or interline capacitance", Cprs is the "internal parasitic capacitance" formed between the sensing signal and the semiconductor substrate or other signal lines inside the semiconductor IC, Ccm is the "common electrode capacitance" formed between the capacitor detect area and the display, and one side of these three capacitances is connected in parallel to point P indicated by the equivalent circuit of the sensing signal. At this time, the voltage supplied to the other side of the "internal parasitic capacitance", Vprs, is either DC power, which is the potential of the semiconductor substrate, or AC power, which is the noise of other coupled signal lines. And Vcm, the voltage supplied to the other side of the "common electrode capacitance", is the pixel voltage, which is a DC voltage with a predetermined value, and Vd, the voltage supplied to Cd, the interline capacitance, is the driving voltage that changes in magnitude from Vd1 to Vd2 or from Vd2 to Vd1.

Let Vp be the voltage at point P when it is stabilized by the voltages supplied to the three capacitances, and let id be the current flowing in Cd by the voltage Vd supplied to the interline capacitance (Cd), let iprs be the current flowing in Cprs due to the voltage Vprs supplied to the internal parasitic capacitor (Cprs), and let icm be the current flowing in Ccm due to the voltage Vcm supplied to the common electrode capacitor (Ccm), then by Kirchhoffs current law, id=iprs+icm.

So, id=Cd*(Vd−Vp), iprs=Cprs*(Vp−Vprs), icm=Ccm*(Vp−Vcm)

So, Cd*(Vd−Vp)=Cprs*(Vp−Vprs)+Ccm*(Vp−Vcm).
We can rewrite this equation for Vp, $$Vp = \frac{Cd*Vd + Cprs*Vprs + Ccm*Vcm}{Cd + Cprs + Ccm}.$$

In the aforementioned mathematical equation, when replacing the voltage Vd supplied to the interline capacitor Cd with Vd1, the voltage Vp1 at point P when Vd1 is applied is $$Vp1 = \frac{Cd*Vd1 + Cprs*Vprs + Ccm*Vcm}{Cd + Cprs + Ccm}.$$

Furthermore, when a voltage Vd2 larger than Vd1 is supplied to the interline capacitor Cd, the voltage Vp2 at point P is $$Vp2 = \frac{Cd*Vd2 + Cprs*Vprs + Ccm*Vcm}{Cd + Cprs + Ccm}.$$

Therefore, (Vp2−Vp1) detected at the connection point P when applying Vd1 and Vd2, which are voltages of different magnitudes to the interline capacitance (Cd), is equal to [Equation 1].

$$Vp2 - Vp1 = \frac{(Vd2 - Vd1)*Cd}{Cd + Cprs + Ccm} \qquad \text{[Equation 1]}$$

FIG. 2 is a fictitious Data to verify [Equation 1].

Referring to FIG. 2, Vd1=0V, Vd2=5V, and the interline capacitance (Cd) was set to increase from 13 pF to 34 pF. The internal parasitic capacitance (Cprs) was crossed from 8 to 14 pF, and the common electrode capacitance (Ccm) was crossed from 1 to 2 pF.

If you substitute the data in FIG. 2 into [Equation 1] to calculate Vp2–Vp1, you can see that Max=3.929V and Min=2.5V, which is Max-Min=1.429V, as shown in FIG. 2.

To detect a voltage with a range of 1.429 V, it is appropriate to use a 10-bit ADC with a sensing range of 1.6 V. Assuming the ADC's bias voltages, ADC_top and ADC_btm, are 3 V and 1.4 V, respectively, the resolution of a 10-bit ADC with a sensing range of 1.6 V is 1.6 V/1024 bit, which is 1.56 mV/bit.

Referring to the bottommost data of the single driving in FIG. 13 described later, if the value of the object capacitance (Cobj) formed by the object is 0.2 pF, the difference between the first and second voltages detected at the P point is 16 mV, which is about 10 codes with an ADC resolution of 1.56 mV/bit.

10 code is about 1% of 1024 code, which is the full resolution of the ADC, and there is a problem that it is difficult to determine the real signal with a signal value of about 1%, considering that the value within 2-3% of the detected signal is generally difficult to determine due to noise.

Figure 3:
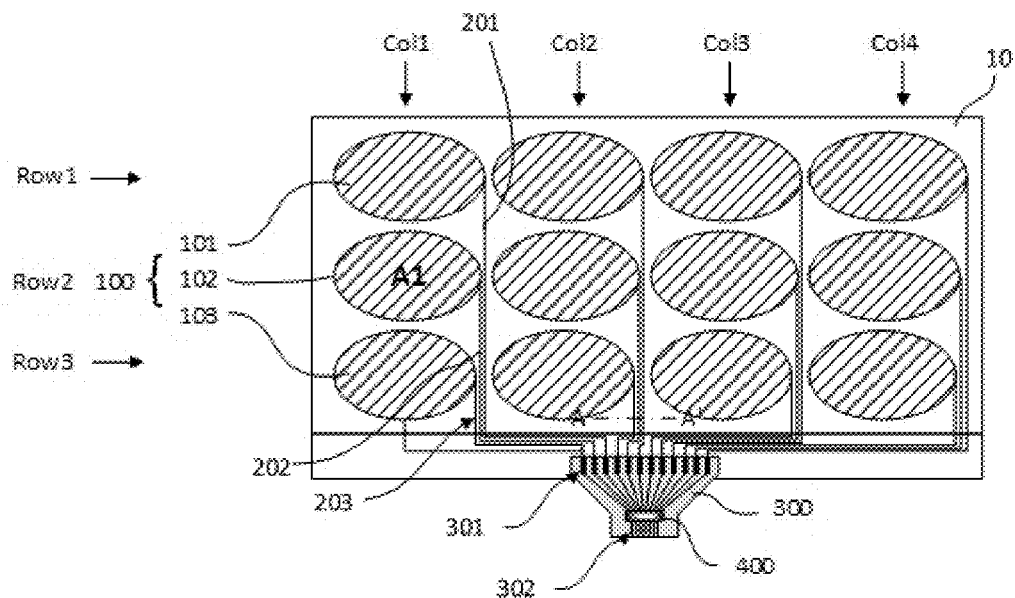
FIG. 3 is a display module with a capacitance detector in accordance with an embodiment of the present invention.

FIG. 3 is a display device module in which a capacitive sensing device according to an embodiment of the present invention is placed. The Capacitor Detect Area (or Capacitance Detect Area, CDA) 100 of the capacitive sensing device is made of a conductor, placed inside the display device 10 or on the upper surface of the display device 10, has an independent area, and is connected to the signal detection unit 410 of the semiconductor IC 400 by the CDA signal line 200 connected to one side.

The CDA 100, which is placed on the inside or top surface of the display device, is covered with tempered glass, plastic, film, or the like to protect it from the object 20 or external foreign material. The CDA 100 is a geometric shape such as a circle, square, triangle, or the like having a predetermined area, and is most often made of the same or similar geometric shape. When an object such as a human finger or a pen is placed against the top surface of the CDA 100, an object capacitance (Cobj) is formed depending on the mutual clearance distance and the facing area of the object.

On the other hand, the CDA signal line 200 connected to one side of the CDA 100 electrically connects the CDA 100 with the semiconductor IC 400 located outside the display device 10, and the CDA signal line 200 is connected to the semiconductor IC 400 through the material for connection 300.

The display device 10 is made of LCD or OLED. The LCD is a VA (Vatical Alignment) series or IPS (In Plane Switching) series, and a-Si, LTPS, and oxide TFTs are all used. LCDs are made by bonding TFT glass and color filter glass, in which the pixels of the display are formed, and a common voltage (Vcom) is supplied to the common electrode layer formed on the upper color filter glass in the VA series, and a common voltage is applied to the common electrode layer formed on the lower TFT glass in the IPS series.

If the display device 10 is an OLED (Organic Light Emitting Diode), the cathode is located on the top layer, and the OLED is encapsulated by an encapsulation substrate made of glass or a polyimide-based thin film. The display device 10 described herein is not limited to LCD or OLED. Although embodiments using LCDs are mostly described, the upper surface of an LCD is used in the same sense as the upper surface of an OLED, and the elements of the present invention embedded in the display device are manufactured with the same manufacturing process of a TFT substrate of an LCD or an OLED substrate.

An object capacitance (Cobj) is formed by the capacitor sensing area (CDA 100), the distance "d" from the object 20, and the facing area "s", and the magnitude of the formed object capacitance (Cobj) is $$Cobj = \varepsilon \frac{S}{d} \cdot \varepsilon$$

is the permittivity of the material between the CDA 100 and the object 20, and a complex permittivity is applied by the protective layer 7 such as glass or film and (if the object is floating in the air) air.

The location of the CDA 100 within the display is shown below.
1) In the case of LCD1: The upper part of the Color Filter Glass, specifically where the Color Filter Glass is bonded with the polarizing plate, is formed on the Color Filter Glass, or it may be formed on the lower or upper side of the polarizing plate, or installed on the bottom surface of the protective layer 7.
2) In the case of LCD2: It is formed at the common electrode position of the TFT substrate and plays the dual role of common electrode and CDA 100.
3) LCD case 3: It is formed on the bottom layer of the TFT substrate, and the process of gate metal or source metal begins after CDA formation and insulator application. The components connected to the CDA signal line 200 are formed by switching elements manufactured in the LCD process and embedded in the TFT substrate or located inside the semiconductor IC 400.
4) In the case of OLED 1: It is formed on the upper surface of the insulator after applying an insulator to the upper surface of the cathode. The components described in the following specification, such as the switch group connected to the CDA signal line 200, or the loader 450 and decoder 436, are formed in the manufacturing process of the OLED and embedded in the OLED substrate, or are fabricated in the manufacturing process of the semiconductor IC 400 and located inside the semiconductor IC 400.
5) In the case of OLED 2: It is formed on the upper surface of the PI (Polyimide) series thin film, which is the sealing plate of OLED, or on the upper or lower surface of the sealing glass. At this time, the CDA signal line is connected to the semiconductor IC 400.

The CDA 100 set in FIG. 3 consists of three rows and four columns. Area A1 in FIG. 3 has coordinates in Row 2 and Column 1 and is labeled as R2C1.

The set of CDAs 100 in FIG. 3 is shown as three rows and four columns for convenience, but in practice may be used in a variety of forms, such as 15 (row)×20 (column) or 20×25 or 25×20, depending on the size of the display device 10.

In this specification, the direction in which the number of signal lines increases is defined as a column. In FIG. 3, the number of signal lines increases from 1 to 3 from the top to the bottom, so the top and bottom directions can be defined as Columns. Also, the direction orthogonal to the column direction is defined as Row. In FIG. 3, one column is composed of CDAs 100 corresponding to three rows, wherein the CDA R1C1 of the top row is referred to as the first CDA, the CDA R2C1 of the second row is referred to as the second CDA or the CDA of the second row, and the third or fourth CDA, etc. are successively followed.

Since the CDA 100 formed in the LCD or OLED is facing with the common electrode layer (Vcom Layer) of the LCD or the cathode layer of the OLED at a certain distance and a certain area, a common electrode capacitance having a value of $$Ccm = \varepsilon \frac{S}{d}$$

E is formed between the CDA 100 and the display device.

Figure 4:
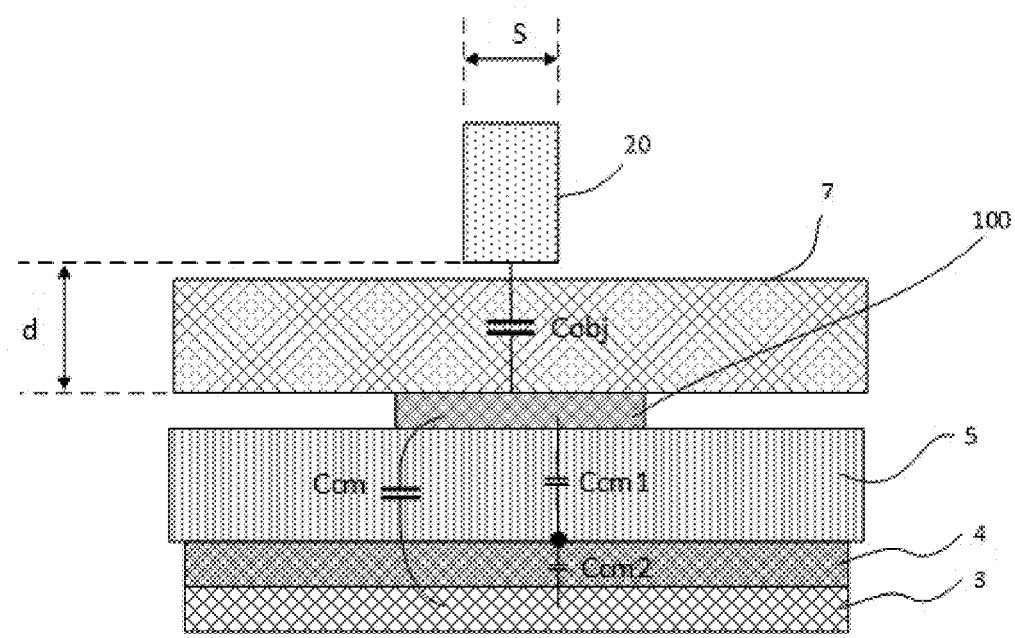
FIG. 4 is an embodiment of the present invention for the formation of a common electrode capacitor Ccm.

FIG. 4 is an embodiment of the present invention for the formation of a common electrode capacitance (Ccm) and the display device is an LCD.

Referring to FIG. 4, the CDA 100 is located on the upper surface of the color filter glass 5. A color layer 4 of R/G/B is located on the bottom of the color filter glass 5, and a common electrode 3 is located on the bottom of the color layer 4.

Since the permittivity of the color filter glass 5 and the permittivity of the color layer 4 are different, a capacitance Ccm1 based on the permittivity of the glass and a capacitance Ccm2 based on the permittivity of the color layer 4 are formed in series between the CDA 100 and the color filter glass 5. Therefore, the common electrode capacitance (Ccm) formed between the CDA 100 and the common electrode 3 is a composite capacitance formed by the series connection of Ccm1 and Ccm2.

On the other hand, although not shown in FIG. 4, since the CDA signal line 200 is also part of the CDA 100, a common electrode capacitance is also formed between the CDA signal line 200 and the common electrode 3. When considering the value of the common electrode capacitance (Ccm) caused by the CDA 100, the value of the common electrode capacitance (Ccm) caused by the CDA signal line 200 should also be considered.

If FIG. 4 is for an OLED rather than an LCD, and if the aforementioned CDA position in the case of an OLED 1, then symbol 5 is an insulator and symbol 4 is a cathode and only Ccm1 is formed.

The common electrode (or cathode in OLED) of an LCD is supplied with a fixed voltage of a certain value, and the voltage cannot fluctuate to display a normal screen. Therefore, a driving voltage for object detection cannot be applied to the common electrode capacitance (Ccm).

Since the CDA 100 on the surface of the display device 10 has a different area depending on the position in the column, and the CDA signal line 200 has a different length depending on the position of the CDA 100, the magnitude of the common electrode capacitance (Ccm) has various distribution values depending on the position of the CDA 100 in the display device 10, and tends to be progressively larger from the near CDA to the far CDA.

As such, the difference in area depending on the location of the CDAs causes a difference in the value of the common electrode capacitance (Ccm), which causes a difference in the value of the voltage detected for the same object capacitance, and it is desirable to keep the value of the common electrode capacitance (Ccm) as much as possible the same regardless of the location of the CDAs 100 within the display device 10.

As described above, the magnitude of the common electrode capacitance (Ccm) formed between the CDA 100 and the CDA signal line 200 and the common electrode 3 is correlated with the area (s) of the CDA 100 and the CDA signal line 200 and the facing distance (d) from the common electrode 3. Among these, the facing distance (d) is a value determined in the manufacturing process of the display device and is a factor that cannot be changed. Therefore, a way to keep the value of the common electrode capacitance (Ccm) as equal as possible regardless of the position of the CDA 100 within the display device 100 is to design and manufacture the area (s) of all CDAs 100 and CDA signal lines 200 as equal as possible.

The CDA 101, R1C1 located in the far distance of the display device 10 has a long CDA signal line 201, and the CDA 103, R3C1 in the near distance has a short signal line 203. If the area of the far CDA 101 and the area of the signal line 201 connected to it are assumed to sum to 100% and the area of the near CDA 103 and the signal line 203 connected to it is 80%, it is more advantageous to reduce the area of the far CDA 101 and the signal line 201 than to increase the area of the near CDA 103 and the signal line 203 so that the sum of their areas is 80%, because it reduces the value of the common electrode capacitance (Ccm).

Figure 5:
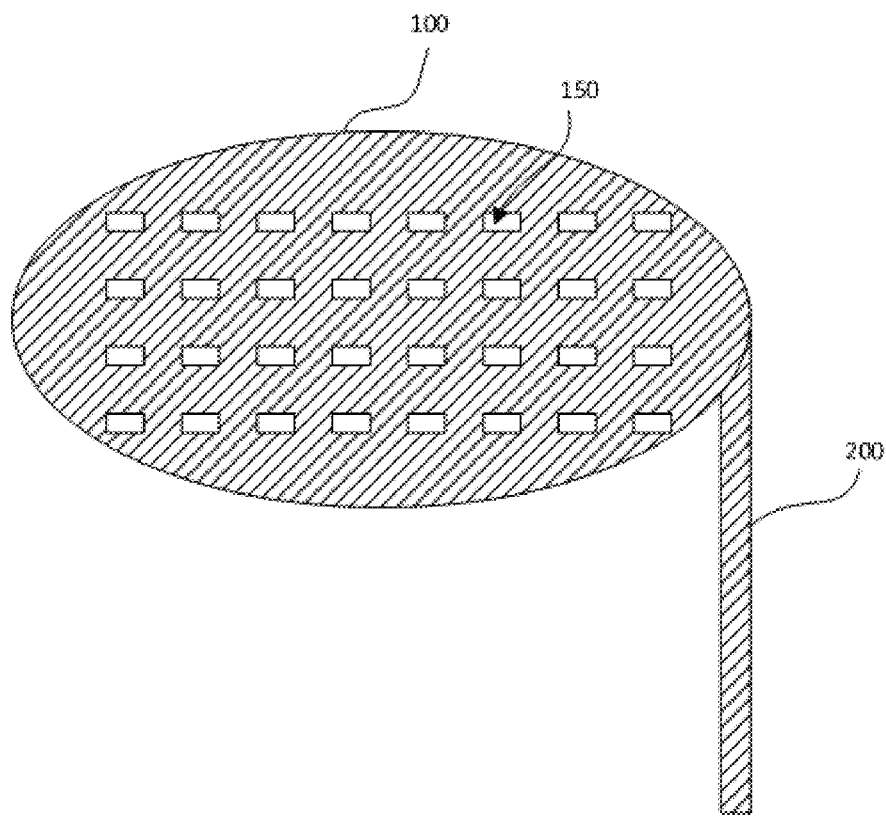
FIG. 5 is an embodiment of the present invention regarding a method of reducing the area of the CDA opposite the common electrode.

FIG. 5 is an embodiment of the present invention relating to a method for reducing the area of the CDA 100 facing the common electrode 3 of a LCD or the cathode of an OLED.

Referring to FIG. 5, a portion of the CDA 100 is the Empty Area, which is made by removing a part of the conductor that forms the CDA 100. By adjusting the ratio of the effective space and the empty area 150 in the CDA 100, it is possible to adjust the area of the CDA 100 facing the common electrode 3. In the embodiment of FIG. 5, the empty area 150 is formed as a square, but it can be formed in a variety of geometric shapes, such as a circle, a triangle, a rhombus, or a shape that includes irregularities in which the W is continuously connected. In addition, to avoid visually perceived problems, the peeled shape of one CDA 100 and all CDA 100s of the present device should have the same shape. For example, if the peeled shape is a circle type, the peeled shapes from one unit CDA 100 are all circles, and the peeled shapes from all CDAs of this device are also circles.

Furthermore, if the density of the empty hole in one CDA 100 is different, the presence of the CDA 100 in the display device 10 can be visually recognized by the difference in density, which serves to reduce the quality of the screen displayed on the display device 10, so the density of the empty area 150 in one CDA 100 should be same. Furthermore, to reduce visual perception problems, it is preferred that the difference in density of the empty area 150 from the neighboring CDAs 100 is at most 5%.

For example, if 25 CDAs 100 are present in a column and the density difference in the empty hole between the top and bottom CDAs is 5%, then CDA 1 and CDA 25 will have a density difference in the empty area 150 of at least 70%, which can be visually perceived by the density difference in the empty hole between the top and bottom CDAs, and if the quantity of CDAs is further increased, it may not be possible to design for the density difference.

Empty area 150 can also be placed in the CDA signal line 200, but preferably, empty area 150 are not formed in the CDA signal line 200 because if the width of the signal line is narrowed by the empty hole, it becomes a factor that increases the resistance of the CDA signal line 200.

To keep the area of CDA 100 in FIG. 5 at 80%, 20% of the total area of CDA 100 can be kept as empty area 150. In this way, if the area of the CDA 100 and the CDA signal line 200 is calculated and the empty area 150 is placed in the CDA 100 so that the sum of the effective areas excluding the empty area 150 is the same or similar for each CDA 100, each CDA 100 has the same or similar value common electrode capacitance (Ccm).

In accordance with the present invention, when the combined area of the CDA 100 and the CDA signal line 200 installed at any location of the display device 10 differs from each other, the proportion of the empty area 150 peeled off from the CDA 200 is adjusted so that the combined area of all CDA 100 and CDA signal line 200 is the same or similar.

When designing and manufacturing the CDA 100 in accordance with these principles, it is preferred that the error range of the area between a set of 10 adjacent CDAs 100 is within a range of ±20%, and that the difference between the absolute area of the empty area 150 peeled from the distant CDA 101 and the absolute area of the empty area 150 peeled from the proximate CDA 103 is at least 20% or less.

The empty area 150 in the CDA 100 is used not only to maintain the same area between the CDA 100 and the CDA signal lines 200 but also to reduce the value of the common electrode capacitance (Ccm). As a result, the detection sensitivity of the object capacitance (Cobj) is improved.

A method for achieving this purpose is to reduce the effective area of the CDA 100, and the ratio of the empty area 150 to be peeled off from the CDA 100 is the same for the CDA 100, but the area of the peeled off empty area 150 is preferably 50% or more. Also, the sum of the peeled off ratio applied equally to some CDA 100, and the peeled off ratio applied differently to each CDA 100 for equality of mutual area between CDAs 100 is preferably limited to 90% or less of the area of any CDA 100. This is because at least 10% of the total area of the CDA 100 must be maintained to enable sensing of the object capacitance (Cobj).

Under the influence of a plurality of CDA signal lines 200 belonging to one column, the area of the CDA 100 shrinks as it descends to a near distance, and the far signal line 201 is preferably manufactured with a wide signal line width to reduce the value of the line resistance. For this reason, since the areas of the CDA 100 and the CDA signal line 200 are different for each CDA 100, the magnitude of the common electrode capacitance (Ccm) is different for each CDA 100.

Due to the different common electrode capacitance (Ccm) of each CDA 100, deviations in the sensing voltage based on [Equation 2] occur, which causes the resolution of the ADC to decrease. A method to compensate for this problem is to supply a charge by driving the common electrode capacitance (Ccm).

In FIG. 4, the voltage potential of the common electrode capacitance Ccm should not be changed, so the method of driving the common electrode capacitance Ccm is to install a new driving layer between the CDA 100 and the common electrode 3 and apply a driving voltage to the new driving layer.

Figure 6:
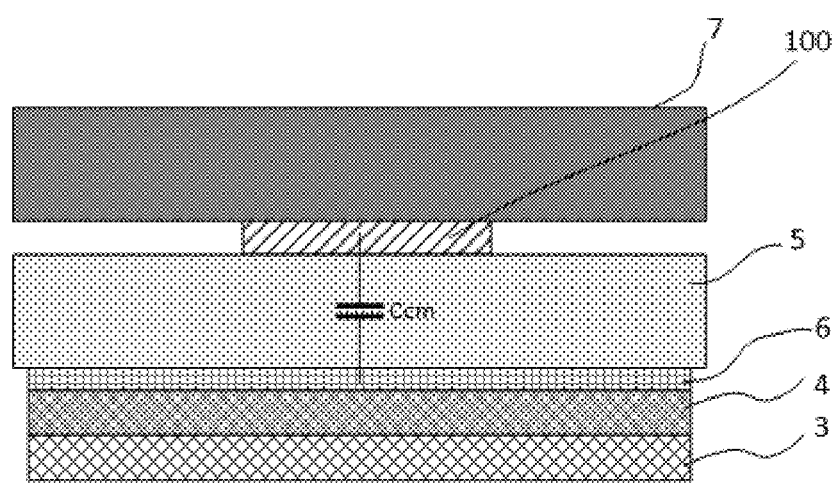
FIG. 6 is an embodiment of the present invention with a new driving layer placed between the CDA and the common electrode.

FIG. 6 is an embodiment of the present invention with a new Driving Layer placed between the CDA 100 and the common electrode 3.

Referring to FIG. 6, a new Ccm driving layer 6 is formed on the upper side of the color layer 4 of the LCD, and the Ccm driving layer 6 is composed of a conductive permeable material such as ITO (Indium Tin Oxide) or metal mesh. When the display device 10 is an LCD, the Ccm driving layer 6 may be placed anywhere between the CDA 100 and the common electrode 6. Also, if the display device 10 is an OLED, an insulating layer may be placed on the upper surface of the cathode and the Ccm driving layer 6 may be formed on the top surface of the insulating layer.

A driving signal line 201 is placed in the Ccm drive layer 6 to apply the driving voltage.

In the case of LCD, the driving voltage is applied to the Ccm driving layer 6 using metal paste at the contact point, which is the electrical signal junction of the TFT substrate and the color filter substrate, or the driving voltage application method using a conductive ball is used.

In the case of OLED, the Ccm driving layer 6 can be connected to the driving signal using a contact point with the metal on the bottom to apply the driving voltage.

When a driving voltage called Vcm1 and Vcm2 (but Vcm2>Vcm1) is applied to the Ccm driving layer 6, Vp2−Vp1 is formed as shown in [Equation 2].

$$Vp2 - Vp1 = \frac{(Vd2 - Vd1)*Cd + (Vcm2 - Vcm1)*Ccm}{Cd + Cprs + Ccm} \qquad \text{[Equation 2]}$$

The following is one embodiment of the present invention regarding the formation of a interline capacitance Cd and a method of applying a driving voltage to the interline capacitance Cd.

Figure 8:
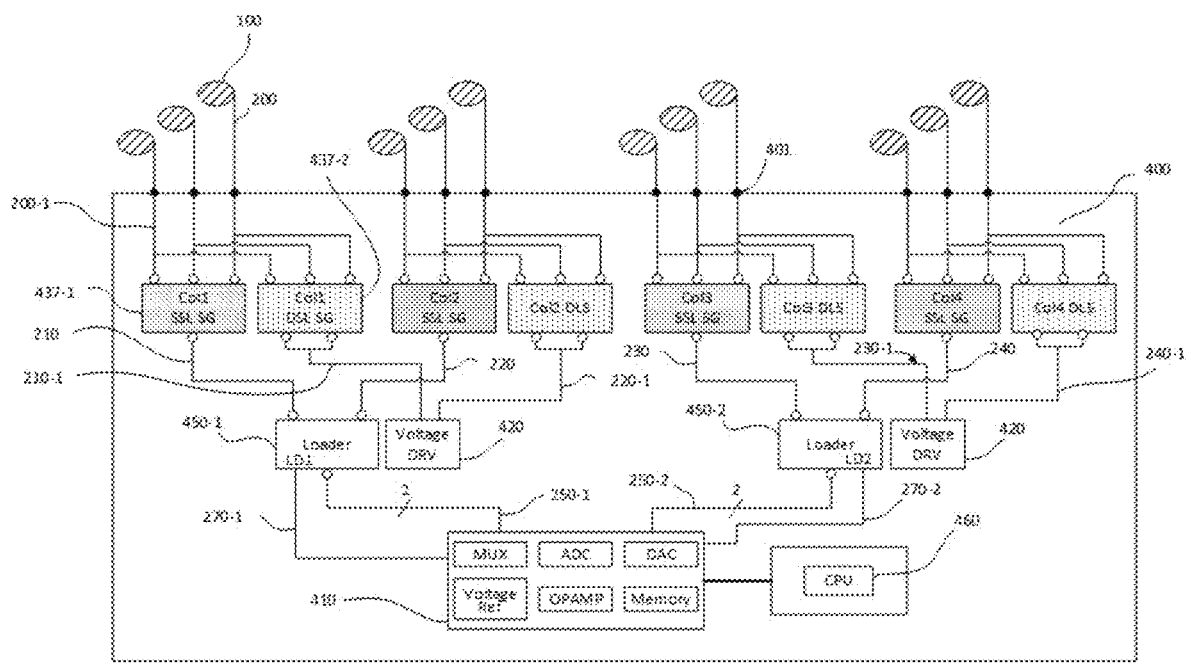
FIG. 8 is an embodiment of the present invention with respect to a semiconductor IC configuration.

When the object capacitance Cobj is detected by the CDA 102, R2C1 labeled A1 among the plurality of CDAs 100 in FIG. 3, the CDA signal line 202 connected to the A1 CDA 102, R2C1 is connected to the signal detection unit 410 of the semiconductor IC 400, and the CDA signal lines 201,203 adjacent to the CDA signal line 202 are connected to the driving unit 420 in FIG. 8. The CDA signal line that detects the object capacitance Cobj connected to the signal detection unit 410 in FIG. 8 is referred to as the detection signal line, and the signal line adjacent to the detection signal line that is connected to the driving unit 420 and to which the driving voltage is applied is referred to as the driving signal line. In this specification, the CDA signal line is represented by the code 200, the detection signal line is represented by the symbol 202, and the driving signal line is represented by the code 201.

Figure 7A:
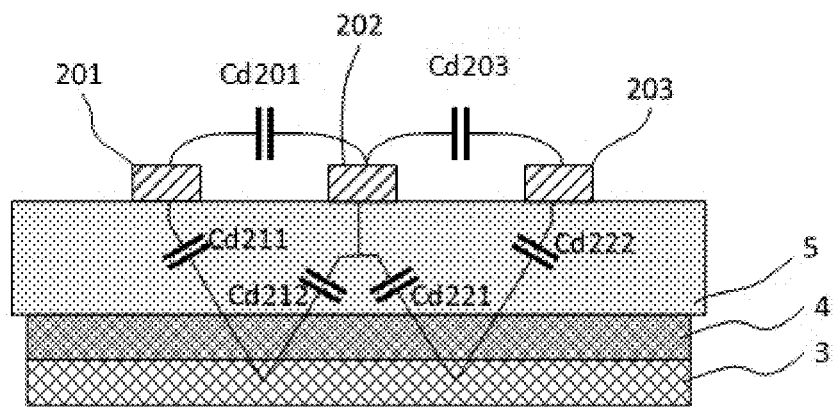
FIG. 7A is an embodiment of the present invention regarding the formation of a capacitor formed between one signal line and two adjacent signal lines.
Figure 7B:
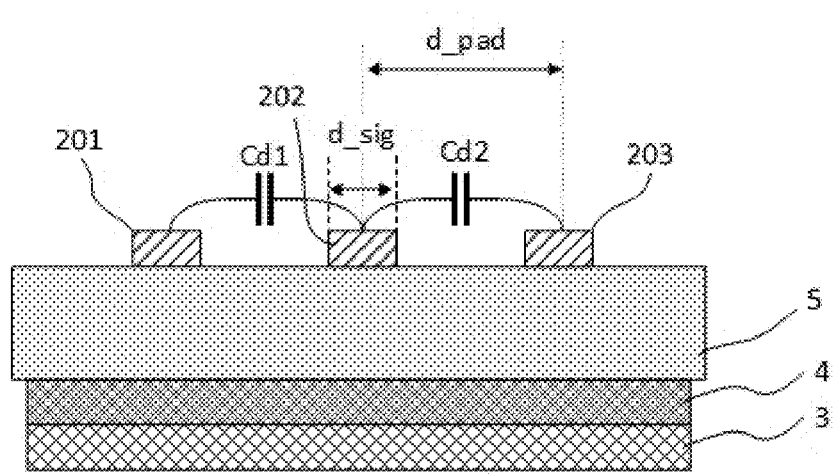
FIG. 7B is an embodiment of the present invention with respect to the equivalent circuit of FIG. 7A.

A capacitor between lines (or interline capacitance) is formed between the detection signal line 202 and the driving signal line 201 of the CDA R1C1, and between the detection signal line 202 and the CDA R3C1 driving signal line 203, as shown in FIGS. 7A and 7B.

FIG. 7A is an embodiment of the present invention related to the formation of interline capacitance between the detection signal line 202 and the two adjacent driving signal lines 201,203. It depicts the cross-sectional views of A and A' from FIG. 3. FIG. 7B is an embodiment of the present invention pertaining to the equivalent circuit of FIG. 7A.

Referring to FIGS. 7A and 7B, the drive signal lines 201,203 adjacent to the left and right sides of the detection signal lines 202 are spaced apart by a certain distance (d_pad) and have facing areas, so a capacitance Cd201 is generated between them according to the mathematical formula of es/d. In the same way, a capacitance Cd203 is formed between the detection signal line 202 and the drive signal line 203 adjacent to the right side.

Meanwhile, the detection signal line 202 faces the common electrode 3 with a width of d_sig(um) and is separated by the thickness of the Color Filter Glass 5 and the Color Layer 4. Therefore, a capacitance Cd211 is formed according to the mathematical formula es/d. In addition, a capacitance Cd212 is formed between the detection signal line 202 and the common electrode 3 in the same way. When the driving voltage is applied to the driving line 201 except the sensing line 202, the voltage of the driving line 201 is higher than the sensing line 202, and the charge supplied to the driving line 201 moves to the sensing line 202 through Cd201, and moves to the sensing line 202 along the capacitance path of Cd211 and Cd212.

Since Cd211 and Cd212 operate as series-connected capacitances due to the electrolytic path of Cd211 and Cd212, and this capacitance operates as a parallel-connected capacitance with another electrolytic path, Cd201, it is circuit analytically possible to consider that a single equivalent capacitance, Cd1, is formed between the driving signal line 201 and the detection signal line 202 where the driving voltage is applied, as shown in FIG. 7B.

In the same way, when a driving voltage is applied to the driving line 203 on the right to detect a signal from the sensing line 202, the capacitance formed between the sensing line 202 and the driving line 203 on the right can be equivalently represented by Cd2 in FIG. 7B.

Referring to [Equation 6], the smaller the value of the interline capacitance (Cd), the better the sensing sensitivity of the object capacitance (Cobj), so the smaller the value of Cd1 or Cd2 in FIG. 7B, the better. To reduce the value of Cd1 or Cd2, the wider the spacing (dpad) between the detection signal line 202 and the drive signal 201 or 203, the better, and the narrower the line width (Width, d_sig) of the detection signal line 202 and the drive signal 201 or 203, the better.

However, there is a problem that if the line spacing (d_pad) becomes too wide, the area of the CDA 100 that detects the object 20 is reduced due to the widening of the occupied area by the CDA signal lines 200, and a dead zone is formed due to the occupied area of the CDA signal lines 200, and a sensing inaccuracies occurs due to the reduction of the area that detects the object. Also, as the signal line width (d_sig) narrows, the resistance of the CDA signal line 200 increases, which increases the time to detect the signal.

To solve this problem, the signal line width of the far CDA is widened and the signal line width of the near CDA is narrowed. This manufacturing method reduces the value of the line resistance per unit length of the long signal line in the far distance and increases the value of the line resistance per unit length in the near distance, thereby reducing the variation of the resistance along the length of the signal line.

In an RC circuit formed by a resistance (R) and a capacitance (C), to reduce the time constant, RC, it is important to reduce the value of the capacitance, C, in addition to reducing the value of the resistance, R. The larger the length of the far signal line, the larger the magnitude of the line capacitance formed between the signal lines, and the smaller the length of the near signal line, the smaller the magnitude of the line capacitance formed between the signal lines. Therefore, by widening the line spacing (d_pad) between the far signal lines and narrowing the line spacing between the near signal lines, the magnitude of the line capacitance per unit length is different, and it is possible to reduce the deviation of the line capacitance due to the difference in the length of the far and near signal lines.

If, the same driving voltage is applied to the left driving line 201 and the right driving line 203, Cd1 and Cd2 can be equated to a single capacitance, represented by Cd, connected in parallel. As a result, it is possible to model that a charge flows through a single capacitance (Cd) even if a driving signal line is driven in two directions, left and right of a single detection signal line 202, and it is possible to establish [Equation 3] or [Equation 4] as described later. For this effect, two driving signal lines 201 and 203 adjacent to one detection signal line 202 are interconnected and the same driving voltage is applied.

Meanwhile, in order to apply a driving voltage to the above-described interline capacitance Cd, a plurality of driving lines 201 adjacent to the sensing line 202 must be selected and interconnected in pairs, and the same driving voltage must be applied to the interconnected driving lines, so a means for selecting the sensing line 202 and the plurality of driving lines 201 adjacent to the detection signal line 202 in the column is necessary. In the embodiment of FIG. 3, a pair of driving signal lines adjacent to the detection signal line 202 is selected, but in order to reduce the saturation time of the driving signal lines 201,203 for the applied driving voltage, a few of driving signal lines, such as two pairs or three pairs, may be selected and the driving voltage applied. A pair refers to the two driving signal lines adjacent to the detection signal line either on its left and right or above and below. Hence, one driving signal line on each side (left and right) of the detection signal line constitutes one pair of driving signal lines, while two driving signal lines on each side (left and right) form two pairs of driving signal lines.

Figure 7C:
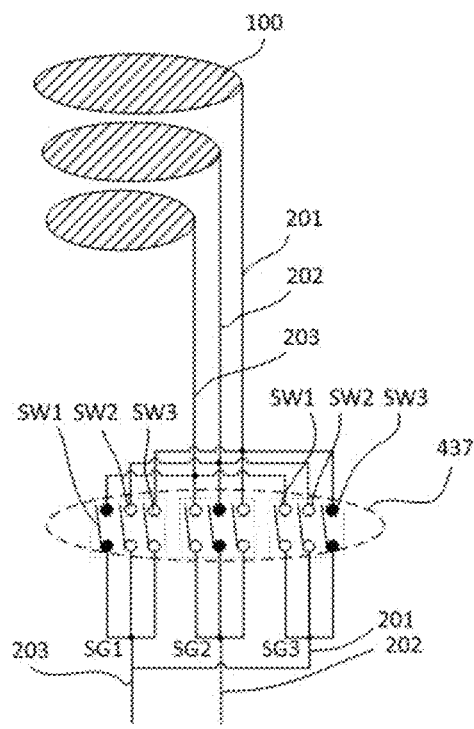
FIG. 7C is an embodiment of the present invention regarding a method for simultaneously selecting a driving signal line and a detection signal line.

FIG. 7C is an embodiment of the present invention regarding a method for simultaneously selecting driving signal lines 201,203 and detection signal lines 202. Referring to FIG. 7C, a detection/driving signal line switch group 437 (hereinafter, the sensing/driving switch group) comprising a plurality of switch groups (SG1 to SG3) is placed in one column. One of the switch groups comprising the sensing/driving signal line switch group 437, SG1 is a driving signal line switch group 437-2, hereinafter referred to as the driving switch group, which selects one driving signal line 203 adjacent to the detection signal line 202, SG2 is a detection signal line switch group 437-1, hereinafter referred to as the detection switch group, and SG3 is a driving signal line switch group 437-2, which selects a driving signal line 201 adjacent to the right of the detection signal line 202.

Each switch group (SG1 to SG3) is composed of internal switches 438, SW1 to SW3, and has an equal or greater number of switches than the CDA 100 included in a column.

The internal switch 438 comprising the detection/driving signal line switch group 437 is composed of a transistor, CMOS, TFT of LCD, PMOS or NMOS of OLED, or a combination of PMOS and NMOS, and is turned on or turned off by a turn-on/turn-off control signal applied to the gate.

More driving signal line switch group 437-2 may be installed than the two in FIG. 7C. As described above, the more driving signal lines 201 are selected, such as two pairs or three pairs of driving signal lines 201 instead of one pair, the more driving signal line switch group 437-2 are installed. For example, if three pairs of driving signal lines are selected, seven switch groups are installed, including one detection signal line switch group 437-1 and six driving signal line switch groups 437-2.

The CPU 460 or logic part inside the semiconductor IC 400 outputs a control signal line and a control signal to control the activation of the internal switch 438 in the switch group, and one detection signal line 202 connected to the internal switch 438 is selected by the turn-on of the internal switch 438 by the control signal.

The following is an embodiment of simultaneously selecting one detection signal line 202 and a plurality of driving signals 201 adjacent to the detection signal line 202 in one column.

FIG. 7C illustrates a single column of three CDAs 100, but in practice, a single column may include 20 or more CDAs 100. All the CDAs 100 in a column are connected to both a detection signal line switch group 437-1 and a plurality of driving signal line switch groups 437-2.

To select the detection signal line 202 of FIG. 7C, a turn-on voltage is applied to the (not shown) turn-on/turn-off control terminal of SW2 connected to the detection signal line 202 among the three internal switches 438 of the detection switch group (SG2) to turn SW2 on, A turn-off voltage is applied to the (not shown) turn-on/turn-off control terminals of the remaining internal switches 438, SW1 and SW3, to keep the SW1 and SW3 switches turned off. As a result, in the detection switch group SG2, the detection signal line 202 connected to the activated SW2 is selected and the signal is output through SW2.

Also, to select the driving signal line 201 to the right of the sensing signal line, SW3 of driving switch group (SG3) is turned on and SW1 and SW2 are turned off, and to select the drive signal line 203 to the left of the sensing signal line 202, SW1 of driving switch group (SG1) is turned on and SW2 and SW3 are turned off. This causes driving line 203 to be selected in driving switch group SG1 and driving line 201 to be selected in driving switch group SG3. The selected driving signal lines 201 and 203 are interconnected and connected to the driving unit 420 inside the semiconductor IC 400.

If the number of CDAs included in one column is assumed to be 25 in this specification, at least 25 internal switches 438 must installed in one switch group, so 75 turn-on/turn-off control signal lines for internal switches 438 of three switch groups (SG1, SG2, SG3) are required. Currently, there is a problem that the layout becomes complicated when the quantity of turn-on/turn-off control signal lines increases.

Figure 7D:
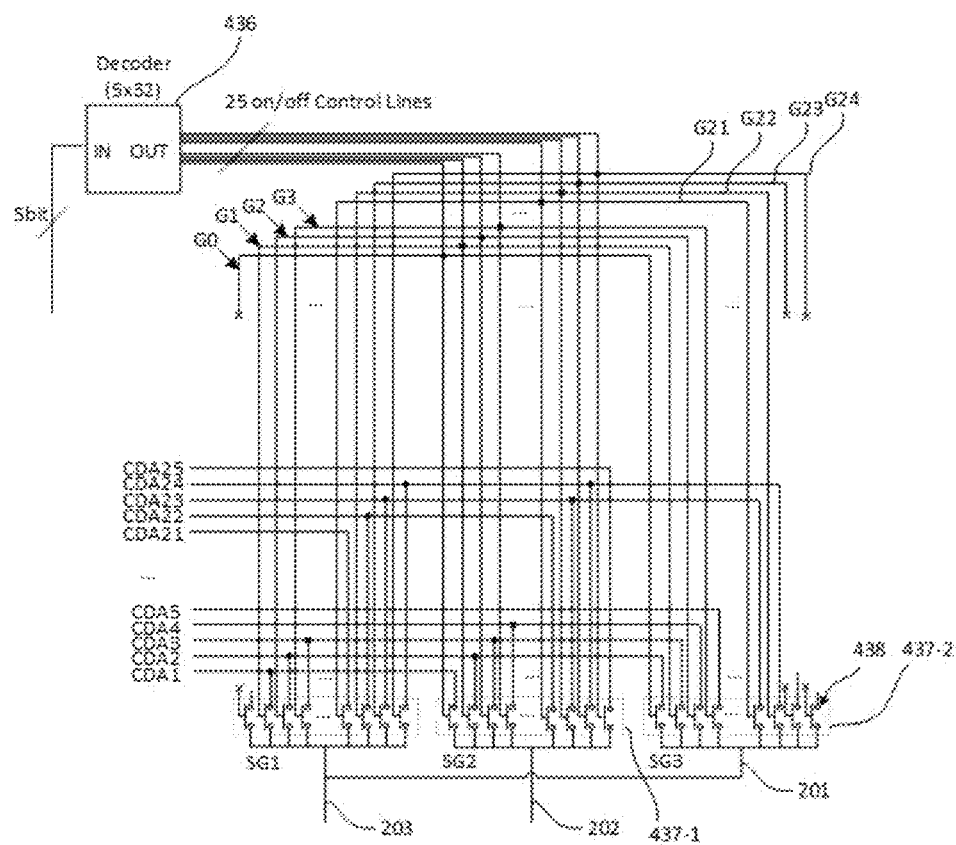
FIG. 7D is an embodiment of the present invention for reducing the number of switch control signal lines.

FIG. 7D is an embodiment of the present invention for reducing the number of switch control signal lines to address the above problems.

The embodiment of FIG. 7D is a detection/driving signal line switch group 437 included per a column, comprising one detection signal line switch group 437-1 and two driving signal line switch groups 437-2. It is assumed that 25 CDAs 200 are contained in each column, and all CDAs 100 are connected to the sensing/driving signal line switch group 437.

An embodiment of the present invention for reducing the number of turn-on/turn-off control signal lines of a switch group is to use a decoder 436. The decoder is a device that outputs $2^n$ signal lines for each of the n input signal lines, and outputs only one of the output signal lines in the high or low enable state.

Although only one decoder is shown in FIG. 7D, one decoder may be installed for each switch group. Since the 5×32 (5 inputs, 32 outputs) decoder outputs an enable signal to select and energize one of the 25 internal switches 438 with five decoder input signals, it is possible to achieve the same effect as the existing 25 turn-on/turn-off control signals with five decoder input signals, saving 20 signal lines. Therefore, if one decoder is installed for each switch group (SG1, SG2, SG3) in FIG. 7D, the existing 75 turn-on/turn-off control signal lines are reduced to 15.

In yet another embodiment, a single decoder 436 is applied to all sensing/driving signal line switch group 437.

Referring to FIG. 7D, the decoders installed separately in the three switch groups (SG1, SG2, SG3) require 15 input signals. If a single decoder 436 could fulfill the role of three decoders, the 15 input signals would be reduced to five.

When the 25 turn-on/turn-off control signals output by one decoder 436 are connected to the turn-on/turn-off control terminals of the internal switches 438 of the three switch groups 437-1,437-2, one turn-on voltage output by the decoder 436 turns on one internal switch 438 of the three switch groups 437-1, 437-2. If for each switch group, a detection signal is output through an internal switch and two driving signal lines can be selected, then it is possible for a single decoder to perform the same role as three decoders.

When the decoder 436 is placed inside the semiconductor IC 400, the signal level indicating high or low input to the decoder is the same as the signal level used by the CPU 460 or the logic section. If the decoder 436 is installed inside the display device 10, the signal level of the switching elements used in the decoder is different from the semiconductor IC 400. Therefore, signals output from the semiconductor IC 400 and input to the decoder 436 in the display device 10 need to pass through a level shifter 439 located between the decoder 436 and the semiconductor IC 400 to change the logic level.

In one embodiment, the magnitude of the turn-off voltage output from the semiconductor IC 400 is 0V and the magnitude of the turn-off voltage of the decoder 436 or internal switch 438 embedded in the display device 10 is −6V, And if the magnitude of the turn-on voltage output from the semiconductor IC is 3V and the turn-on voltage of the decoder 436 or the internal switch 438 placed in the display device 10 is 10V, the 0V voltage output from the semiconductor IC 400 should be converted to −6V by the level shifter 439, and the 3V voltage should be changed to 10V.

In the decoder 436, as many turn-on/turn-off control signal lines as the number of CDAs 100 included in the column are output, and a switch turn-on signal is authorized on only one of the signal lines. In the embodiment of FIG. 7D, 25 signals corresponding to G0-G24 are output to correspond to 25 internal switches 438, and only one of the 25 signals outputs a voltage to turn on the internal switch 438.

The internal switches 438 of each switch group are co-connected with turn-on/turn-off control terminals for each switch in the same order, and the output of the decoder 436 is continuously connected to the turn-on/turn-off control terminals of each co-connected internal switch 438.

Referring to the embodiment of FIG. 7D, the turn-on/turn-off control terminals of the first internal switch of each switch group are co-connected and connected to the G0 address of the decoder 436, the turn-on/turn-off control terminals of the second internal switch of each switch group are also co-connected and connected to the G1 address of the decoder, and the turn-on/turn-off control terminals of the internal switches 438 having a common sequence of all switch groups(or same position in all switch groups) are co-connected and the outputs of the decoder are connected consecutively from G0 to G25.

Even if the number of switch groups 437 is increased, such as five or seven instead of three as in the embodiment of FIG. 7D, the on/off control terminals of the same position of internal switches within all switch groups are jointly connected, and the output of one decoder 436 is successively connected to the turn-on/turn-off terminals of the jointly connected internal switches 438.

The number of output signals of the decoder 436 is 25, but if the number of output signals used is less than 25, only the required number of output signals are used. In the embodiment of FIG. 7D, 25 signals are output from the decoder 436, but only 24 are used in switch group 1 (SG1), 25 are used in SG2, and 23 are used in SG3.

Referring again to FIG. 7C, the present invention is characterized in that only the CDA signals 200 adjacent to the detection signal line 202 are selected as the driving signal lines 201 and 203. Among the plurality of CDAs 100 belonging to one column, the CDA 100 of long distant is called the first CDA, and if the CDAs are ordered in ascending order from long distant to near, the detection signal line and the driving signal line are combined as follows for the number of n CDAs.

<Combination of Detection and Driving Signal Lines>

(CDA1, CDA2), (CDA1, CDA2, CDA3), (CDA2, CDA3, CDA4), . . . , (CDA n−2, CDA n−1, CDA n), (CDA n−1, CDA n)

In the first case (CDA1, CDA2), CDA1 is the detection signal line 202 and CDA2 is the driving signal line. Below, the center of the brackets is the detection signal line and the left and right are the driving signal lines. In (n−1, n) when the last CDA number, n, is reached, n−1 is the driving signal line and n is the detection signal line.

To obtain such a combination, 1) the number of switch groups is required as much as the number of CDA signals 200 to be selected, and 2) the number of CDA signals 200 to be selected for turn-on/turn-off control signals of the same address output from the decoder 436 is such that when the nth detection signal line is selected in the detection switch group, the (n−1)th driving signal line is selected in one of the driving switch groups and the (n+1)th driving signal line is selected in the other driving switch group. Since the one output of the decoder 436 is connected to all switch groups equally, one CDA 100 is selected in each switch group for one enable signal output from the decoder 436, resulting in simultaneous output of the detection signal line and the driving signal line.

If the driving signal line should be selected in more than one pair instead of a single pair, the driving signal lines of "(CDAn±1), (CDAn±2), (CDAn±3) . . . (CDAn±m), m=1, 2, . . . , m. m is the number of pairs" are selected for the nth CDA selected in the detection switch group.

To make this selection, based on the CDA signal 200 connected to the detection switch group, one of the driving switch groups must be shifted left by one number and one of the other driving switch groups must be shifted right by one number. For each additional driving signal line, the number is shifted left and right by m pairs for each additional pair. For example, if two pairs of driving signal lines are required, in addition to the existing one, the second pair is shifted by two numbers to the left and two numbers to the right based on the CDA signal line 200 connected to the detection switch group.

Referring to FIG. 7D, when the output G2 of the decoder 436 is connected to the turn-on/turn-off control terminal of the internal switch 438 of the detection switch group SG2 and a CDA3 is connected to the input terminal of the internal switch 438, in the driving switch group SG1, the CDA number is shifted one number to the right relative to the sensing switch SG2, so that a CDA2 is connected to the input terminal of the internal switch 438 using the same decoder output G2. In the other detection switch group SG3, the number is shifted by one to the left compared to the detection switch group SG2, and CDA4 is connected to the input terminal of the internal switch 438 that uses the same decoder output G2. Since the CDA signal 200 is not connected to the first or last internal switch 438 as it is shifted left or right in the driving signal line switch group 437-2, the number of internal switches 438 in the driving switch group is reduced by the shifted number.

If no decoder is used, 75 control signal lines are required for three switch groups, but if one decoder 436 is used for each switch group, it is reduced to 15 control signal lines, and if only one decoder of the present invention is used, the same effect can be achieved with 5 control signal lines. When the detection/driving signal line switch group 437 and the decoder 436 are placed in the display device 10, due to the above reduction of signal lines, the number of signal lines transmitted from the semiconductor IC 400 to the display device 10 via the material for connection 300 is dramatically reduced, thereby reducing the area of the semiconductor IC 400. And since the area of the junction 301 connecting the material for connection 300 and the display device 10 is reduced, the modularity of the display device 10 is facilitated, and there are many advantages, including the convenience of layout due to the reduction in the number of signal lines contained within the display device 10.

Referring again to FIG. 3, the material for connection 300 is manufactured as a flexible printed circuit (FPC) or a chip on film (COF) or a tape carrier package (TCP), and a semiconductor IC 400 is located on one side of the material for connection 300. The junction 301 on one side of the material for connection 300 is bonded to the display device 10, and is connected to a PCB or the like (not shown) through a connection 302 formed on another side, and necessary signals are input from the PCB or the like to the semiconductor IC 400 through the connection 302.

The semiconductor IC 400 can be directly mounted in the form of a COG (Chip One Glass) on one side of the top surface of the display device 10 or on the same layer where the DDI (Display Drive IC) of the display device is mounted, and external signals are input to the semiconductor IC 400 through the material for connection 300 where the semiconductor IC 400 is not mounted.

In another embodiment, the semiconductor IC 400 can be mounted on components like a PCB or FPC, rather than on the display device 10 or the material for connection 300 and can be connected to the display device 10 through the material for connection 300. In yet another embodiment, the semiconductor IC 400 can be integrated with the DDI (Display Drive IC) that drives the display device 10 and can be situated within the DDI.

FIG. 8 is one embodiment of the present invention with respect to a semiconductor IC 400 configuration.

Referring to FIG. 8, there are four CDA columns consisting of three CDAs 200, and the CDA signal line 200 connected to the CDA 100 is connected to the signal line input pin 401 of the semiconductor IC 400. The signal line 200 connected to the signal line input pin 401 is simultaneously connected to the detection signal line switch group 437-1 and the driving signal line switch group 437-2.

The driving signal line switch group 437-2 is shown as one but may comprise two switch groups (SG1 and SG3), or may comprise a plurality of four or more switch groups, as in the embodiment of FIG. 7D.

In one column, one detection signal line 202 is selected through a dedicated detection signal line switch group 437-1, so in four columns, four detection signal lines 210 to 240 are selected, and in dedicated driving signal line switch group 437-2 placed in each column, driving signal lines 210-1 to 240-1 are selected for each column and input to the driving unit 420. In the embodiment of FIG. 8, the driving unit is shown as being separated into two units, but this is for illustrative purposes only and may be separated into one or a greater number of actuation units.

In the embodiment of FIG. 8, a component such as the detection/driving signal line switch group 437 or the loader 450 or the AMP input signal line selector 430 (not shown) connected to the loader 450 may be embedded and placed in the display device, and in this case, the detection signal line 202 output from the component embedded in the display device is connected to the signal line input pin 401.

The detection signal line 210 or 240 selected in each column is input to the first group loader 450-1 and the second group loader 450-2. The loader is a device that outputs all signals input to the loader 450 by the "LD" enable signal, which is an output control signal generated by the logic section of the signal detection unit 410 or the CPU 460.

Preferably, one loader 450 is placed per column group. The loader 450 includes as many switching elements as there are CDA columns in the column group. The loader 450 is manufactured as a combination of PMOS, NMOS, or CMOS in the semiconductor IC 400, and when the loader of the present invention is placed in the display device 10, it is composed of a-si or oxide, or PMOS or NMOS of an LTPS TFT or OLED, and a combination thereof, which is used as a pixel switching element of the display device 10, and is composed of the same switching element as the switching element used in the display device. The switching element used in the loader 450 or the detection/driving signal line switch group 437 is a switch that transmits the incoming signal without loss and is referred to as a "transfer switch" in this specification.

One method of outputting all signals input to the Loader 450 by the enabled "LD" signal is that the LD signal is connected to the turn-on/turn-off terminals of all switches comprising the Loader 450, and all switches of the Loader 450 are turned on simultaneously by the LD Enable signal of high or low, so all signals input to the Loader 450 are output simultaneously.

When a CDA signal input to the Loader is output, the output CDA signal is called an "Output Element" of the Loader. "Same output element" means a signal output from a CDA column at the same position in a column group. In one embodiment, if one signal line from the CDA column in the third position of group 1 is input to Loader1 and output to out3 pin, and one signal line from the CDA column in the third position of group 3 is input to Loader3 and output to out3 pin, the two signals are the same output element, and if the two signal lines are connected, the same output element is connected.

As shown in the embodiment of FIG. 8, the set of columns may be separated into two groups, such as a Left Side Group comprising only left columns and a Right-Side Group comprising only right columns that comprise the apparatus of the present invention. In another embodiment, the groups may be separated into two groups, such as an Odd Group comprising only odd columns and an Even Group comprising only even columns, and in some embodiments, the groups may be separated into three repeating groups or four or more repeating groups.

The left and right grouped embodiments in FIG. 8 include only two columns on the left and two columns on the right for convenience, but in practice, each group may include 10 or more columns.

The plurality of detection signal lines output from the plurality of columns comprising the same group are aggregated and connected to the dedicated loader 450 of that group.

Referring to FIG. 8, the two column detection signal lines 210 and 220 of the left group consisting of two columns are connected to the first group loader 450-1, and the two column detection signal lines 230 and 240 of the right group are connected to the second group loader 450-2. Assuming that the number of columns in the left group is 10, 10 detection signal lines are connected to the first group loader 450-1 dedicated to the left group.

The semiconductor IC 400 of the present invention utilizes an ADC and a DAC to detect the object capacitance Cobj in the form of a voltage. A plurality of ADCs or DACs may be used, preferably one DAC and one ADC. If one DAC and one ADC are used, the plurality of groups can be processed in a time-division multiplexing operation. For example, when the left group is processed, the right group is not processed, and when the processing of the left group is completed and the processing ends, the processing of the right group is started, and when the processing of the right group ends, the processing of the left group is started again, and so on, and the start and end of the processing is repeated for each group, and the operation where a single ADC and a single DAC function only in the group where processing begins is referred to as time-division multiplexing operation (or time-division method).

Although it is possible to process the detection signal lines of all columns included in the present device simultaneously, there is a problem that the operating time of the time-division ADC and DAC increases as the number of columns increases, causing discharges to occur in the detection signal lines of the columns that are processed later, resulting in distortion of the detected signal.

Therefore, it is a good idea to divide the column groups as much as possible, process only a limited number of detection signal lines in a column group, and then process the next group to avoid distortion of the signal due to discharge of the sensing signal. The more groups, the better, but it is usually preferable to separate them in the range of 2 to 4 because it takes a lot of time to prepare the signal for sensing.

As such, the apparatus of the present invention is characterized in that it comprises a plurality of groups, one column group comprising a set of a plurality of columns, and a different processing start time for detecting the object capacitance (Cobj) for each column group. In a later embodiment, when transmitting a Tx signal for a pen that does not utilize an ADC or DAC or receiving an Rx signal for a pen, it is possible to perform simultaneously in a plurality of column groups.

All detection signal lines 250 simultaneously output from the loader 450 are delivered to the signal detection unit 410. The signal detection unit 410 is composed of a differential amplifier or an AMP input signal line selector 430-2 or an ADC or a DAC, and sequentially selects the input detection signal lines 250 to extract the magnitude of the object capacitance Cobj in the form of a voltage by a time division method.

The signal detection unit 410 detects the voltage defined in [Equation 4], and the detected voltage is digitized by the ADC and stored in memory, and the data stored in memory is transmitted to the CPU 460, and the CPU calculates whether an object appears or the location of the object, and the calculated information is transmitted to the Host CPU located outside the semiconductor IC 400. The CPU 460 inside the semiconductor IC 400 and the memory storing the data of the ADC may be located outside the semiconductor IC 400, and the Host CPU may serve as the CPU of the semiconductor IC 400.

Meanwhile, the semiconductor IC 400 may include a CPU 460, or a logic part that controls the components used in the device, such as a memory or a switch group/decoder/loader/AMP input signal detection part, or a power supply, or an oscillator or level shifter 439, or all the components mentioned in this specification for implementing the device of the present invention, and general circuit elements used for signal analysis, or software for driving the CPU 460.

The semiconductor IC 400 includes multiple insulating layers and multiple conductive layers stacked in a specific pattern on a substrate 461 and includes multiple components with electrical characteristics and multiple wiring. For example, a source metal layer or a gate metal layer or a power layer or a GND layer or a signal for any purpose constitutes a conductive layer (Signal Layer). Since these signal layers are patterned with conductive metals, they are separated by an insulating layer to avoid short circuits with neighboring signal layers.

Figure 9:
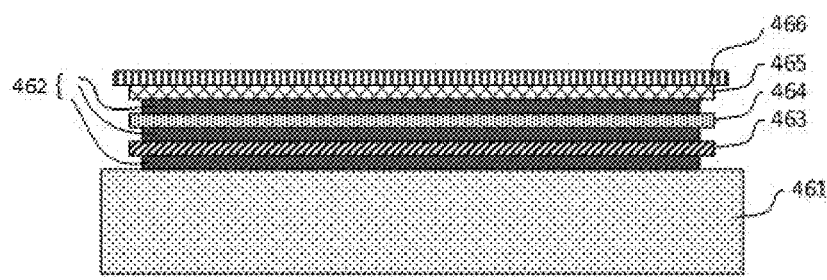
FIG. 9 is an embodiment of a layer configuration of a semiconductor IC.

FIG. 9 is an embodiment of a layer configuration of the semiconductor IC 400. Referring to FIG. 9, an insulating layer 462 is disposed on a top surface of a semiconductor silicon substrate 461, and a first signal layer 463, a second signal layer 464, and a third signal layer 465 are disposed on the top surface of the insulating layer. Each signal layer is patterned with lines made of metal, and the patterned lines transmit signals, supply power, or serve as a ground. Three signal layers are illustrated in this embodiment, but more than three signal layers may be used.

Referring again to FIG. 8, the detection signal lines 202 of the present invention are categorized by several different names depending on their location in the semiconductor IC 400, such as Pin input signal line 200-1, column detection signal line 210 to 240, and group detection signal lines 250-1 and 250-2. The Pin input signal line is the detection signal line 200-1 in the path where the CDA signal line 200 connected to the input pin 401 is input to the detection signal line switch group 437-1, and the detection signal line output from the detection signal line switch group 437-1 and input to the loader 450 is the column detection signal line, and the detection signal line output from the loader 450 is called the group detection signal line.

In a typical embodiment, these three types of detection signal lines are patterned and disposed in a specific pattern at any location between the first signal layer 463 and the third signal layer 465, wherein the three types of detection signal lines 200-1, 210-240, and 250-1/250-2 are form two capacitances with magnitudes of $$Cprs1 = \varepsilon \frac{S1}{d1} \text{ and } Cprs2 = \varepsilon \frac{S2}{d2}$$

according to a facing distance (d1) and facing area (S1) from the lower semiconductor substrate 461 or a facing distance (d2) and facing area (S2) from the upper "other signal lines", and the parallel combined capacitance of these two capacitances (Cprs1+Cprs2) forms the internal parasitic capacitance in the IC, represented by $$Cprs = \varepsilon \frac{S}{d}.$$

Since the internal parasitic capacitance (Cprs) is formed by the semiconductor IC internal signal lines 200-1, 210-240, 250-1/250-2, which are extensions of the detection signal line 202, it is equivalent to one end being connected to a point P representing the detection signal line 202 and the other end being connected to a power source (Vprs) provided by the semiconductor substrate 461 or "other signal line" as shown in the embodiment of FIG. 1.

There are two problems with these IC internal parasitic capacitances (Cprs), the first being sensing errors due to signal interference.

The "other signal lines" inside the semiconductor IC 400 are clock-synchronized logic signals, power, oscillator, or analog signals. Among the input and output signal lines of the various signals inside the IC 400, when the logic signal lines, clock signal lines, or oscillator signal lines and the CDA sensing lines 200-1, 210-240, 250-1/250-2 inside the semiconductor IC 400 are facing, noise is introduced by coupling through the internal parasitic capacitance Cprs1 or Cprs2 formed between the opposing surfaces, and this noise affects the CDA detection signal lines 200-1, 210-240, 250-1/250-2, causing signal distortion to the detection signal lines 200-1, 210-240, 250-1/250-2, resulting in a signal sensing error.

To solve this problem, the layout of "other signal lines" that cause noise are sometimes avoided on the upper or lower sides of the internal CDA sensing lines 200-1, 210-240, 250-1/250-2, which reduces the freedom of patterning design and increases the difficulty of development.

The second problem caused by the IC internal parasitic capacitance Cprs is that the length of the path, 200-1, 210-240, 250-1/250-2, from the signal line input pin 401 to the signal detection unit 410 in FIG. 8 is different for most of the sensing signal lines. Due to the difference in path length, the value of the internal parasitic capacitance (Cprs) is different for each sensing signal, and this causes a deviation from the result of [Equation 4], which expands the coverage of the ADC and reduces the resolution.

The present invention solves the above problems by installing a conductive shielding area on the upper layer or the lower layer of the IC internal signal lines 200-1, 210-240, 250-1/250-2, and applying a DC voltage or a driving voltage to the installed shielding area, to reduce the deviation of the output voltage of [Equation 4] due to the difference in the value of the internal parasitic capacitance (Cprs) of the detection signals 200-1, 210-240, 250-1/250-2 inside the semiconductor IC 400 or to prevent the introduction of noise due to coupling. Preferably, the IC internal detection signal lines 200-1, 210-240, 250-1/250-2 are placed on the top surface of the semiconductor IC 400, and a conductive shielding area is placed at the bottom of these signal lines to further reduce the value of the shielding capacitance Cin_sd, and a driving voltage is applied to this shielding area to detect the signal.

Figure 10:
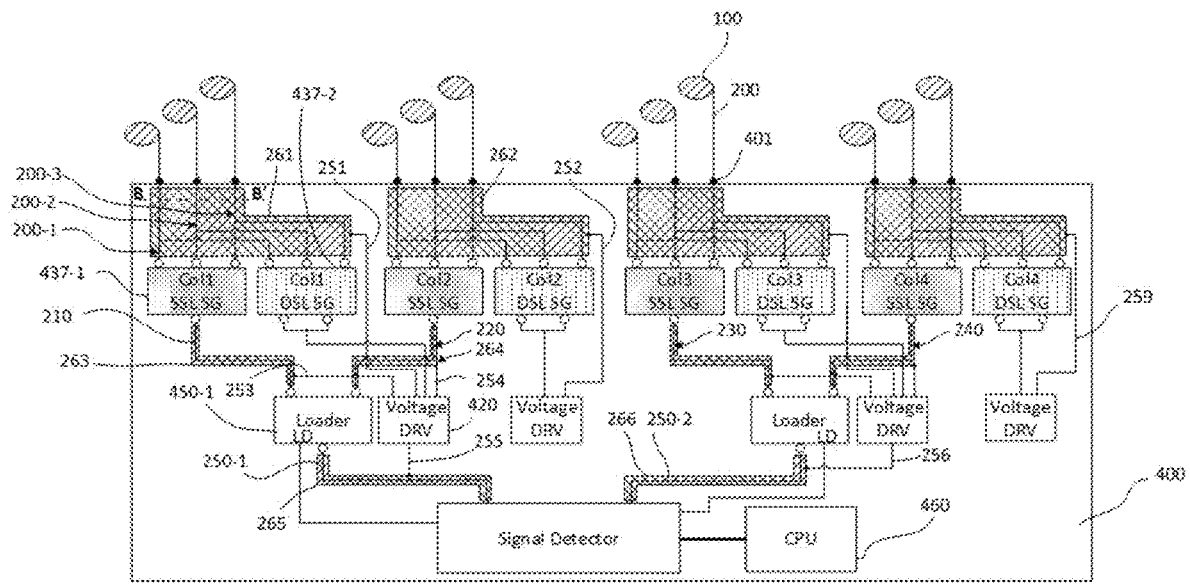
FIG. 10 is an embodiment of the present invention in which a shielding area is added to a signal line inside a semiconductor IC.

FIG. 10 is an embodiment of the present invention in which a shielding area is added to the detection signal lines 200-1, 210-240, 250-1/250-2 inside the semiconductor IC 400, and FIG. 1A is a cross-sectional view of B-B' located in column 1 of FIG. 10.

Figure 11A:
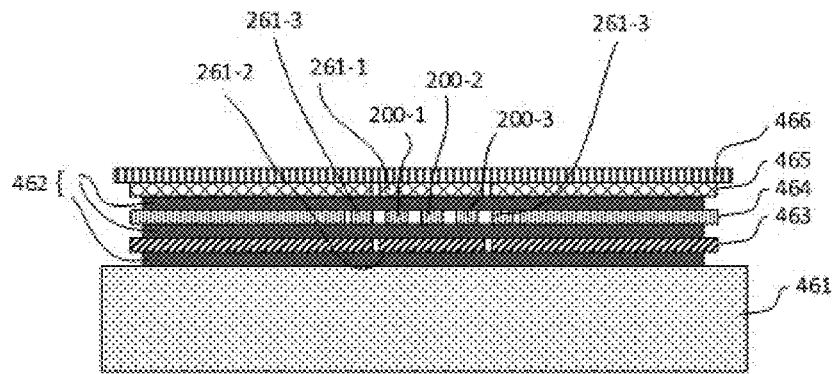
FIG. 11A is a cross-sectional view of FIG. 10 B-B'.

Referring to FIGS. 10 and 11a, the column 1 first shielding area 261 is placed on the upper signal layer 465 and the lower signal layer 463 of the signal layer 464 of the semiconductor IC 400 to which the pin input signals 200-1 of column 1 are patterned.

Also, the column 2 first shielding area 262 is placed in the upper and lower signal layers of the pin input signal 200-1 input to column 2, and the column 3 first shielding area and the column 4 first shielding area are installed in the remaining columns 3 and 4.

Referring to FIG. 11A, which is a cross-sectional view of B-B' of the column first shielding region 261, the pin input signal lines 200-1 to 200-3 are disposed in the second signal layer 464, which is an intermediate layer of the signal layer of the semiconductor IC 400, On the upper side of the three signal lines 200-1 to 200-3 disposed in the second signal layer 464, the upper shielding area 261-1 of the column 1 first shielding area 261 is disposed, and the lower shielding area 261-2 of the column 1 first shielding area 261 is disposed. In other words, the column 1 first shielding area 261 is divided into the upper shielding area 261-1 and the lower shielding area 261-2 and is disposed on the upper and lower sides of the detection signal line 200-1 to 200-3.

The upper shielding area 261-1 and the lower shielding area 261-2 are electrically connected to each other by contact points at any point to connect to the column 1 first shielding area driving signal line 251. The column 1 first shielding area driving signal line 251 is connected to the driving unit 420 to apply a driving voltage to the column 1 first shielding area 261.

When a stable DC voltage is applied to the column 1 first shielding area 261 of the present invention placed on the upper and lower sides of the detection signal lines 200-1 to 200-3, the coupling due to capacitance formed between the detection signal line 200-1 and the "other signal line" (present on the upper or lower side of the shielding region) of the other signal layer (not shown) is blocked by the first shielding region 261, accordingly noise interference due to the coupling does not occur. Furthermore, when a driving voltage is applied to the first shielding area, the deviation of the voltage detected on the detection signal line 202 is reduced as described later, which has the advantage of improving the resolution by reducing the ADC coverage.

In addition, since there are "other signal lines" on the left and right sides of the detection signal line 200-1, it is desirable to apply DC voltage or driving voltage by placing shielding areas 261-3 on the left and right sides of the detection signal line 200-1. At this time, the shielding areas 261-3 located on the left and right sides of the detection signal line 200-1 are connected to the column 1 first area driving signal line 251 or the upper shielding area 261-1 or lower shielding area 261-2 of the column 1 first shielding area at any point using the contact point technique of the semiconductor manufacturing process.

All column detection signal lines 210/220/230/240 are also placed in the middle layer 464 of the semiconductor metal layer, and second shielding areas 263,264 are placed on the upper 465 and lower 453 signal layers and on the left and right sides. In addition, group 1 third shielding area 265 and group 2 third shielding area 266 are placed on the upper and lower layers and on the left and right sides of group 1 detection signal line 250-1 and group 2 detection signal line 250-2. In addition, shielding area driving signal lines are connected with each shielding area and connected to the driving unit 420.

In embodiments of the present invention, the first shielding area, the second shielding area, and the third shielding area are hypothetical zones introduced to illustrate embodiments of the shielding area. In practice, they may be further subdivided, or reduced to one or two. The important point is that a shielding area is placed on all paths of the detection signal line 202 until it reaches the signal detection unit 410 through the layout inside the semiconductor IC 400, and the shielding area is connected to the shielding area driving signal line to connect with the driving unit 420, and the driving unit 420 applies a driving voltage according to the drive method of FIG. 14, which will be described later.

As described above, one detection signal line 202 is connected to the input pin 401 of the semiconductor IC 400, and a shielding area is placed on the upper or lower side or left or right side of all paths input to the signal detection unit 410, and when a signal is not detected, a stable DC voltage is supplied to the shielding area to block noise. And when detecting a signal, the drive voltage is applied so that the term of the shielding capacitance is located in the numerator of [Equation 1], in this configuration, the internal parasitic capacitance (Cprs) that was the cause of deviation in detected values is eliminated, and instead, the deviation of the voltage detected from the detection signal line 202 due to the drive of the shielding capacitance is reduced, providing the advantage of improving the resolution of the ADC.

In the embodiment of FIGS. 10 and 11*a*, the detection signal line is placed inside the semiconductor IC 400, but it is possible to install the shielding area even if the sensing signal switch group 437-1, the driving signal switch group 437-2, and the loader 450 are embedded in the display device.

When the detection/driving signal line switch group 437 and the loader 450 are placed in the display device, the group sensing line 250 output from the loader 450 is input to the semiconductor IC 400 through the input pin 401 of the semiconductor IC 400, and the group sensing line 250 input to the semiconductor IC 400 is shielded in the same way as the embodiments of FIGS. 10 and 11*a* described above.

In the foregoing description of the location of the CDA 100 within the display device, if the display device is an OLED, a method of installing the shielding area of the present invention will be described with reference to the first embodiment.

The detection/driving signal line switch group 437 is placed in the area on the outer side of the OLED active display area and is generally placed in the non-display area of the screen between the end of the CDA signal line 200 and the semiconductor IC 400. The detection and driving signal lines input to the detection/driving signal line switch group 437 are located on the upper surface of the BM (Black Matrix) located between the pixels of the OLED but are disposed on the upper side of the insulator located on the upper surface of the cathode of the OLED.

To install the column first shielding area 261,262, it is possible to install the shielding area again after the insulator layer on the top surface of the cathode and place the CDA signal line 200 after forming the insulator layer on the top surface of the shielding area, but it is undesirable because it complicates the process of OLED, so the shielding area is not installed for the CDA signal line 200 placed on the top surface of the BM layer.

It is common for the source data line or gate line of the OLED to be located on the lower side of the column detection signal line 210,220 between the detection/driving signal line switch group 437 and the loader 450, and the signal of the column detection signal line 210,220 between the detection/driving signal line switch group 437 and the loader 450 is affected by coupling due to fluctuations in the voltage for displaying the screen applied to the source data line or gate line. For these reasons, it is desirable to install the column second shielding area 263,264 on the signal line between the detection/drive switch group 437 and the loader 450 in the present invention. When the display is an OLED, the switching elements comprising the detection/driving signal line switch group 437 and the loader 450 are placed in a region outside the cathode of the OLED, so the second shielding regions 263,264 of the columns placed between the detection/driving signal line switch group 437 and the loader 450 are not placed facing the cathode of the OLED.

In the present invention, the column second shielding area 263,264 installed on the OLED is positioned on the periphery of the display area and is located beneath the column detection signal line 210,220 connecting the detection/drive switch group 437 and the Loader 450. The column second shielding areas 263,264 are connected to the driving unit 420 of the semiconductor IC 400, and the first stage driving voltage and the second stage driving voltage are applied to detect the object capacitance.

A level shift 490 may be positioned between the column second shielding regions 263,264 and the drive unit 420.

On the other hand, in the embodiment of FIGS. 10 and 11A, the column first shielding area covers all detection signal lines 200-1 to 200-3 included in the shielding area and drives the shielding area with one shielding area driving signal line, but it is possible to install individual shielding areas for each detection signal line, such as a dedicated shielding area for detection signal line 200-1, a dedicated shielding area for detection signal line 200-2, and a dedicated shielding area for detection signal line 200-3, and apply a driving voltage to each individual shielding area. In this case, there is a disadvantage of increasing the number of driving units to drive individual shielding areas, but there is an advantage of driving only the required shielding capacitance and reducing the area of individual shielding areas for driving, which reduces the capacitive loading, which reduces the current capacity of the driving element of the driving unit, which reduces the current consumption.

In the previous embodiment, the layout inside the semiconductor IC is modified to install shielding areas on the upper surface and the left and right sides of the detection signal lines 200-1,210-240,250-1/250-2. Capacitance is formed between the shielding area on the upper surface facing the detection signal line 200-1, 210~240,250-1/250-2 and the detection signal line 200-1,210-240,250-1/250-2, and between the detection signal line 200-1,210~240,250-1/250-2 and the shielding area on the left and right. The sum of these capacitances is called the shielding capacitance (Cin_sd).

The shielding capacitance (Cin_sd) is formed between the sensing signal line 202 and the shielding area, so the shielding capacitance (Cin_sd) can be equivalently modeled as having one side connected to the sensing signal line 202 and the other side connected to the voltage supplied to the shielding area. Furthermore, since the shielding capacitance (Cin_sd) is connected in parallel with the common electrode capacitance (Ccm) and the interline capacitance (Cd) from the sensing signal line 202, it can be modeled as shown in FIG. 12*b*, where one side is connected to the point P, representing the collective sensing signal lines, and the other side has the driving voltage (Vcin) applied.

Referring to [Equation 5] below, the calculation value before and after the object capacitance (Cobj) is added to the denominator is larger the smaller the value of the capacitance located in the denominator. Therefore, to improve the sensitivity of object capacitance sensing, the value of the capacitance in the denominator should be smaller.

One of the purposes of the present invention is to detect the presence or position of an object capacitance (Cobj) when an object capacitance (Cobj) such as a pen or finger is added, and to detect a digital signal output from the pen, and to achieve this purpose, it is necessary to improve the sensing sensitivity of the object capacitance (Cobj), A method of reducing the value of the common electrode capacitance (Ccm) by the empty area 150 is presented, and a design method of adjusting the line width (d_pad) of the detection signal line and the driving signal line to reduce the value of the interline capacitance (Cd) is presented. The shielding capacitance (Cin_sd) also affects the sensing sensitivity of the object capacitance (Cobj), so the smaller the value of the shielding capacitance, the better, and the following is a method for reducing the value of the shielding capacitance (Cin_sd).

The smaller the facing area between two conductors, the smaller the capacitance formed between them. Therefore, by narrowing the width of the sensing signal lines 200-1, 210-240, 250-1/250-2 that form the shielding capacitance (minimizing the facing area S), increasing the thickness of the insulator 462 between the sensing signal lines 200-1, 210-240, 250-1/250-2 and the shielding area (minimizing the facing distance d), and widening the gap between the detection signal lines and the shielding line on either side (also minimizing the facing distance d), the magnitude of the shielding capacitance (Cin_sd) decreases.

In the semiconductor IC 400 process, the minimum width of the metal comprising the sensing signal, 200-1,210-240, 250-1/250-2, and the thickness of the insulator 462 are mostly fixed and cannot be changed, so there are cases where the value of the shielding capacitance Cin_sd formed according to the minimum width of the metal and the minimum thickness of the insulator 462 according to the process conditions is not satisfactory.

To solve these problems, the present invention places the detection signal lines 200-1,210-240,250-1/250-2 on the top surface of the semiconductor IC 400 layout, so that there is no signal layer on the upper side of the detection signal lines 200-1,210-240,250-1/250-2, and installs a shielding area only on the lower side of the detection signal lines 200-1, 210-240,250-1/250-2. This design idea also applies to the case where the OLED or LCD has a built-in detection/ driving signal line switch group 437 and loader 450, and the column first shielding area 261,262 and column second shielding area 263,264 are placed in the display device, and there are no other signal lines on the upper side of the column first shielding area and the column second shielding area, and the shielding area is located only on the lower side. (In this specification, the direction of the upper and lower sides is defined based on the case where the substrate of the LCD or OLED is located at the bottom.)

Figure 11B:
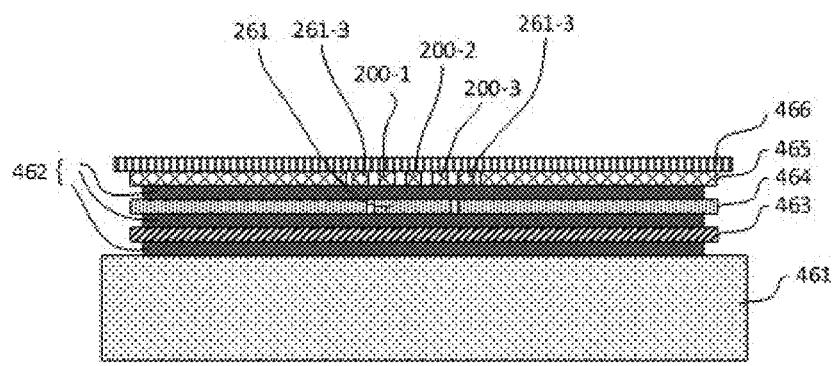
FIG. 11B is another embodiment of the present invention for implementing a shielding area.

FIG. 11B is another embodiment of the present invention for implementing a shielding area.

Referring to FIG. 11B, the three pin input signal lines 200-1 to 200-3 inside the semiconductor IC 400 are disposed on the top surface 465 of the metal layer of the semiconductor IC 400 (assuming that the substrate of the semiconductor IC is positioned at the bottom), and there is no metal layer for disposing "other signal lines" on the top surface of the pin input signal lines 200-1 to 200-3.

A column 1 first shielding region 261 is arranged on the lower side of the pin input signal line 200-1 to 200-3, and shielding regions 261-3 electrically connected to the column 1 first shielding region 261 are also placed on the left and right sides of the CDA signal line. This structure is applied to all detection signal lines placed in the semiconductor IC 400, including column detection signal lines 210 and 240 and group detection signal lines 250.

Compared to the embodiment shown in FIG. 11*a*, where the shielding areas are placed both above and below, as well as to the left and right of the sensing signal lines 200-1, 210-240, 250-1/250-2, this structure, with shielding areas only positioned on the bottom and on the sides, has the effect of reducing the shielding capacitance (Cin_sd) by about half.

As can be seen, the present invention is based on a CDA signal line 200 having 1) a common electrode capacitance (Ccm), 2) a interline capacitance (Cd), and 3) a shielding capacitance (Cin_sd) coupled in parallel with each other, and if the resistance of the CDA signal line 200 is not considered, the CDA signal line 200 is equivalent to a single point (P in FIG. 12), this is equivalent to the common electrode capacitance (Ccm), the interline capacitance (Cd), and the shielding capacitance (Cin_sd) being connected in parallel at the point (P).

Previously, the shielding capacitance (Cin_sd) was located only in the denominator of [Equation 4] in the form of an uncontrollable internal parasitic capacitance (Cprs), which served as an unnecessary dummy to reduce sensitivity, and in some cases, a capacitance consisting of a separate body was introduced to apply the driving voltage and added to the denominator of [Equation 4] to reduce sensitivity. However, in this invention, the internal parasitic capacitance, which served as an unnecessary dummy, is converted into a shielding capacitance, and the shielding capacitance is in the numerator of [Equation 4] by applying the driving voltage, and the sensitivity is improved by supplying additional charge.

Figure 12A:
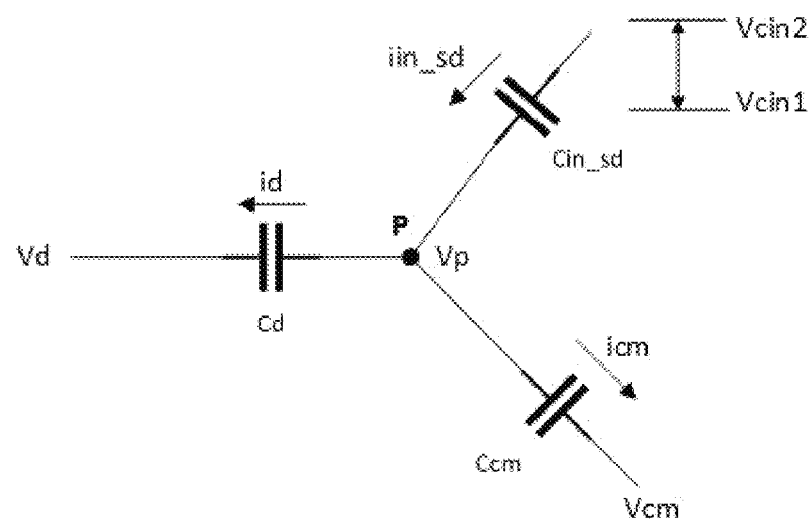
FIG. 12A is an embodiment of the present invention in which a driving voltage is applied to the shielding capacitor (Cin_sd).
Figure 12B:
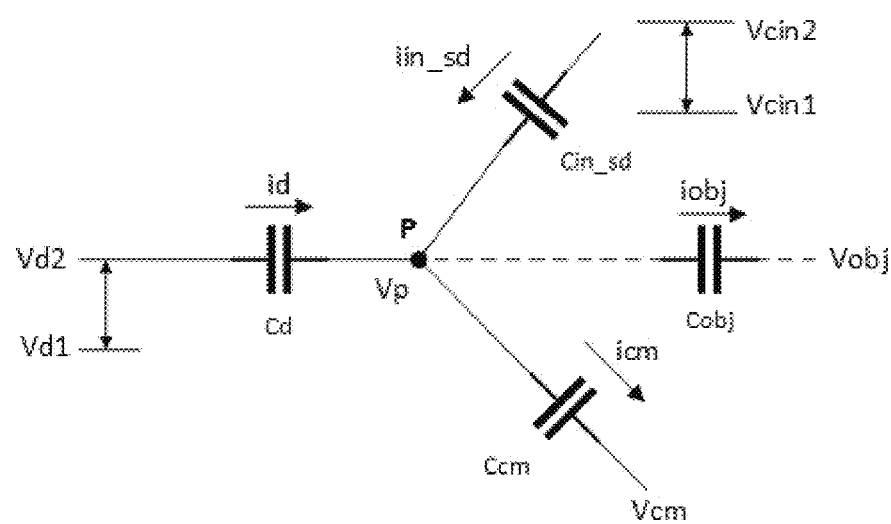
FIG. 12B is one embodiment of the present invention for detecting a voltage when an object capacitor is added.

FIG. 12A is an embodiment of the present invention in which a driving voltage is applied to the shielding capacitance (Cin_sd).

Referring to FIG. 12A, iin_sd=id+icm (where iin_sd is the current flowing in the shielding capacitor (Cin_sd), icm is the current flowing in the common electrode capacitor (Ccm), and id is the current flowing in the interline capacitor (Cd). Vd is the constant voltage applied to one side of the interline capacitor (Cd), and Vcm is the common electrode constant voltage applied to one side of the common electrode capacitor (Ccm). In addition, two driving voltages are applied to one side of the shielding capacitor (Cin_sd), which are categorized as Vcin1 and Vcin2.

iin_sd=Cin_sd*(Vcin−Vp), id=Cd*(Vp−Vd), icm=Ccm*(Vp−Vcm).

Since iin_sd=id+icm, and Cin_sd*(Vcin−Vp)=Cd*(Vp−Vd)+Ccm*(Vp−Vcm).

if we write this out for Vp, we get $$Vp = \frac{Cd*Vd + \text{Cin\_sd}*Vcin + Ccm*Vcm}{Cd + \text{Cin\_sd} + Ccm}.$$

Vp1, the voltage at point P when applying Vcin1 to the shielding capacitance (Cin_sd), $$Vp1 = \frac{d*Vd + \text{Cin\_sd}*Vcin1 + Ccm*Vcm}{Cd + \text{Cin\_sd} + Ccm}$$

and, Vp2, the voltage at point P when applying Vcin2 to the shielding capacitance (Cin_sd), $$Vp2 = \frac{Cd*Vd + \text{Cin\_sd}*Vcin2 + Ccm*Vcm}{Cd + \text{Cin\_sd} + Ccm}.$$

If the shielding capacitance (Cin_sd) is driven by two different voltages, Vcin1 and Vcin2, and the difference between Vp1 and Vp2 detected at P is equal to [Equation 3].

$$Vp2 - Vp1 = \frac{(Vcin2 - Vcin1)*\text{Cin\_sd}}{Cd + \text{Cin\_sd} + Ccm} \qquad \text{[Equation 3]}$$

FIG. 12B is an embodiment of applying the respective driving voltage to the interline capacitor (Cd) and the shielding capacitor (Cin_sd) and applying the driving voltage to the capacitance except the common electrode capacitor (Ccm).

Referring to FIG. 12B, a driving voltage is applied to the interline capacitance (Cd) and the shielding capacitance (Cin_sd). The interline capacitance (Cd) is driven by Vd1 and Vd2, and the shielding capacitance (Cin_sd) is driven by Vcin1 and Vcin2.

When a driving voltage is applied to two capacitors, the voltage Vp at point P can be obtained by the superposition theory by referring to [Equation 3].

The potential Vp at point P when the interline capacitance (Cd) and shielding capacitance (Cin_sd) are applied to the respective driving voltages is [Equation 4].

$$Vp2 - Vp1 = \frac{(Vd2 - Vd1)*Cd + (Vcin2 - Vcin1)*\text{Cin\_sd}}{Cd + \text{Cin\_sd} + Ccm} \qquad \text{[Equation 4]}$$

Figures 13A, 13B:
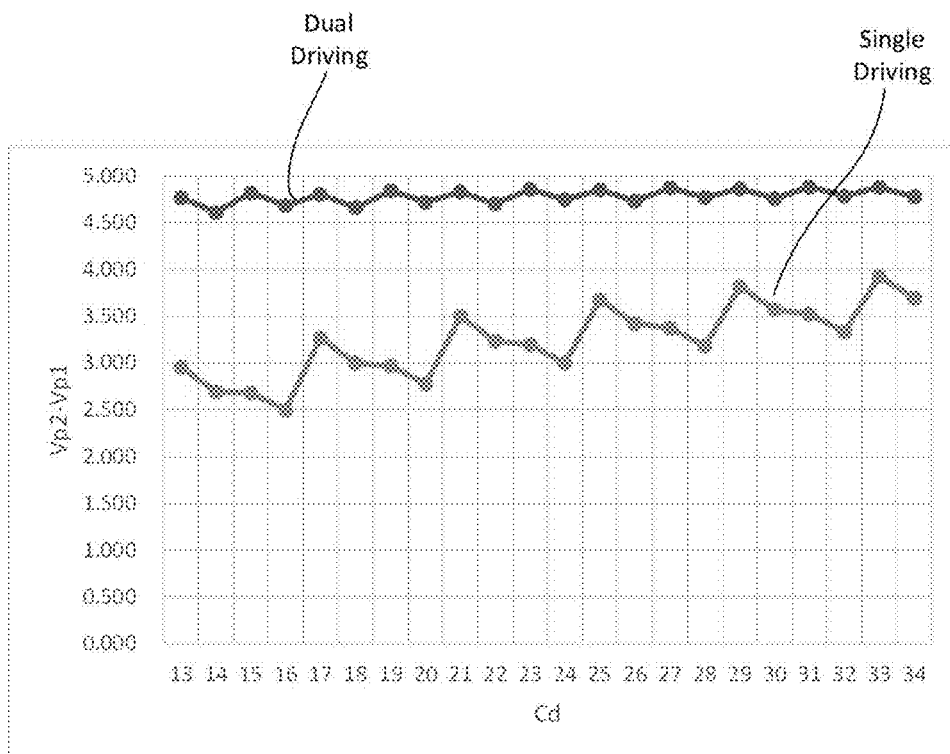
FIG. 13A is fictitious data to verify [Equation 3].
FIG. 13B is the resulting graph of [Equation 1] and [Equation 4] calculated based on the data in FIG. 13A.

FIG. 13A is a fictitious data to verify [Equation 4], and the simulation result of Vp2-Vp1 in the case of Dual Driving, which simultaneously drives two capacitances such as interline capacitance (Cd) and shielding capacitance (Cin_sd).

When applying the data from FIG. 13a to [Equation 1] and performing Single Driving only with the line capacitor Cd using Vd1 and Vd2 driving voltages, the difference between the maximum and minimum values of (Vp2−Vp1) is 1.429V. Based on [Equation 4], when driving the line capacitance (Cd), excluding the common electrode capacitance (Ccm), with Vd2 and Vd1, and driving the shielding capacitance (Cin_sd) with Vcin2 and Vcin1 in Dual Driving, the difference between the maximum and minimum values of (Vp2−Vp1) is 0.271V.

When a 10-bit ADC with a sensing range of 1.6V is used to detect 1.429V, which is (Vp2−Vp1) at the P point when single driving, the resolution is 1.56 mV/bit, and when a 10-bit ADC with a sensing range of 300 mV is used to detect 0.271V, which is (Vp2−Vp1) at the P point when dual driving, the resolution is about 0.3 mV/bit. So, the resolution is improved by about 5 times or more even if the driving method is different in the same capacitance configuration.

This phenomenon is because the capacitance to which no driving voltage is applied acts as a load capacitance that shares charge by the charge supplied by the capacitance to which the driving voltage is applied, but the capacitance to which the driving voltage is applied acts as a source that supplies charge, and within a certain value of mutually common-connected capacitances, the larger the value of the capacitance that supplies charge, the smaller the value of the load capacitance, resulting in a smaller voltage difference for the same driving voltage. In addition, the more capacitance is driven, the greater the charge sharing in the added object capacitance (Cobj), which has the effect of improving sensitivity.

Since the voltage difference (Vp2−Vp1) caused by the driving voltage is caused by the deviation of the non-driven load capacitance from the total capacitance, the deviation of Vp2−Vp1 becomes smaller as the proportion of the non-driven capacitance in the total capacitance (the capacitance in the denominator of Eq. 4) decreases. Based on this principle, the present invention proposes a method to reduce the value of the capacitance located in the denominator of [Equation 4] and converts the internal parasitic capacitance (Cprs) that cannot apply the driving voltage into a shielding capacitance (Cin_sd) that can apply the driving voltage. As a result, the deviation of the voltage detected on the detection signal line 202 before and after applying the driving voltage is reduced, which improves the resolution of the ADC by narrowing the sensing range, i.e., the coverage, and improves the sensing sensitivity of the added object capacitance (Cobj).

Meanwhile, FIG. 13B is the resulting graph of [Equation 1] and [Equation 4] calculated based on the data in FIG. 13A and shows Vp2–Vp1 for Single Driving based on [Equation 1] and Dual Driving based on [Equation 4] under the same conditions.

In the case of Single Driving, the common electrode capacitance (Ccm) and internal parasitic capacitance (Cprs) act as load capacitance, resulting in a large deviation of Vp2–Vp1. And in the case of Dual Driving, only the common electrode capacitance (Ccm) operates as the load capacitance, and the deviation of Vp2–Vp1 is mostly caused by the deviation of the common electrode capacitance (Ccm), so it can be seen that the fluctuation range of Vp2–Vp1 is stable for a relatively small deviation of the common electrode capacitance (Ccm).

Referring again to FIGS. 13a and 13b, it can be expected that if the value of the shielding capacitance (Cin_sd) is constant, the fluctuation of the voltage detected at point P will be smaller.

Since the value of the shielding capacitance (Cin_sd) is mainly determined by the linewidth of the detection signal line, 200-1,210-240,250-1/250-2, inside the semiconductor IC 400, it is possible to set the value of the shielding capacitance by the detection signal line, 200-1,210~240, 250-1/250-2, almost similarly for each signal line by adjusting the signal line width. In one embodiment, a signal line with a long length of the detection signal line narrows the linewidth to a minimum linewidth to reduce the value of the shielding capacitance (Cin_sd), and a signal line with a short length of the detection signal line widens the linewidth to increase the value of the shielding capacitance (Cin_sd). Since the length of the detection signal line can be calculated in the semiconductor IC 400, it is possible to keep the value of the shielding capacitance (Cin_sd) constant for each detection signal line by designing and manufacturing the area multiplied by the signal line width and length to be the same for all detection signal lines.

In this way, the present invention adjusts the width of the internal detection signal lines, 200-1, 210/240, 250-1/250-2, in the semiconductor IC 400, narrowing the width of the longer signal lines compared to the shorter ones. As a result, the area differences among the detection signal lines become negligible. Consequently, even though the lengths of the detection signal line, 200-1, 210/240, 250-1/250-2, differ, the value of the shielding capacitance (Cin_sd) they form is similar. This reduces the deviation of (Vp2–Vp1) as dictated by [Equation 4].

So far, applying the driving voltage is applying two voltages of different values to the capacitance.

Figure 14:
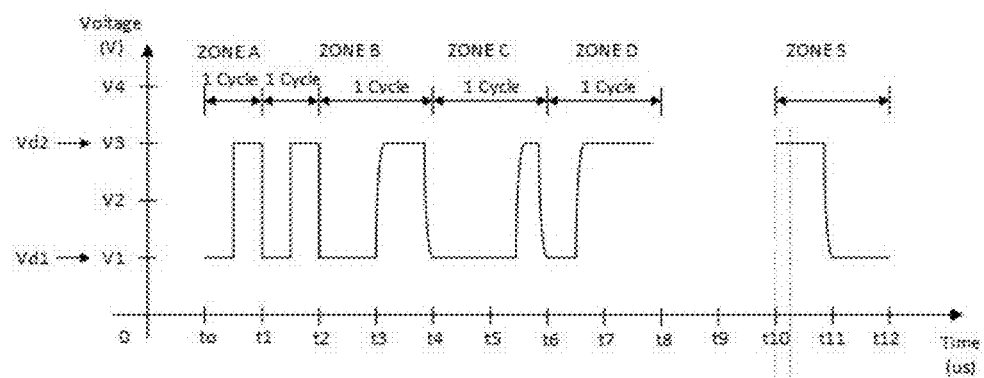
FIG. 14 illustrates one embodiment of the present invention for applying a driving voltage.
Figure 14:
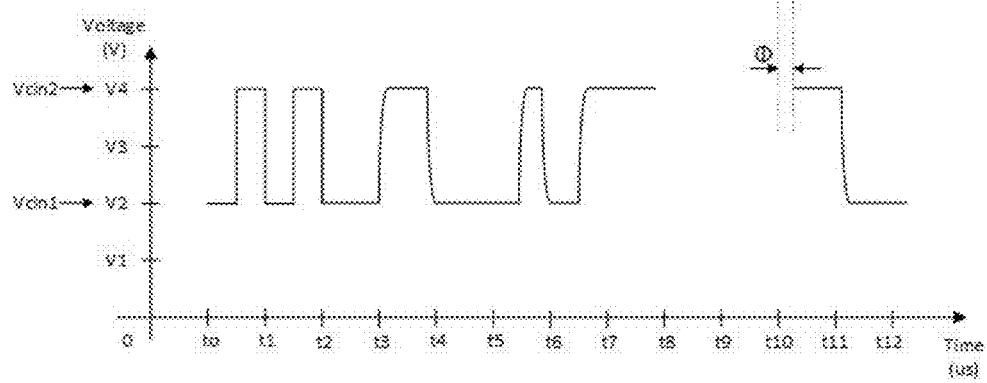

FIG. 14 illustrates one embodiment of the present invention for applying a driving voltage.

Referring to FIG. 14, the upper diagram is an embodiment of a method of applying a driving voltage (Vd2, Vd1) to a interline capacitance (Cd), and the lower diagram is an embodiment of applying a driving voltage (Vcin2, Vcin1) to a shielding capacitance (Cin_sd), wherein the driving voltage has the following characteristics.

1. The driving voltage is composed of high and low voltage, and the combination of high and low voltage constitutes one cycle time. As a result of the change of the driving voltage, a charge increases or decrease occurs in the driven capacitance, and a charge sharing phenomenon occurs in the non-driven capacitance according to this charge increase or decrease, and the voltage change occurring in the non-driven capacitance can be detected.

2. Different cycle times may be applied depending on the location of the CDA 100.

For example, the line resistance and interline capacitance (Cd) of the CDA signal line 201 at a far distance from the semiconductor IC 400 is larger than the line resistance and interline capacitance (Cd) of the CDA signal line 203 near the semiconductor IC 400, so the signal requires more time to reach a saturation state. Therefore, the cycle timer of the driving voltage supplied to the far CDA signal line should be longer than the cycle time supplied to the near CDA.

Referring to ZONE A in FIG. 14, it has a cycle time of 50% compared to ZONE B or ZONE D. The cycle time of ZONE A is applicable to the CDA 103 located near the semiconductor IC 400. This cycle time of ZONE A can be applied to the CDA 103 located near the semiconductor IC 400, and a cycle with a width that is double, triple, or more than the cycle time of ZONE A can be applied to the CDA 101 located far from the semiconductor IC 400.

3. To apply a driving voltage, there are methods of changing the voltage from Low Voltage to High Voltage or from High Voltage to Low Voltage. As illustrated in the embodiment of ZONE A in FIG. 14, one can drive using a pulse wave, and in ZONE B through ZONE D, one can drive with a smooth sine wave-like Rising Edge and Falling Edge. If driven by a sharp-edged pulse wave, issues related to EMC (Electromagnetic Compatibility) or EMI (Electromagnetic Interference) can be caused by voltages with sharp rising or falling edges, such as the 1st, 3rd, or 5th harmonics of the pulse wave. Therefore, it is desirable for the Rising Edge and Falling Edge of the driving voltage to be smoothly driven in the shape of a Sine Wave.

4. The driving voltage can be driven "from low voltage to high voltage" as in the embodiment of ZONE A to ZONE D in FIG. 14, or "from high voltage to low voltage" as in the embodiment of ZONE S in FIG. 14. However, only Low voltage or only High voltage should be simultaneously applied to the capacitor connected to a single detection signal line. For example, this means that the interline capacitance (Cd) should not be driven "from Low Voltage to High Voltage" while the shielding capacitance (Cin_sd) is driven "from High Voltage to Low Voltage". This is to induce charge sharing in the load capacitance, and if voltages of different polarity are applied simultaneously, the amount of charge that is increased or decreased may be similar, and charge sharing may not occur.

High and low voltage are relative concepts. A driving voltage has two states, low voltage, and high voltage, and should be understood as either low voltage or high voltage. This idea also applies to any voltage that has two states, Low Voltage and High Voltage, in this specification, and in the case of multiple voltages, the meaning of Low Voltage and High Voltage is that one of the two voltages being compared is low and one is high.

5. Within the driving voltage cycle, the duty of the 1st Stage Driving Voltage and the duty of the 2nd Stage Driving Voltage differ from each other. The 1st Stage Driving Voltage is the initially supplied driving voltage, and it differs in voltage level from the 2nd Stage Driving Voltage supplied second. For example, if the 1st Stage Driving Voltage is Low Voltage, the 2nd Stage Driving Voltage is High Voltage, and if the 1st Stage Driving Voltage is High Voltage, the 2nd Stage Driving Voltage is Low Voltage.

The time constant of the CDA signal line installed at a far distance on the display device is larger than that of the nearby CDA signal line. Therefore, the time for the signal of the far distant signal line to become saturated and stabilize is longer than that for the nearby CDA signal line. As a result, as shown in ZONE D of FIG. 14, the forcing time for the High Voltage (Vd2, Vcin2), which is the 2nd Stage Driving Voltage, is longer than for the Low Voltage (Vd1, Vcin1) supplied from a distance as the 1st Stage Driving Voltage. Additionally, for the nearby CDA signal line, the length of the 1st Stage Driving Voltage is longer, and the length of the 2nd Stage Driving Voltage is shorter, as seen in ZONE C. However, for the nearby CDA signal line, it is more desirable to shorten the Cycle Time, as shown in the example of ZONE A, as this can reduce the sensing time.

6. Within a column, there may be differences in the timing of the application of the secondary driving voltage to individual capacitors connected to the same detection line by length of detection line (or by CDA location).

Referring to FIGS. 12b and 14, the line capacitance Cd is supplied with a secondary driving voltage Vd2 and the shielding capacitance Cin_sd is supplied with a secondary driving voltage Vcin2. The magnitude of the interline capacitance (Cd) of a far distant CDA signal line may be larger than the magnitude of the shielding capacitance (Cin_sd) of the same CDA signal line. If a secondary driving voltage is applied to both capacitances at the same time, the voltage of the shielding capacitance (Cin_sd) with a smaller time constant will stabilize first, and the line capacitance with a larger time constant may still be in the process of stabilizing. According to the principle of superposition, the shielding capacitance (Cin_sd) that reaches a stable state first starts discharging after stabilization, and the discharge continues until the voltage of the line capacitance is stable and the signal is detected. Since this discharge may cause an error in the signal detected by the sensing signal line 202, it is desirable to apply the driving voltage to the shielding capacitance (Cin_sd) at a different time and apply the driving voltage later. ZONE S is an illustration of this technical idea. A second single-phase driving voltage, Vcin2, is supplied to the shielding capacitance (Cin_sd) after a time "CD" after the second voltage Vd2 in the top side figure is applied.

Since the value of the interline capacitance (Cd) of the CDA signal line in the near distance may be smaller than the shielding capacitance (Cin_sd), the shielding capacitance secondary driving voltage may be applied to the signal line in the near distance first, and then the interline capacitance (Cd) secondary driving voltage may be applied.

On the other hand, there are other advantages to be gained by varying the operating time by capacitance. Since the driving voltage is applied to the capacitance, a sharp voltage such as the first harmonic and third harmonic of the transit voltage, such as the initial rise or fall of the driving voltage, may cause a momentary overcurrent to flow in the capacitance, which may change the potential of the driving voltage, or the parts of the switch current that apply the driving voltage from the driving unit 420 may be continuously damaged, and if this situation continues, the parts may be damaged. A way to avoid these problems is to use different actuating units 420 for each capacitance to actuate at different times.

Figure 15:
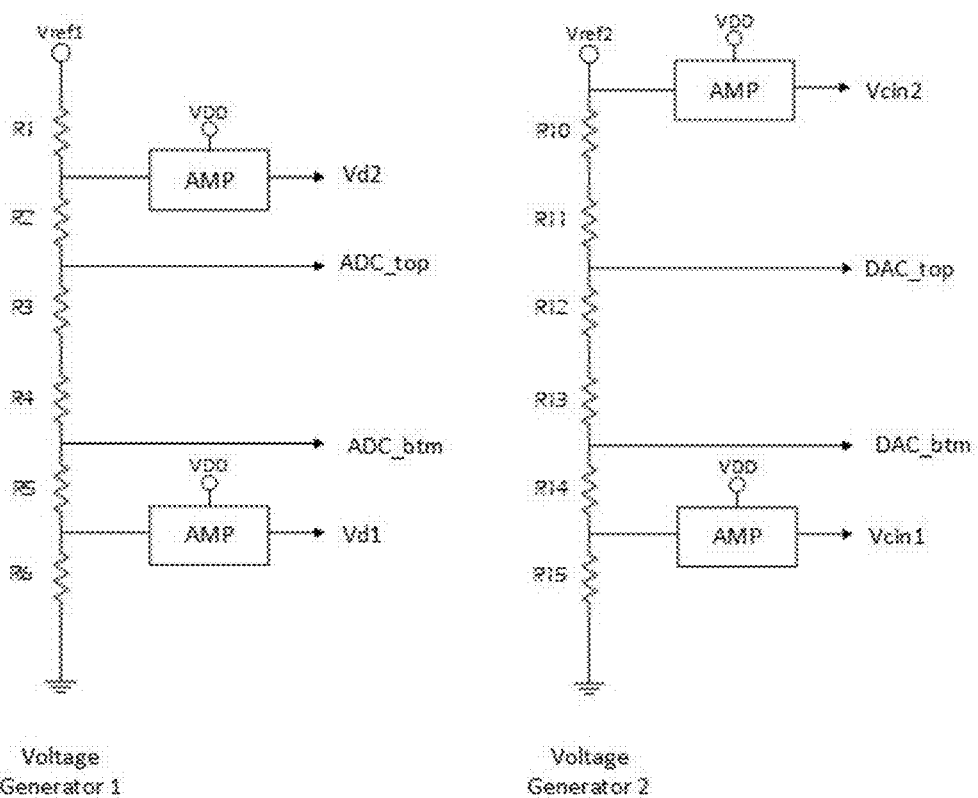
FIG. 15 is an embodiment of the present invention that applies a driving voltage by the driving unit.

7. The magnitude of the driving voltage supplied to the interline capacitance (Cd) and the magnitude of the driving voltage supplied to the shielding capacitance (Cin_sd) may be different. FIG. 15 is an embodiment of the present invention that applies a driving voltage to the driving unit 420. Referring to FIG. 15, there are voltage generators (VG) VG1 and VG2, and a reference voltage (Vref1) supplied to a resistance string of VG1, and a reference voltage (Vref2) supplied to VG2.

The reference voltages Vref1 and Vref2 are voltages with precise magnitudes generated by the band gap reference (BGR), and the two reference voltages Vref1 and Vref2 can be the same or different voltages.

The AMP generates the driving voltage. Using the reference voltage quoted from the resistor string, the value of the AMP output voltage is determined and current is supplied from the power supply (VDD) supplied to the AMP. The part that generates the driving voltage consisting of the reference voltage and the AMP is called the Driving Voltage Generator.

In one Voltage Generator, multiple Reference Voltages and Driving Voltages are generated. For example, Vd1/Nd2, which are the driving voltages of the invention, or ADC_top and ADC_btm, which are the reference voltages applied to the ADC, are generated in VG1, and Vcin1/Vcin2 and DAC reference voltages, DAC top or DAC_btm, etc. can be generated in VG2.

The driving voltage (Vd1/Vd2 and Vcin1/Vcin2) generated separately by the separate voltage generator prevents voltage drop or damage to components due to the inrush current described above.

Thus, in the present invention, driving voltages generated by different voltage generators can be used as driving voltages for different capacitances. For example, Vd1/Vd2, the driving voltage generated by VG1, can be used for the interline capacitance connected to the same P point, and Vcin1/Vcin2, the driving voltage generated by VG2, can be used for the shielding capacitance.

Referring to [Equation 4] and FIG. 13A, in the case of dual driving, Vp2−Vp1 detected by the detection signal line 200 is 4.615V-4.886V. In general, an OPAMP is used to process analog signals and output them as digital signals through an ADC, and in the case of a general OPAMP that is not a Rail to Rail type OPAMP, if Vdd of a single power source is supplied as a power supply voltage, sufficient output is not formed as much as the supplied power supply voltage.

For example, if the power supply of the OPAMP used as a buffer is a 5V single power supply with 0V as the ground, when the input signal of the OPAMP is 5V, the output voltage should be the same 5V, but 5V is not output and only about 4.5V is output. Therefore, in the case of an OPAMP using a single 5V power supply, the voltage of 4.615V to 4.886V in FIG. 13A may not be output normally, and only 4.5V may be output.

Referring to [Equation 4], by varying the value of the driving voltage (Vd2−Vd1) or the driving voltage (Vcin2−Vcin1), the value of Vp2−Vp1 in dual driving of FIG. 13A can be adjusted so that the value of Vp2−Vp1 is formed at 4.5V or less instead of the range of 4.615~4.886V.

For example, it may be possible to adjust Vd2−Vd1=5V, Vcin2−Vcin1=3V. To accomplish this, the line capacitance driving voltage can be designed to be Vd2=5V, Vd1=0V, and the shielding capacitance driving voltage Vcin2=4V, Vcin1=IV. The line capacitance driving voltages, Vd2 and Vd1, can be finely scaled through the resistor string of VG1 as shown in the embodiment of FIG. 15, and the shielding capacitance driving voltage generated by VG2 can be adjusted to have various values, so that the operating point of the OPAMP can be set to a safe region.

In this way, it is possible to adjust the value of the high or low voltage of the driving voltage supplied to different capacitors, to use the same value voltage or to use different value voltages, and to adjust the position of the voltage formed by using different driving voltages. The apparatus of the present invention also provides a plurality of power supplies (Voltage References) that generate these different driving voltages.

The embodiment of FIG. 15, an apparatus for generating driving voltages, is an embodiment using a resistor string, and it is possible to generate driving voltages in a manner different from the method of FIG. 15. For example, a regulator can be used to supply all the driving voltages independently, or a band gap reference (BGR) can be used to generate multiple independent driving voltages, and only the current capacity of the BGR can be amplified and used. Therefore, the method of generating the driving voltage is not limited to the method of using a resistor string as shown in the embodiment of FIG. 15, and various methods may be used.

Referring now to FIG. 12B, an embodiment of the present invention for detecting an object by applying a driving voltage will be described as [Equation 4].

$$Vp2 - Vp1 = \frac{(Vd2 - Vd1)*Cd + (Vcin2 - Vcin1)*\text{Cin\_sd}}{Cd + \text{Cin\_sd} + Ccm}.$$

Qualitatively analyzing [Equation 4], Vd1, which determines Vp1 in FIG. 12B, is applied to the interline capacitance and Vcin1 is applied to the shielding capacitance, and after waiting for a predetermined time until the voltage at point P stabilizes, the voltage at point P is detected by the signal detection unit 410, which becomes Vp1. Then, to detect Vp2, Vd2 and Vcin2 are applied, and after waiting for the signal at point P to reach saturation (or the target value), the voltage at point P is detected by the signal detection unit 410. [Equation 4] is the difference between Vp1 and Vp2 detected in this way.

The present invention aims to detect whether an object 20, such as a pen or a finger, appears when an object 20 is positioned on the upper surface of the display device 10, and to detect the coordinate of the object 20 on the display device 10 by the amount of change in the object capacitance Cobj, or to detect a digital signal output from the pen using the object capacitance Cobj. Although not shown in this specification, a charge amplifier is used to detect the digital signal output from the pen, and the voltage detected by the charge amplifier is determined by the ratio of the object capacitance formed between the pen and the CDA and the feedback capacitor of the charge amplifier based on the voltage output from the pen.

Referring to FIG. 4, when the object 20 is positioned on the top surface of the CDA 100, an object capacitance (Cobj) is formed between the CDA 100 and the object 20, and the magnitude of the object capacitance is Cobj=ed/S, where "d" is the distance between the object and the CDA 100 and "S" is the facing surface of the object 20 and the CDA 100.

The factors determining the gap "d" include a protective layer 7 comprising a protective glass or a protective film between the CDA 100 and the object 20, a transparent adhesive such as an adhesive bonding the CDA 100 and the protective layer 7 (not shown), and an air layer when the object 20 does not touch the upper surface of the protective layer 7.

The magnitude of the object capacitance (Cobj), based on the facing areas of the object and the CDA 100, a capacitance (Cair) formed by the thickness of the air layer and the permittivity (e) of the air, a capacitance (Cgls) formed by the thickness of the protective layer and the permittivity (e) of the protective layer element, and a capacitance (Cadh) formed by the thickness of the transparent adhesive and the permittivity (e) of the transparent adhesive element, are determined as a composite capacitance (Cair and Cgls and Cadh in series).

In a typical embodiment, when an object 20 having an area of 4 mm×4 mm touches the protective layer 7, a 0.5 mm thick protective glass on the top surface of the CDA 100, calculations show that a capacitance between 0.5 pF and 1 pF is formed between the CDA 100 and the object 20.

This object capacitance Cobj formed on the top surface of the CDA 100 can be equated to one side being connected to a point P, which is equivalent to the CDA signal line 200, and the other side being connected to a voltage level Vobj, which is the voltage potential of the object. If the object 20 is a human finger, the voltage potential Vobj of the object 20 is 0V, which is the earth ground, and in the case of a pen, it is the same earth ground as the potential of the body of the person holding the pen.

FIG. 12B is an embodiment of the present invention in which a driving voltage is applied to a interline capacitance (Cd) and a shielding capacitance (Cin_sd) excluding a common electrode capacitance (Ccm), and an object capacitance (Cobj) generated by the appearance of an object is added, and one embodiment of the present invention for detecting a voltage in the detection signal line 200 is. Referring to FIG. 12B and [Equation 4], when the object 20 is a human finger, the potential Vobj of the object 20 is constant, so by the principle of superposition, [Equation 4] is derived as [Equation 5].

$$Vp2 - Vp1 = \frac{(Vd2 - Vd1)*Cd + (Vcin2 - Vcin1)*\text{Cin\_sd}}{Cd + \text{Cin\_sd} + Ccm + Cobj} \quad \text{[Equation 5]}$$

The present invention detects the presence of an object 20 based on the magnitude of the object's capacitance (Cobj). Thus, by understanding the difference between the voltage at point P when there is no object 20 as described by [Equation 4] and the voltage at point P when there is an object 20 as described by [Equation 5], it is possible to determine the presence or contact area of the object 20. [Equation 6] is defined as [Equation 4]-[Equation 5] and is as follows.

[Equation 4] − [Equation 5] = 
$$\frac{(Vd2 - Vd1)*Cd + (Vcin2 - Vcin1)*\text{Cin\_sd}}{Cd + \text{Cin\_sd} + Ccm} - \frac{(Vd2 - Vd1)*Cd + (Vcin2 - Vcin1)*\text{Cin\_sd}}{Cd + \text{Cin\_sd} + Ccm + Cobj}$$
[Equation 6]

Referring to [Equation 6], the difference between [Equation 4] and [Equation 5] is the difference between the presence or absence of object capacitance (Cobj) in the denominator term. Therefore, by detecting the amount of change in [Equation 4] based on the value of [Equation 4], it is possible to detect the magnitude of the object capacitance (Cobj) as a voltage.

If the signal detected by [Equation 4] when there is no object is called the "first detection signal" and the signal detected by [Equation 5] when there is an object is called the "second detection signal", the difference between the first and second detection signals can be used to detect the magnitude of the object capacitance (Cobj).

To determine the variation of the "second detection signal" with respect to the "first detection signal," the baseline "first detection signal" must be preserved and recalled to regularly ascertain the difference with the detected second signal. Therefore, the first detection signal should be recorded and stored in memory."

FIG. 16A through 16D illustrate one embodiment of the present invention regarding the use of a differential amplifier, wherein the differential amplifier is included in the signal detection unit 410.

A differential amplifier is a device that amplifies the difference between the voltage input to the positive input terminal (or non-inverting input) and the voltage input to the negative input terminal (or inverting input), and the amplification rate is determined by the ratio between the feedback resistor and the resistor connected to the positive input terminal. (In this embodiment, the connection of the resistor that determines the amplification rate is omitted)

Figure 16A:
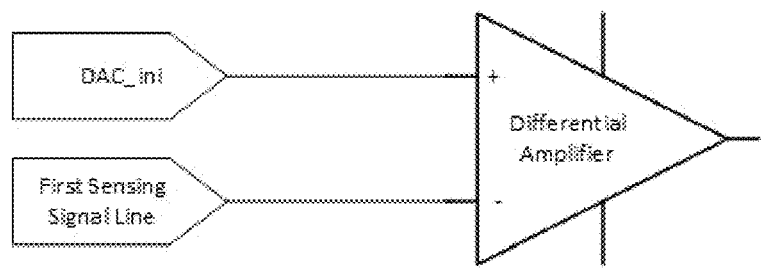
FIG. 16A illustrates one embodiment of the present invention for extracting a duplicate DAC code identical to the first detection signal.

FIG. 16A is one embodiment of the present invention regarding a process for extracting a duplicated DAC code that is identical to the first detection signal.

A DAC (Digital to Analog Converter) that outputs analog voltage is connected to the positive input terminal, and the "first detection signal" is connected to the negative input terminal. The first detection signal is detected by the detection signal line 200, so the detection signal line is connected to the negative input terminal of the differential amplifier.

A DAC is a device that outputs an analog voltage when a digital code is given, and since the DAC output is connected to the positive input terminal of the differential amplifier, two analog voltages are connected to the differential amplifier, and the differential amplifier amplifies the difference between the two voltages at an amplification rate according to a preset resistance ratio. If the differential amplifier is formed in the same structure as the charge amplifier, the amplification rate can also be determined by the ratio of the capacitances. If the value of the input capacitance of the charge amplifier is called C1 and the value of the feedback capacitance is called C2, the amplification rate is determined as −C1/C2.

The output voltage of the differential amplifier, Vo, is the voltage according to [Equation 7] below.

$$Vo = Gain*(DAC\_nt - \text{first detection signal}) \quad \text{[Equation 7]}$$

DAC_ini is the initial output value of the DAC, which may be an arbitrary value or a previously used copied DAC value. The DAC_ini of the present invention extracts the same value as the first detection signal, which is the value when the output voltage of the differential amplifier, Vo, is zero. Since the characteristics of the circuit elements of the semiconductor IC 400 change due to changes in temperature or slight changes in the driving voltage, the first detection signal detected by the sensing signal changes from time to time, and the copied DAC value that follows the first detection signal must also change from time to time, the DAC value stored in the memory can be used for the purpose of DAC_ini when the old DAC value stored in the memory is called to obtain a new DAC value that is corrected to compensate for the changed DAC.

The new DAC value is not much different from the old DAC value, so it is possible to extract the new DAC in a short time. However, if this device is powered up and there is no DAC value stored in memory, you must set an arbitrary DAC value as DAC_ini and change the value of DAC_ini while monitoring the output of the differential amplifier. Gain is the amplification rate of the differential amplifier.

In [Equation 7], if the magnitude of the voltage of DAC_ini is the same as the voltage of the first detection signal, Vo becomes 0V (Zero Volt). In other words, if the driving voltage is applied to the interline capacitance (Cd) and shielding capacitance (Cin_sd) of FIG. 12B based on [Equation 4] when the object does not appear, and the value of DAC_ini is adjusted so that the value of Vo detected by the differential amplifier is 0V, the value of DAC_ini is the same as the first detection signal, and the extracted DAC code is denoted as DAC_copy, which is the duplicated value (Copied Value or Same Value) of the first detection signal. (DAC_copy can also mean the duplicated voltage output from the DAC)

In the same way, the DAC code that duplicates the value of the first detection signal for all CDAs 100 is extracted and stored in the memory of the semiconductor IC 400 for each CDA.

FIG. 17 is one embodiment of the present invention for a memory storing a DAC.

The first detection signal detected by all CDAs 100 according to [Equation 7] above is stored in the memory as a DAC code, and the DAC_rxcy stored in the memory is a duplicate DAC code detected by the CDAs 100 located in row x and column y of FIG. 3. For example, DAC_r2C1 is the same DAC code as the first detection signal detected by CDA 100 A1 in FIG. 3.

Figure 16B:
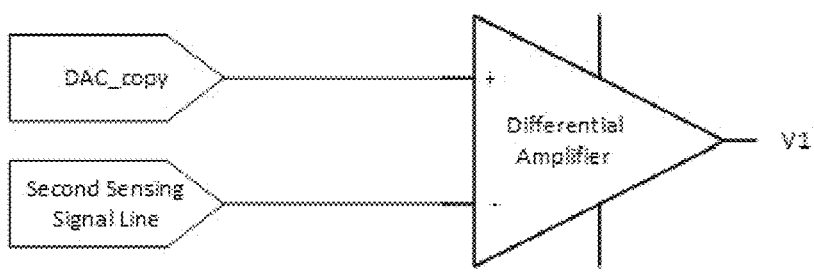
FIG. 16B is an embodiment of the present invention for a process of detecting the output signal V1 of a differential amplifier using a copied DAC.
Figure 16C:
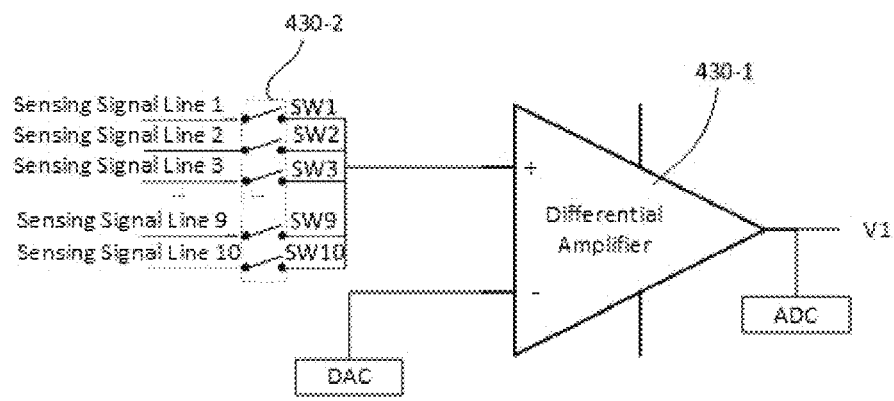
FIG. 16C is one embodiment of the present invention regarding a method of connecting a plurality of signal lines to a single differential amplifier.
Figure 16D:
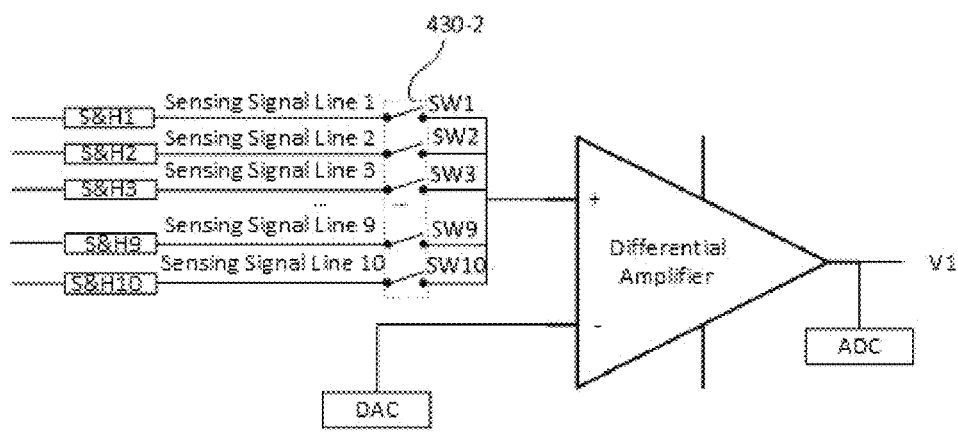
FIG. 16D is an illustration of one embodiment of the present invention of a method for connecting a Sample & Hold to a detection signal line.

The first detection signal, stored in the form of a DAC replicated in memory, is recalled whenever a second detection signal of the corresponding CDA 100 is detected and is connected to the positive or negative input terminal of the differential amplifier of the embodiment of FIG. 16B or the embodiment of FIG. 16D, or is used in the embodiment of FIG. 16A to obtain a calibrated DAC value.

FIG. 16B is an embodiment of the present invention for a process of detecting the output signal V1 of a differential amplifier using a copied DAC.

To the negative input terminal of the differential amplifier, the sensing signal line 202, which forms a second detection signal based on [Equation 5] by the appearance of an object, is connected, and the duplicated DAC voltage of the first detection signal is connected to the positive input terminal.

By this connection method, the output of the differential amplifier according to the embodiment of FIG. 16B outputs a voltage V1 that is equal to [Equation 6], [Equation 4]-[Equation 5], or (first detection signal-second detection signal). In the embodiment of FIG. 16B, the transfer function forming the output voltage V1 of the differential amplifier is the following [Equation 8].

$$V1 = Gain*(DAC\_copy - \text{Second sensing signal}) \quad \text{[Equation 8]}$$

Referring to [Equation 8], V1 is the value output from the differential amplifier by the difference between the first detection signal, DAC_copy, and the second detection signal. Since the second detection signal is a signal that changes according to the value of the object capacitance (Cobj), the differential amplifier output V1 is a voltage that changes in value according to the value of the object capacitance (Cobj), with only the value of the object capacitance (Cobj) acting as a variable.

FIG. 16C is an embodiment of the present invention regarding a method for connecting a plurality of signal lines to a single differential amplifier.

An embodiment of the present invention uses a DAC to store the first detection signal in a memory as digital data. The DAC is sequentially called from the memory, the output voltage of the recalled DAC is connected to the input terminal of one side of the differential amplifier, and the detection signal line 202 of the CDA, which is the master of the copied DAC, is sequentially connected to the input terminal of the other side of the differential amplifier, and the voltage difference is output in turn.

In embodiments of the present invention, two or more DAC devices can be used, but since the use of a large number of DACs increases the area of the semiconductor IC 400, complicates the design and configuration of the logic circuit controlling the DAC, and increases the current consumption, one DAC is preferably used.

In addition, the present invention can use an ADC device having two or more ADCs, but there is a problem that the use of a large number of ADCs increases the area of the semiconductor IC 400, complicates the design and configuration of the logic circuit that controls the ADC, and increases the current consumption, so preferably only one ADC is used, and the ADC is connected to the output terminal of the differential amplifier and proceeds with the process of changing the output voltage V1 into a digital code by the time sharing method.

There are three ways to configure a differential amplifier for use with DACs and ADCs in time division.

1. an embodiment of the first method for constructing a differential amplifier using a DAC and an ADC This method uses one differential amplifier per CDA column and requires as many differential amplifiers as there are columns in a group.

Since the DAC outputs only one voltage in response to one input code, the DAC is connected to as many used differential amplifiers as there are columns in a group, reconnecting to the next differential amplifier after processing is complete on one differential amplifier, and so on.

ADCs move in the same way as DACs and are connected to multiple differential amplifiers in sequence, just like DACs.

When V1 is output sequentially from the plurality of differential amplifiers, the voltage V1 is converted to a digital value by processing in the ADC and temporarily stored in memory to extract the required information by the CPU 460.

After the first column group is processed, the second column group is processed, and if a third or fourth column group exists, the processing of all groups proceeds sequentially in a predefined order.

In the embodiment of the first method, a differential amplifier is connected to each detection signal line 202, which has the advantage that the signal formed by the detection signal line is stable, but has the disadvantage that the number of differential amplifiers increases and the DAC and ADC must be connected to the input or output of every differential amplifier, which complicates the wiring layout, and the number of differential amplifiers increases the current consumption and increases the area of the semiconductor IC 400.

2. an embodiment of the second method for constructing a differential amplifier using a DAC and ADC An embodiment of the second method uses one differential amplifier per column group and all detection signal lines of the column group are connected to one differential amplifier. Since the number of differential amplifiers is only as large as the number of groups, the number of differential amplifiers is reduced compared to the first method embodiment, resulting in current consumption and layout advantages.

The AMP input signal line selector 430-2 of FIG. 16C is a switch that selects one of the detection signal lines inputs to the differential amplifier. Since it is assumed that there are 10 columns in one group, 10 detection signal lines are input to the differential amplifier, and only one of the switches of the AMP input signal line selector 430-2 is selectively turned on by the CPU 460 of the semiconductor IC 400 or the control of the logic section. The remaining switches are turned off except for the turned-on switch, and when the copied DAC of the CDA 100 connected to the turned-on switch is recalled from memory and connected to the differential amplifier, the difference between the two voltages is output and processed by the ADC operating in pair with the DAC.

3. an embodiment of the third method for configuring DACs and ADCs and differential amplifiers In an embodiment of the third method, a plurality of detection signal lines from the plurality of groups shares a single differential amplifier.

By connecting the output terminals of each loader, one for each column group, with the same output component (or same output position), and applying an Enable signal to the LD, which is the output control signal of the loader 450 of the column group that needs to be processed, to activate the loader, and applying a Disable signal to the LD of the remaining loader, it operates as if there is only one loader 450, so the same effect of processing is possible as if one differential amplifier is used for each loader in each group as described in "An embodiment of the second method for configuring a differential amplifier using DAC and ADC".

Also, if the detection signal lines output from multiple loaders are replaced by a single detection signal line by connecting the same output components, the number of signal lines input to the AMP input line selector 430-2 is reduced.

When the detection/driving signal line switch group 437 and the loader 450 are placed in the display, and the AMP input line selector 430-2 and the differential amplifier 430-1 are placed in the semiconductor IC 400, the output of the loader is input to the AMP input line selector 430-2 through the material for connection 300 connected to the display device 10. Since the detection signal lines 202 corresponding to a plurality of columns comprising the column group is input to the loader 450, and the input signal is output when LD is enabled, the number of detection signal lines delivered to the AMP input signal line selector 430-2 through the material for connection 300 is equal to the number of columns included in the column group.

Generally, the number of columns in the column group is about 10, and the number of signal lines input from the semiconductor IC 400 to the decoder 436 for control of the detection/driving signal line switch group 437 and other necessary signal lines is about 10, so the number of pads of the junction 301 of the material for connection 300, which is connected to the semiconductor IC 400 and the display device 10 through the material for connection 300, is about 20, Since the width of the material for connection 300 is also narrowed due to this, the form of the module configured by installing this device on the display device 10 is simplified, and it is possible to simply attach the junction 301 in the corner part of the left or right side where there is no output of the source IC of the display device.

In this way, when the detection/driving signal line switch group 437 and the loader 450 are installed in the display device, only one detection CDA is selected from the plurality of CDAs comprising the CDA column and input to the loader 450, and if the detection signal lines output from the plurality of loaders 450 are connected to the same output component in common, the number of detection signal lines input to the AMP input line selection in the loader 450 is dramatically reduced.

As a result, the number of signal line input pins 401 of the semiconductor IC 400 is reduced, which has the effect of reducing the cost by reducing the area of the semiconductor IC, and since hundreds of CDA signal lines are reduced to dozens of CDA signal lines, the width of the CDA signal line is widened to reduce the line resistance of the CDA signal line, and this improves the delay effect caused by RC, so that the signal can be detected faster from the detection signal line, which has the effect of shortening the signal sensing processing time and reducing the current consumption.

In addition, during the processing of the Tx described later, the resistance of the CDA signal line is reduced, which has the effect of improving the speed of the rising time of the Tx.

FIG. 18A is an embodiment of the present invention that uses one differential amplifier to reduce the number of detection signal lines output from the plurality of loaders 450-1, 450-2. FIG. 18B is an embodiment of the present apparatus for signal flow between the devices used in FIG. 18A.

Referring now to FIGS. 18A and 18B, embodiments of a third method for configuring a DAC and ADC and differential amplifier using only one differential amplifier 430-1, and signal flow between the components are described below.

In the embodiment of FIG. 18A, the 20 columns are separated into two groups such as left group and right group, and the group containing 10 columns from COL1 to COL10 on the left is called Group1, and the group containing 10 columns from COL11 to COL20 on the right is called Group2.

In one embodiment of FIG. 18A, one column includes 25 CDAs 100, such as far distant CDA 1 to near CDA 25, and 25 CDA signal lines 200 connected with each CDA are input to the sensing/drive signal switch group 437.

In the present invention, a CDA is sequentially selected from among 25 CDAs included in one column in a preset order, and an object capacitance (Cobj) or a signal output from a pen is detected at the selected CDA 100. The position (number) of the detection CDA 100 selected in each column for object sensing may vary from column to column, but preferably the position of the detection CDA 100 selected in each column is the same, so that all CDA 100s in the same row in one group operate as detection CDAs.

The present invention selects a detection signal line 202 connected to a detection CDA and a plurality of driving signals 201 neighboring the detection signal line, wherein the detection CDA detects an object, and the driving signal line applies a driving voltage.

When the nth detection signal line is selected, a pair or multiple pairs of driving signal lines can be selected. In the case of selecting the nth detection signal, a pair of [(n−1), (n+1)] driving signal lines is selected.

If the nth CDA in a column is selected as the detection CDA, as many pairs of driving signal lines as m can be selected. That is, in "CDA(n, ±m), 1, 2, . . . m. m is a positive integer", CDAn is the row number of the detection CDA, the row number of the driving signal line is (CDA(n±m), m=1 to m), and m is a number of pairs of driving signal lines. For example, if the sensing and driving signal lines in one column are represented by (10, ±3), the CDA of the 10th row is the detection CDA, three pairs of driving signal lines are selected, and the row numbers of the three pairs of driving signal lines are (9,11)/(8,12)/(7,13).

In the apparatus of the present invention comprising a plurality of groups, when the processing of all CDAs included in the nth row in the first group is completed, all CDAs included in the same nth row in the remaining groups are selected and processed.

In the embodiment of the present invention according to the embodiment of FIG. 18A, it is assumed that the CDA columns are separated into two groups, left and right, and that once the processing is completed in one of the groups, either the left group or the right group, the processing of the remaining group proceeds, with the processing taking place in the CDA 100 located in the same row of all the columns.

Referring to FIG. 18B, when the processing of the nth row is completed, the processing of the n+1th row proceeds, and the processing of the n+2th row (not shown) proceeds, and so on until the last row or a preset row. Although processing can be performed simultaneously in multiple groups, there are problems such as in rush current when the driving voltage is applied, discharge from the detection signal line, or additional installation of an ADC or DAC, so it is preferable to perform processing in only one group, such as processing in the next group after processing in one group is completed. In the embodiment of FIG. 18B, it is assumed that processing is performed in Group 1, and then processing is performed in Group 2.

There are various scan methods to detect an object by applying a driving voltage to the CDA. In one embodiment, you can scan using only odd CDAs, or you can scan using only even CDAs. Alternatively, the row number of the CDA can be determined by a mathematical formula such as 2C+1 (C=0,1, 2, . . . positive integer), such as skipping two CDAs and processing the third CDA based on the CDA of the selected row, or it can be set in the same way as 3C+1 (C=0,1,2 . . . positive integer, and C is row number of CDA). Partial scanning without scanning the entire CDA is to determine whether to proceed with a full scan to extract the coordinates of the object by determining only the presence or absence of the object, and the current consumption decreases as the scan time decreases. If an object is detected in the partial scan, the entire CDA is scanned to obtain the precise location coordinates of the object.

In SG1 and SG2 in FIG. 18A, the number like 1 or 2 is the number of the group, and SG1,1-1 means switch group 1 in column 1 of group 1. In FIG. 18A, three switch groups 437 are installed per column. This is the case of "(n, ±m), m=1", and since a pair of driving signal lines is selected centered on the nth detection signal line, three switch groups are required. In the case of "(n, ±m), m=1, 2", five switch groups would be required for each column.

One of the pluralities of switch groups 437 is the detection signal line switch group 437-1 that selects the detection signal line, and the other is the driving signal line switch group 437-2. In the embodiment of FIG. 18A, the center switch group is assumed to be the detection signal line switch group 437-1, and the left and right switch groups are assumed to be the driving signal line switch groups 437-2.

All CDAs in a column are input to all switch groups in that column and one CDA is output per switch group. In the embodiment of FIG. 18A, 25 CDAs 100 and 25 CDA signal lines 200 in one column are input to all three switch groups 437.

The CDA input to all switch groups 437 corresponding to one column is connected to each input terminal of internal switch 438, and one internal switch 438 is turned on for each switch group 437, and one CDA signal line is output for each switch group 437.

When the CDA of the present invention is placed in the display device 10 and the detection/driving signal line switch group 437 is also installed in the display device 10, the internal switch 438 preferably uses the same element as the switching element that outputs the pixel data of the display device 10. The switching element that outputs the pixel data of the display device 10 is turned on or off by the turn-on/turn-off control signal output from the Gate Drive IC of the display device 10, and is an element that transmits the pixel information output from the Source Drive IC of the display device 10 to the pixels, and the internal switch 438 performs the same function.

Therefore, if the same mask is used to manufacture the internal switch 438 included in the switch group 437 of the present invention in the process of manufacturing the switching elements for the pixels of the display device 10, it is possible to manufacture the internal switch 438 without a separate process.

Also, when the internal switch 438 is the same as the switching element for the pixel of the display device 10, the turn-on and turn-off voltages used for the internal switch 438 can be the turn-on and turn-off voltages output by the Gate Drive IC of the display device 10, so that it is possible to stably turn on or off the internal switch 438 by setting the output of the decoder 436 of the present invention to be the same as the output voltage of the Gate Drive IC.

When the switch group 437 and the decoder 436 are installed in the display, the level of the signal output from the decoder is preferably the same as the high and low voltages output from the Gate Drive IC of the display device 10. Also, when the Gate Drive IC is built into the display device 10, the switching element used in the decoder 436 is preferably the same switching element used in the Gate Drive IC and is preferably manufactured by the same process as the manufacturing process of the switching element of the Gate Drive IC. In addition, in order for the decoder 436 to output the same high and low voltages as the high and low voltages output by the Gate Drive IC of the display device 10, the decoder 436 should be supplied with the same high and low voltages as the high and low voltages used by the Gate Drive IC of the display device 10.

Typically, a single Gate Drive IC used in the display device 10 has only one output out of hundreds of gate control outputs that is a turn-on voltage, and the other outputs are turn-off voltages. The decoder 436 of the present invention also has only one output out of dozens of outputs that is a turn-on voltage to turn on the internal switch 438, and the remaining outputs are turn-off voltages for the internal switch 438.

In the embodiment of FIG. 18A, 25 CDAs 100 are placed in one column, so at least 25 outputs of the decoder are required, and the output line number (Output Line Address) where the turn-on voltage is output among the 25 outputs of the decoder 436 (G0~G24) is indicated as "Gn" in Decoder out in FIG. 18B. Since Decoder out is "Gn", it means that the voltage output from the nth line of the 25 decoder outputs is the turn-on voltage. The turn-on voltage of the switching element 438 composed of NMOS is high voltage, but the turn-on voltage of the switching element 438 composed of PMOS is low voltage. Therefore, one turn-on voltage output from the decoder 436 can be either a high voltage or a low voltage.

Control signals that control the output of the decoder 436 are output from the CPU 460 or logic section of the semiconductor IC 400 and input to the decoder 436. If the decoder 436 is installed in the display device 10, the high and low levels output from the semiconductor IC 400 may not be sufficient to control the decoder 436, so the level output from the semiconductor IC 400 is changed to the high and low levels of the switching element used in the display device 10 by the level shifter 439 placed inside the display device 10. By the level shifter 439, the high voltage output from the semiconductor IC 400 is changed to the high level of the switching element used in the display device 10, and the low level output of the semiconductor IC 400 is changed to the low level of the switching element of the display device. For example, a low level voltage of 0V output from the semiconductor IC 400 is changed to a low level voltage of −6V of the switching element used in the display device 10 by the level shifter 439, and a high level voltage of 3V output from the semiconductor IC 400 is changed to a high level voltage of 10V of the switching element used in the display device 10.

Since the switch group 437 of FIG. 18A requires 25 decoder outputs, five decoder input control signals are required, and the number of input control signals n is determined such that the number of signals output from the decoder does not exceed $2^n$.

In the embodiment of FIG. 18A, when the output of the detection signal line switch group 437-1 is CDAn, that is, when the nth CDA is selected in the detection signal line switch group 437-1, the driving signal line selected in the driving switch group 3 is the driving signal line corresponding to the CDA (n+1), and the driving signal line selected in the driving switch group 1 is the driving signal line corresponding to the CDA (n−1), as described in the embodiment of FIG. 7D.

Controlled by the turn-on/turn-off control signals of the decoder 436, the detection signal line 210 of column 1 (COL1) selected by the detection switch group 437-1 is connected to the first group Loader 450-1. Similarly, detection signal lines selected from columns 2 (COL2) to column 10 (COL10) are all connected to the input terminals of the first group Loader 450-1. In Group 2, the ten detection signal lines, individually selected by the operation of the detection switch group (437-1 from columns 11 (COL11) to column 20 (COL20), are connected to the input terminals of the second group Loader (450-2).

And, when the loader 450 is installed in a display device, the "LD" signal, which is a control signal of the loader 450 given by the semiconductor IC 400, is also changed by the level shifter 439 to suit the turn-on/turn-off voltage characteristics of the switching element used in the loader 450 and connected to the "LD" terminal of the loader 450.

The loader 450 in FIG. 18A has 10 output elements, out1 through out10. In one embodiment of the present invention, the number of detection signal lines input to the AMP input line selector 437 is reduced by connecting output elements with the same number output from the loader to each other.

Referring again to the embodiments of FIGS. 18A and 18B, the signals output by the decoder 436 select the CDA 100 of the same row in group 1 and group 2 are input to the first group loader 450-1 and the second group loader 450-2. In one embodiment, if only "LD1" of the first group loader 450-1 is enabled, all the input signals of the first group loader 450-1 are output, and the input signals of the second group loader 450-2 are not output because "LD2" is disabled, so the signals of the same output component of the second group loader 450-2 do not affect the first group loader 450-1.

When the process of detecting the object capacitance in Group 1 and converting the voltage output from the differential amplifier to ADC is completed, the same process is performed in Group 2. At this time, only the signal of the second group loader 450-2 should be output, so "LD1" is switched to Disable and "LD2" is switched to Enable.

The present invention is characterized in that only the output control signal "LD" of the loader in the group in which processing is in progress as described above is kept in the enable state, and the "LD" of the loader in the group in which processing is not in progress is kept in the disable state so that the outputs of the loader 450 do not interfere with each other.

In the embodiment of FIG. 18A, Group1 is composed of 10 columns of 25 CDAs per column, and Group2 is also composed of 10 columns of 25 CDAs. By the detection/driving signal line switch group 437 included in each column, one detection signal line is output per column, so that 10 detection signal lines are output in Group 1, and 10 detection signal lines are output in 10 columns in Group2.

When the CDA and the detection/driving signal line switch group 437 are placed in a display device such as an OLED, the 500 CDA signal lines are reduced to 20 detection signal lines output from 20 columns, so the number of signal line input pins 401 of the semiconductor IC 400 is greatly reduced from 500 to 20, which reduces the area of the semiconductor IC 400 and thus reduces the cost.

In addition, if the loader 450 is also embedded and placed in a display device such as an OLED, and the detection signal line connected to the same output component in a plurality of loaders is input to the semiconductor IC 400, the 500 CDAs are reduced to 10 in the embodiment of the present invention shown in FIG. 18A, Since the number of signal line input pins 401 input to the semiconductor IC 400 is further reduced from 20 to 10, the package price of the semiconductor IC 400 is reduced by reducing the number of pins in the package, and the value of the package is reduced, and the mounting freedom of the semiconductor IC mounted on the material for connection 300 is increased.

In the embodiment of FIG. 18a, each group assumes 10 columns and two groups. However, in the case of large display devices such as a 17-inch monitor, the number of groups can be expanded to 4, 8, or even more. Furthermore, the number of CDAs included in a single column can exceed 40. Thus, in the object detection device of the present invention, which possesses over 1,000 CDAs, by embedding the detection/driving switch group 437 and Loader 450 within the display device, objects can be detected with just a dozen detection signal lines. This reduction in the number of detection signal lines brings about a significant reduction in the dimension of the semiconductor IC 400.

Also, when the sensing/drive signal switch group 437 and the loader 450 are embedded in a display device such as an OLED, if a plurality of driving signal lines output from the plurality of driving signal line switch group 437-2 included in one column are connected in common and one driving voltage is applied to the commonly connected driving signal lines, the number of driving voltages is reduced compared to the embodiment in which a driving voltage is applied to every driving signal line, and the freedom of layout is increased.

The column 1 drive signal 210-1 in FIG. 18A is an interconnection of two driving signal lines output from the driving switch group 1 and the driving switch group 3. All these driving signal lines in group 1 are connected to the driving unit 420 with one driving signal line named G1_Vd, and all the driving signal lines in group 2 are connected to the driving unit 420 with one driving signal line named G2_Vd.

In the embodiment of FIG. 18A, G1_Vd and G2_Vd may supply the first stage driving voltage and the second stage driving voltage in a time-division method with one power line, but preferably, they are supplied with two power lines comprising the first stage driving voltage and the second stage driving voltage. At this time, the common driving signal line is connected to the power line supplying the first stage driving voltage when the first stage driving voltage is applied, and to the power line supplying the second stage driving voltage when the second stage driving voltage is applied, by operation of the switching element not shown. Compared to the method of applying the first stage driving voltage and the second stage driving voltage using a single power line, the method of connecting to individual power lines supplying the first and second stage driving voltages has the effect of shortening the falling time and rising time of the change from the first stage driving voltage to the second stage driving voltage, and has the effect of improving the current supply capacity.

On the other hand, when the driving voltage is applied to Group 1 for processing of Group 1, it is preferable that the driving voltage is not applied to Group 2, which is the group not being processed. Furthermore, the driving voltage of the group not being processed can be maintained in a high impedance (Hi-z) state, or a DC state by applying either the first stage driving voltage or the second stage driving voltage, to prevent the introduction of noise generated by interference due to mutual coupling of the detection signal lines. Therefore, the driving part has three states: high voltage (Vd2), low voltage (Vd1), and Hi-z.

Referring to FIG. 18B, at the time of processing of group 1, the first stage driving voltage, Vd1, is applied through G1_Vd, which applies the driving voltage of group 1, and the reset voltage is cut off after the time for applying the predetermined reset voltage has elapsed, and then the second stage driving voltage, Vd2, is applied. At the time of processing of group 1, the driving voltage of group 2 remains in the Hi-z state, but the same type of driving voltage as the driving voltage of group 1 may be applied, Vd1 may be applied, or Vd2 may be applied.

When the processing of group 1 is completed, applying the first stage driving voltage, Vd1, and the second stage driving voltage, Vd2, through G2_Vd of the driving unit 420 that applies the driving voltage to group 2 is the same as in group 1.

In the embodiment of FIG. 18B, when a predetermined time elapses after the second stage driving voltage, the high voltage, is applied, the AMP input signal line selector 430-2 selects and outputs the input signals one by one in a predetermined order. "select", which controls the AMP input line selector 430-2, is a signal for selecting and outputting one of the input signals and selects one of the 10 input signals according to the logic of the 4 signal lines. In the embodiment of FIG. 18B, a HEX Code is input, and the output signal is determined according to the input HEX Code. For example, if the HEX code of the input select signal is OH, the signal of the first input signal "in1" is output, and if the HEX code of the select signal is 9H, in10 is selected and the signal of in10 is output.

Referring to FIG. 18B, "select" controlling the AMP input signal line selector 430-2 is given sequentially from 0H to 9H, and the AMP input signal line selector outputs 10 signals from in1 to in10 sequentially in response thereto.

The signal output from the AMP input signal line selector 430-2 passes through "Block1". Block1 may be a low pass filter (LPF), an analog buffer, an amplifier, a switch, or the like, and may be composed of various circuitry such as OPAMPs, resistors, capacitors, CMOS, and the like. Alternatively, the output of the AMP input signal line selector may be directly connected to the input of the differential amplifier, bypassing Block 1.

In the embodiment of FIG. 18B, a given code such as 0H or 1H of the DAC is the address of the copied DAC stored in the memory, and when the DAC code stored at that address is applied to the DAC connected to the differential amplifier, it is converted to an analog voltage in the DAC, and the voltage difference with the sensing signal is amplified and output from the differential amplifier.

The signal output from the differential amplifier passes through Block 2, which is also a circuit consisting of a filter, amplifier, buffer, OPAMP, CMOS, etc. like Block 1. The signal passed through Block 2 is processed by the ADC and stored in memory.

When the processing of the 10 detection signal lines by the ADC is completed, the first group loader 450-1 is disabled by LD1, and an enable signal is given to LD2 of the second group loader 450-2 for the processing of group 2.

Then, the same process as group 1 is used to detect the signals from column 11 to column 20 of group 2, but the addresses of the DACs stored in the memory are different because the positions of the CDAs are different. In the embodiment of FIG. 18B, for convenience, the address of the DAC corresponding to the nth CDA of the 11th column is set to AH (11th), and the last DAC address is set to 13H (20th).

For each column, in order to process the second CDA, CDA(n+1), the G(n+1) output of the decoder 436 is the output voltage in the turn-on state, which causes CDA(n+1) to be selected in the detection signal line switch group 437-1 and CDAn and CDA(n+2) to be selected in the driving switch group.

Then, the driving voltage is applied to the driving signal lines, the LD signal of the loader 450 is controlled by the group to be processed, the output signal is sequentially selected from the AMP input signal selection part 430-2, and the replicated DAC is also sequentially recalled from the memory to detect the difference between the first and second signals using a differential amplifier, and the process of converting it into a digital code through an ADC and storing it in memory is repeated successively.

Referring again to the embodiment of FIG. 18A, the output of the decoder 436 supplied to each column is placed transversely, and the connection lines for each output component of the first group loader 450-1 and the second group loader 450-2 are also placed transversely. Also, the signal lines output from the loader 450 and connected to the AMP input signal line selector 430-2 are placed longitudinally.

When the components of the present apparatus, such as the decoder 436 or the switch group 437 or the loader 450 or the level shifter 439 or the signal line/DC changeover switch described above, are placed embedded in the display device 10, it is desirable to arrange them so that they do not overlap with the wiring for the pixel data and the gate signal lines of the display device 10, as interference with the wiring for the pixel data and the gate signal lines will introduce noise due to coupling.

The signal lines for transmitting pixel data of the display device 10 are mainly wired using source metal in the longitudinal direction, and the gate signal lines are mostly placed in the transverse direction and use a different layer of metal than the source metal to avoid interference with the pixel data signal lines using the source metal.

In this invention, the signal line placed in the transverse direction uses the metal layer used for the gate signal line, but preferably the gate metal, and the signal line placed in the longitudinal direction uses the same layout as the longitudinal layout of the pixel data transmission line, but preferably the source metal. Where the longitudinal and transverse wires meet, contact points are used to connect the source metal and gate metal.

In one embodiment based on this principle, the output of the decoder 436, which is delivered to all switch groups, uses a gate metal to avoid interference with the pixel signal line, and the connection signal line for each output component of the loader also uses a transverse gate metal to avoid interference with the pixel signal line. In addition, the plurality of signal lines output from the loader and input to the AMP input signal line selector 430-2 preferably use a longitudinal metal or a source metal to avoid interference with the gate metal of the transverse pixel switching element.

As such, the present device has the effect of greatly reducing the number of signal lines delivered to the semiconductor IC 400 by installing all elements in the path from the CDA 100 to the loader 450 in the display device 10, and these elements are the switch group 437 and the loader 450 connected to the CDA signal line placed in the display device 10, and the level shifter 439 and the decoder 436.

These devices are placed on one side of the non-display area where the screen is not displayed in the display device 10, and can be located between the source signal lines to avoid overlapping with the source signal lines or the corner part of the display device where there is no output line of the source drive IC of the display device. It can also be placed in an area where there is no gate signal line to avoid interference with the gate signal line output from the Gate IC. Additionally, these components can be installed in the BM (Black Matrix) area of the display device's active area where the Source data Line or Gate drive Line is located.

In the case of the third embodiment described above, only one differential amplifier is used in the apparatus of the present invention, and the wiring of the DAC and ADC fixedly placed in the one differential amplifier is simplified, and since only one differential amplifier is used, the current consumption is reduced and the area of the semiconductor IC 400 is reduced.

The CPU 460 analyzes the digital code transmitted from the ADC to 1) determine whether an object appears, 2) calculate the position of the object on the display, i.e., the coordinates of the object, or 3) calculate the distance of the object from the CDA 200, and transmit it to a host outside the present apparatus not shown.

The object detector of the present invention may also transmit (Tx) a digital signal to the pen.

According to the Universal Stylus Initiative (USI) specification, the object detection device must first send (Tx) a signal to the pen before receiving (Rx) a signal from the pen, which requires a synchronization process such as setting the communication method and identity with the pen.

The process of first sending a signal (Tx) from the object detection device to the pen is designated as a protocol called "Uplink" in the USI specification, and for this uplink, the CDA of the object detection device of the present invention must swing from high to low or low to high to generate a digital signal. (In this specification, Uplink and Tx are used interchangeably)

Since the tip size of the pen is only about 1 mm, in order to reduce current consumption, if only CDAs in the odd or even rows, as mentioned earlier are used to transmit the uplink signal, there is a 50% chance that the uplink to the pen will fail, and to solve this problem, all CDAs should be used to transmit the uplink signal.

In this case, applying a USI Uplink Time Slot of 250 us for 1) two groups and 2) 25 rows per group, as shown in the embodiment in FIG. 18A, takes 12.5 ms as follows.

USI Uplink time based on FIG. 18A
250 us (USI Uplink Time Slot)*2(Group)*25(Row)=12.5 ms Since the CDA of the present invention is used to sequentially send an uplink signal to the pen for 12.5 ms, the pen may move to a CDA that has already completed the uplink operation, so there is an uncertainty that the pen may not receive the uplink signal. In addition, there is a problem of excessive current consumption because the processing related to Uplink must be continuously carried out for 12.5 ms.

Assuming all CDAs are scanned sequentially to receive the Rx signal transmitted by the Pen, which takes 12.5 ms, the same as the Tx transmission time. The problem is that if the Pen moves to a CDA location that has already been scanned, the Pen's Rx signal cannot be received.

Figure 19A:
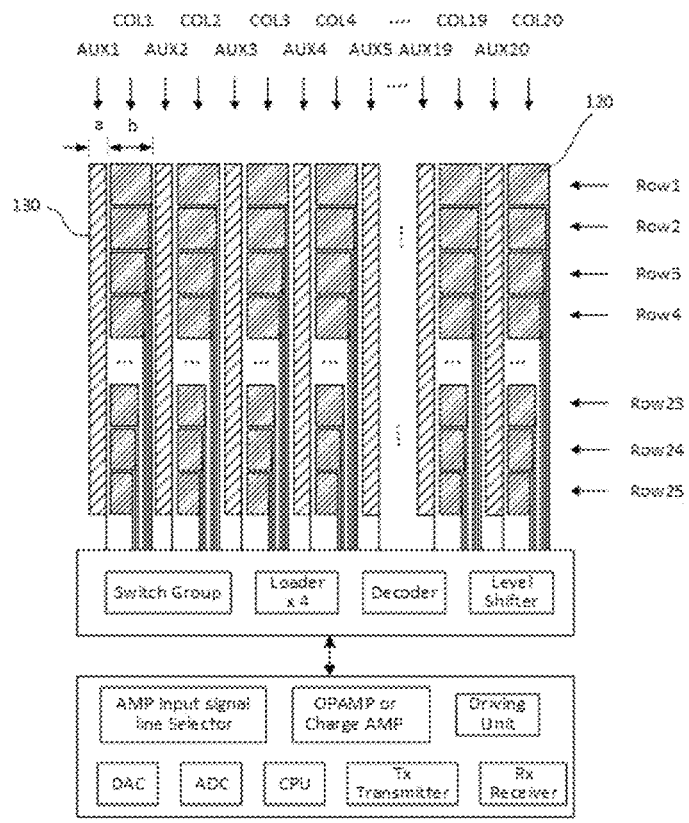
FIG. 19A is an embodiment of the present invention in which a second CDA column comprising single CDA is placed adjacent to the first CDA column.

FIG. 19A is an embodiment of the present invention that addresses these issues, wherein a second CDA column comprising one CDA is placed adjacent to the first CDA column.

In FIG. 19A, COL1 to COL20 comprising a large number of CDAs are referred to as first CDA columns, and AUX1 to AUX20 comprising a single CDA are referred to as second CDA columns. Further, the CDAs comprising the first CDA column are referred to as first area CDAs 120, and the CDAs comprising the second CDA column are referred to as second area CDAs 130.

Referring to FIG. 19, a column comprising 25 CDAs is labeled COL1 through COL20, with ten on the left (COL1 through COL10) comprising Group1 and 10 on the right comprising Group2. In addition, a second CDA column consisting of one second area CDA from AUX1 to AUX20 is placed adjacent to the first CDA column consisting of a first area CDA 120.

The second CDA column placed on the left side of the display adjacent to Group 1 is called Group 3, and the second CDA column placed on the right side of the display adjacent to Group 2 is called Group 4. If Group1 and Group2 are divided into odd and even columns, it is recommended that the second CDA column is also grouped into odd and even columns, so that the ADC or DAC can be operated with uniformity.

When the second CDA column consists of one CDA, as in one embodiment of the present invention, the time to sequentially transmit the Uplink signal using the two groups, Group3 and Group4, is 500 us for a 250 us time slot (the same as the previous embodiment), which is 1/25 of the time compared to the previous embodiment. The 500 us is the time required for one of the Groups of Group3 or Group4 to transmit the Uplink signal first for 250 us, and then for the remaining Group to transmit the Uplink signal for 250 us.

Meanwhile, since transmitting the uplink signal using CDA does not use ADC or DAC, it is possible to transmit the uplink signal using all the second CDA columns because there is no constraint that only one group must be activated.

As a result, when the Uplink signal is transmitted using Group 3 and Group 4 simultaneously, which is an embodiment of the present invention, the transmission time is only 250 us. This is 1/50 of the conventional time of 1.25 ms, and since the Uplink transmission time is shortened, the Uplink signal is transmitted quickly in all areas of the display device no matter where the pen is moved, so there is no need to worry about Uplink failure, and the current consumption is reduced in proportion to the shortened time.

The second CDA column of the present invention does not only transmit Tx signals for the pen, but also receives Rx signals transmitted by the pen, and the Rx signals are analyzed by an Rx receiving unit composed of a charge AMP or a comparator, etc.

In embodiments such as FIG. 6 of the cited invention or FIG. 19A of the present invention, when obtaining the coordinates of the object, the coordinates in the longitudinal direction and the coordinates in the transverse direction must be extracted. When a finger is positioned on the upper surface of a CDA, a plurality of CDAs facing to it have different values of object capacitance, and the coordinates of the finger are extracted by finding the center of gravity for the CDA in the longitudinal direction and the CDA in the transverse direction. Also, depending on the facing position of the pen and the CDA, the magnitude of the voltage output from the pen is detected in the CDA in different values, and the coordinates of the pen are extracted by finding the center of gravity for the CDA in the longitudinal direction and the CDA in the transverse direction for the detected voltage.

If the width of the second CDA is quite wide, and the pen is assumed to be located in the center of the second CDA, the voltage output from the pen is not transmitted to the first CDA column adjacent to the second CDA, so there is no information about the position of the pen in the longitudinal direction, and the center of gravity of the pen in the longitudinal direction cannot be found. However, if the width of the second area CDA is narrow, even if the pen is located on the upper surface of the second area CDA, it is possible to design it so that the radiated voltage of the pen is detected in at least two first area CDAs due to the capacitance formed between the neighboring first area CDA column and the pen, so even if the pen is located in the second area CDA column, it is possible to extract the coordinates of the longitudinal direction of the pen using the CDA of the first area CDA column if the width of the second area CDA is narrow.

For this reason, the width (a in FIG. 19A) of the second area CDA comprising the second CDA column is preferably narrower than the width (b in FIG. 19A) of the first area CDA of the first CDA column and should be narrower in absolute width in addition to narrower in relative width length.

When detecting an object using Group 3 and Group 4, which are composed of the second CDA column, it is possible to check the existence of the object by applying the driving voltage to Group 3 and Group 4 once each (Quick Search), and the Rx signal of the pen can be detected simultaneously or separately for Group 3 and Group 4, so it is possible to check the existence of the pen in a very short time because it is not necessary to scan for many CDAs.

After checking the presence of a finger or a pen, if a pen or a hand object is not detected, the semiconductor IC enters sleep or standby to maintain a low power consumption mode, and wakes up the CPU 460 after a certain period of time by a preset timer interrupt to perform operations such as detecting an object again or detecting a pen, thereby reducing current consumption.

If the object is detected, apply the driving voltage to detect the finger and detect the signal from the differential amplifier, or drive the Charge AMP to detect the radiation voltage of the pen, and scan all CDAs to get the coordinates of the object.

As shown above, a second CDA column consisting of one second area CDA can transmit and receive Tx and Rx signals in a fast time.

In addition, it is possible to quickly detect the presence of an object by applying the driving voltage only once or twice or detecting the Rx signal of the pen, so if an object exists, the object sensing process proceeds, and if there is no object, the semiconductor IC enters sleep or standby, so it is possible to dramatically reduce the communication time with the pen and dramatically reduce the object sensing time to reduce current consumption.

As such, the present invention places the second CDA column consisting of one CDA adjacent to the first CDA column consisting of multiple CDAs, and operates only the second CDA column to be in charge of Tx and Rx with the pen and sensing of objects, thereby dramatically reducing the communication time and sensing time and reducing the current consumption.

In the above embodiment, the number of CDAs comprising the second CDA column is one, but it is possible to compose the second CDA column with multiple CDAs, such as two or three CDAs. When the second CDA column is composed of multiple CDAs, the time for Tx and Rx with the pen increases with the number of added CDAs. However, if you combine multiple CDAs into a single CDA and operate it as if it were a single CDA, Tx and Rx will be possible with the same processing time as when using a single CDA.

In addition, when first detecting the presence of an object by applying a driving voltage in a second CDA column composed of a plurality of second-area CDAs, the sensing time increases with each additional CDA based on Quick Search, which uses one second-area CDA to detect the object, but the time is reduced compared to detecting the object using many CDAs in the same configuration as a second CDA column composed of first-area CDAs.

However, if a second CDA column is constructed using a plurality of CDAs in this manner, a detection/driving signal line switch group 437 must be placed to separate the sensing signal line and driving signal lines from the plurality of second area CDAs, and there are problems such as the complexity of the control signal to combine or separate the plurality of CDAs into one and the installation area of the control circuit, so it is not desirable to construct a second CDA column using a plurality of CDAs.

Figure 20:
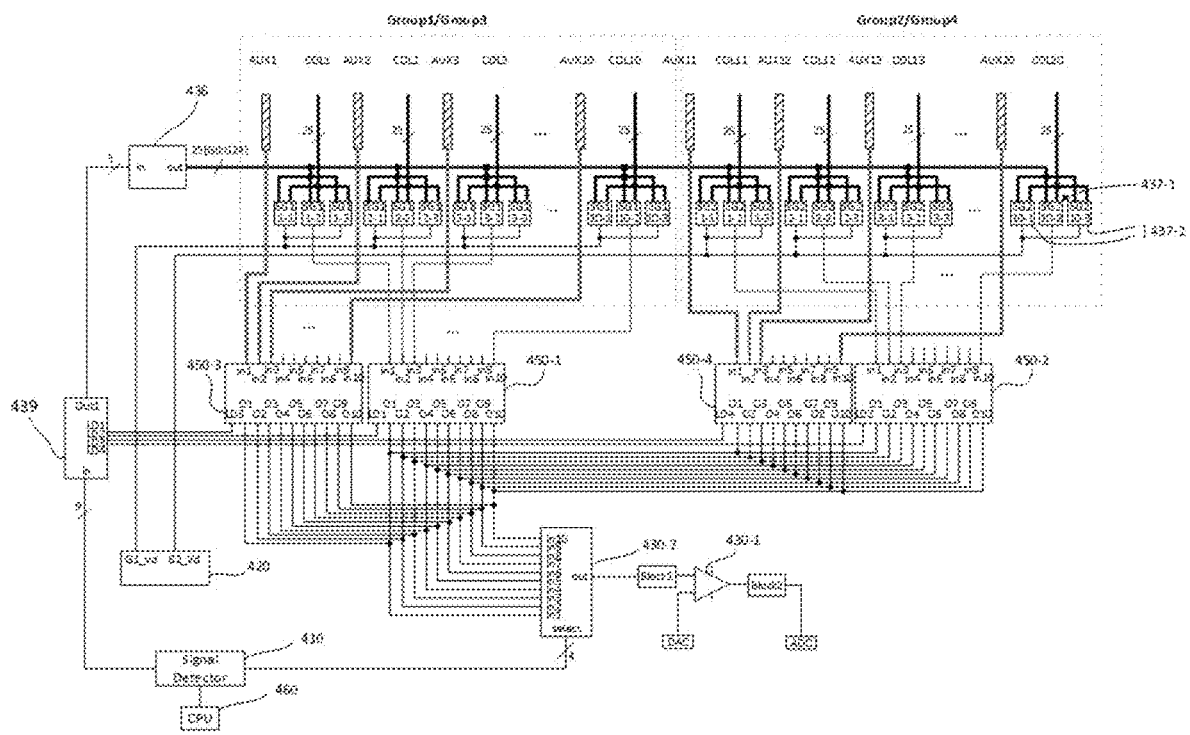
FIG. 20 is an embodiment of the present invention regarding the connection of a sensing/driving signal line switch group and a loader associated with a first CDA column or a second CDA column.

FIG. 20 is an embodiment of the present invention for connecting a sensing/driving signal line switch group and a loader associated with a first CDA column or a second CDA column.

Referring to FIG. 20, the first CDA column comprising 25 first area CDAs is divided into Group 1 (COL1 to COL10) and Group 2 (COL11 to COL20), and the second CDA column comprising one second area CDA is divided into Group 3 (AUX1 to AUX10) and Group 4 (AUX11 to AUX20).

A second CDA column is placed adjacent to the first CDA column, and one loader is placed in every group. Group 1 has first Group1 Loader 450-1, Group 2 has second group Loader 450-2, Group 3 has a third group Loader 450-3, and Group 4 has a 4th Group Loader 450-4.

For each CDA column included in every group, a single CDA signal line is selected and connected to the input terminals (In1 to In10) of the Loader. The signals inputted into the Loader are then output from the output terminals (out1 to out10) when enabled by the enable signal at the Loader's output control terminal (LD).

COL1 is located first in group 1 based on the left direction, and COL11 is also located first in group 3, so it is preferably connected to in1 of the loader, and other columns are input to the loader sequentially according to their positions. When the same output components with the same number that are output from the loader 450 are interconnected according to this arrangement of the input signals of the loader 450, the interconnected "same output components" are the CDA signal lines that constitute the columns of the same position in each group.

As described above, after detecting the object capacitance, the magnitude of the detected signal is converted to a digital value by the ADC and stored in the memory. If the CDA columns are located sequentially in the loader 450, it has the effect of preventing confusion when extracting object coordinates using the ADC value by writing the value to the memory regularly when storing the ADC value in the memory by each loader.

The four loaders 450 connected to the detection signal lines of groups 1 to 4 are input to the AMP input signal line selector 430-2 after interconnecting the same output components, which has the effect of reducing the 40 output signal lines of the loaders 450 to 10, and as the number of loaders increases, the effect of reducing the number of signal lines input from the loaders to the AMP input signal line selector becomes greater.

If an enable signal is applied to only one output control signal LD in each loader 450, and a disable signal is applied to the remaining LDs, signals are output only from the output terminals of the loader with the enable signal applied, so the four loaders operate as if they were one loader. Since the CPU that controls all these processes knows which loader is operating, it is possible to operate the loaders sequentially to stably write the detected information to memory and then perform coordinate sensing of the object or analysis of the pen's Rx signal.

As described above, when the loader 450 is embedded in the display device, the 520 CDA signal lines in FIG. 20 are reduced to 10, thereby reducing the area of the semiconductor IC and reducing the cost of the material for connection 300. In addition, when laying out the signal lines connected to each column through the material for connection 300 in FIG. 3, the width of the signal lines can be increased, so that the Tx time and the object sensing time are reduced due to the reduction of the line resistance, which has the effect of reducing the current consumption or improving the operating performance by detecting objects more frequently within a limited time.

Since the first CDA column is composed of a plurality of CDAs, it is separated into a detection signal line and a driving signal line at the sensing/driving signal line selection part. As described above, the CDA signal lines of the CDA column input to the detection/driving signal line switch group 437 are selected from the detection signal line switch group 437-1 and input to the loader 450, and the 10 output signal lines output from the loader are interconnected with the same output component and input to the AMP input line selector 430-2. The detection signal lines input to the AMP input line selector are sequentially selected one by one and input to the differential amplifier 430-1 or Charge AMP (not shown) to detect object capacitance or to detect frequency of pen.

Further, one or more pairs of driving signal lines neighboring the detection signal line are selected and connected to the driving unit 420, and a first stage driving voltage and a second stage driving voltage are applied at the driving part to detect the object capacitance.

If the second CDA column is also composed of a plurality of CDAs, a sensing/drive signal switch group 437 is added so that the detection signal line and the driving signal line can be separated and extracted in the same way as the first CDA column.

To detect object capacitance from the second CDA column, a driving voltage must be applied to the interline capacitance (Cd) and shielding capacitance (Cin_sd) formed on the detection signal line that constitutes the second CDA column, as shown in FIG. 12B. At this time, the CDA signal line of the second CDA column, which is composed of a smaller number, one or two for example, than the number of CDAs constituting the first CDA column, increases in length facing the neighboring first CDA column's CDA. If a driving voltage is not applied to the CDA of the facing first CDA column, the interline capacitance (Cd) formed between the CDA signal line of the second CDA column and its neighboring length facing the CDA of the first CDA column will only be positioned in the denominator of [Equation 4] or [Equation 5], leading to a reduction in sensitivity and a decrease in the resolution of the ADC.

Figure 19B:
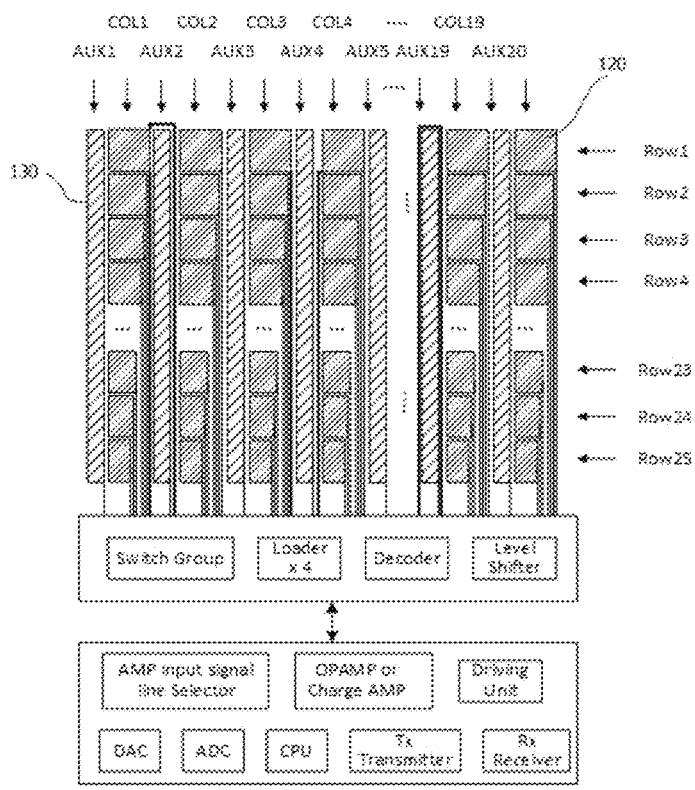
FIG. 19B is an embodiment of the present invention regarding an improved method for driving the capacitance between lines (Cd) of a second CDA column.

FIG. 19B is an embodiment of the present invention to address these issues, which relates to an improved method for driving the interline capacitance (Cd) of a 2 CDA column.

Referring to FIG. 19B, AUX2, one of the second CDA columns, is surrounded by the first CDA signal line of the neighboring first CDA column. Applying a driving voltage to all CDAs comprising the first CDA column may cause problems such as voltage drop due to problems such as drive capability and inrush current of the driving unit 420, or may require a large drive capability, and applying a driving voltage to one CDA is free from such problems. For this reason, when detecting the object capacitance in AUX2, a driving voltage can be applied to the signal line of CDA No. 1 of COL1, which makes it possible to apply a driving voltage to all the line capacitances (Cd) formed in the AUX2 CDA and the CDA signal line, so that the line capacitance Cd of AUX2 is located in the denominator and numerator of [Equation 4] or [Equation 5], which has the effect of improving the sensitivity and improving the resolution of the ADC.

In the embodiment of FIG. 19B, CDA 1 of COL1 is used to surround AUX2, but it is also possible to surround AUX2 using other CDAs such as CDA 2 or CDA 3 of COLL. However, in this case, it is preferable to use CDA No. 1 because it is not possible to apply the driving voltage to the complete line capacitance and the parasitic capacitance that cannot be applied to the driving voltage increases, resulting in a decrease in sensitivity.

Another improved embodiment of the present invention for applying a driving voltage to the interline capacitance formed in the second CDA column is to surround it with two neighboring first area CDA signal lines, such as the embodiment shown in AUX4. In such an embodiment, applying the driving voltage to the first CDA signal lines of COL3 and COL4 neighboring AUX4 has the same effect as the embodiment of AUX2, but has the disadvantage of complicating the circuitry of the system by requiring the driving voltage to be applied to two columns.

Another improved method for driving the interline capacitance (Cd) of the second CDA column is to install a dedicated driving signal line adjacent to the second CDA column and surrounding the second CDA column, and to apply a driving voltage to the additional dedicated driving signal line when an object is detected in the second CDA column, as shown in the embodiment illustrated in AUX19. It has the advantage of simplifying the circuit, but there is a problem that the number of output pins of the semiconductor IC increases due to the addition of a dedicated driving signal line.

Thus, the present invention is characterized in that when detecting an object in the second CDA column, the object capacitance is detected by surrounding the second CDA column with CDA signal lines comprising the second CDA column and the neighboring first CDA column, or by surrounding the second CDA column with a dedicated driving signal line and applying a driving voltage to the surrounded CDA signal line.

On the other hand, in the embodiment of FIG. 20, there is a problem that when connecting the same output components output from multiple loaders, signal interference may occur in the part where the signal lines overlap each other, which may cause a sensing error of the object capacitance.

In one embodiment, assuming that only the loader 450-1 of group 1 is in the Activation state and the remaining loaders are in the Disable state, the signal lines connected to the outputs of the disabled loaders are all in the Floating state, and since the floating signal lines and the outputs of the loader 450-1 of group 1 are interconnected, the same signal is applied to the floating signal lines as the signal output from the loader of group 1.

The signals output from the first group Loader are in a high impedance (Hi-z) state. Due to this high impedance condition, the output signals from the first group Loader 450-1 can couple with the signals formed on floating signal lines at the intersections, replicating the same signals. This process can lead to mutual interference among the output signal lines from the first group Loader 450-1, which could result in detection errors due to noise intrusion.

Furthermore, an undesired parasitic capacitance, originating from the floating signal lines, might be added to the output detection signal lines from the first group Loader 450-1, which could lead to a reduction in sensitivity.

Figure 21A:
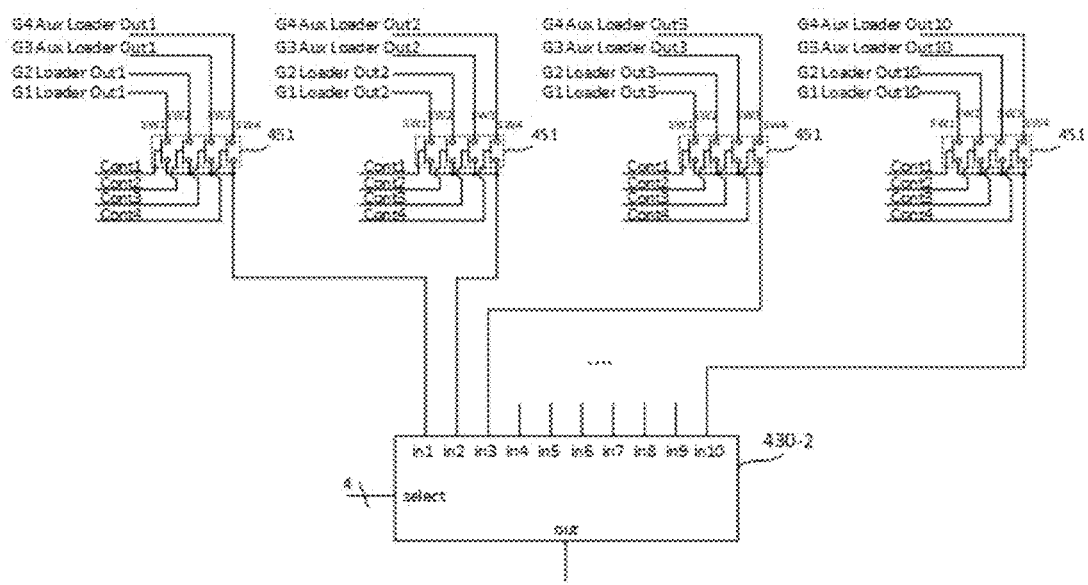
FIG. 21A is an embodiment of the present invention for selecting a detection signal line at a loader selector.

FIG. 21A is an embodiment of the present invention that addresses this introduction of noise by selecting a detection signal line at the loader selector.

Referring to FIG. 21A, a loader selector 451 is placed between the sensing signal output from the loader 450 of each group and the AMP input signal line selectors 430-2. The loader selector selects one of the output signals of the same component output from the loaders placed in each group and inputs it to the AMP input signal line selector but prevents it from being electrically connected to the floating signal line, thereby overcoming the problems described above.

The loader selector 451 comprises a unit switching set of at least the same number of switching elements as the number of groups. A switching group of the loader selector is a unit element that selects one of a plurality of signal lines with the same output component output from the loader, and the loader selector 451 comprises a plurality of switching groups equal to the number of signal lines output from the loader.

FIG. 20, an embodiment of the present invention, consists of four groups and ten detection signal lines output from each loader, so the loader selector comprises four switching elements and requires ten loader selectors 451.

The outputs of the loader selector, which consists of four switching elements, are connected in common and input to the AMP input signal line selector 430-2.

According to the embodiment of FIG. 21A, the detection signal lines output from the four loaders 450 are respectively input to the switching elements comprising the loader selectors 451, and when one switching element per loader selector is turned on by the four turn-on/turn-off control signals (Cont1 to Cont4) supplied in common to the switching elements of all loader selectors, ten detection signal lines are selected from the ten loader selectors, input to the AMP input signal line selector, and output from the AMP input signal line selector sequentially one by one for processing to detect the object capacitance.

The control signals (Cont1 to Cont4) of the loader selector 451 may be supplied by the CPU 460 comprising the semiconductor IC 400, or by a logic part or another CPU separate from the semiconductor IC. When the loader selector 451 is placed in the display device, the turn-on/turn-off voltage of the loader selector 451 may differ in level from the turn-on/turn-off voltage provided by the semiconductor IC 400, so the voltage level difference may be corrected through the level shift 439 as described above.

The detection signal line selected by the loader selector 451 is a signal output from the activated loader 450, and the activated loader 450 is determined by the output control signal of the loader 450, LD's Enable, so LD can be used as a turn-on/turn-off control signal for the loader selector.

Figure 21B:
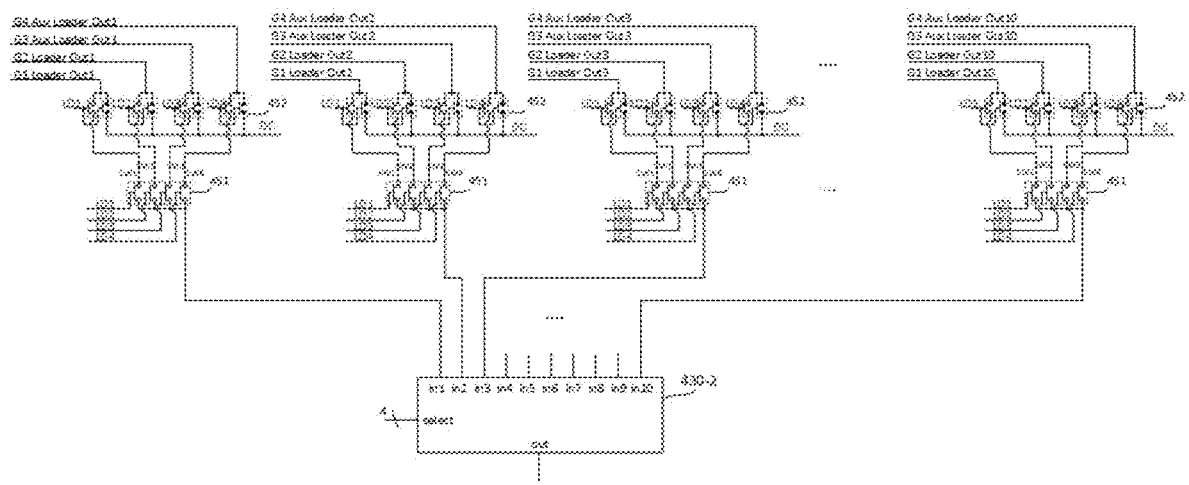
FIG. 21B is an embodiment of the present invention regarding a method for fixing a floating signal line to DC using a detection signal line/DC changeover switch.

Referring to the loader selector 451 of FIG. 21B, the output control signals LD1 to LD4 of the loader 450 of FIG. 20 are used as control signals for the loader selector 451.

By using LD, the output control signal of the loader 450, as the output control signal of the loader selector, the turn-on/turn-off control signal of the loader selector provided by the semiconductor IC is omitted, which contributes to the reduction of the area of the semiconductor IC 400. In addition, if the loader selector 451 is embedded in the display device, it has the advantage of minimizing the material for connection 300 and simplifying the fanout, thereby increasing the flexibility of the signal line layout.

On the other hand, no signal is applied to the floated signal line connected with the output of the deactivated loader due to the introduction of the loader selector 451, but noise due to interference of the output signal of the activated loader is introduced into the floated signal line by capacitive coupling at the intersection with the output signal of the activated loader. Since the noise introduced into the floated signal line induces signal interference by coupling at the intersection with the activated signal line in a high impedance state, and the induced signal affects the signal of another activated signal line, the strength of the interference signal is weakened compared to the previous embodiment in which a signal is applied directly to the floated signal line, but the interference of the signal still exists, causing an error in the sensing signal.

FIG. 21B is an embodiment of the present invention to address these problems and illustrates one embodiment of the present invention for securing a floating signal line to DC using a signal line/DC changeover switch 452.

In FIG. 21B, a signal line/DC switch is placed between the loader 450 and the loader selector 451. The signal line/DC switch consists of at least two or more switching elements, and one is placed for each sensing signal output from the loader. Therefore, four signal line/DC changeover switches 452 are connected to one loader selector, and a total of 40 signal line/DC changeover switches 452 are placed, one for each of the 40 detection signal lines output from the four loaders.

The detection signal line common to the two switching elements comprising the signal line/DC changeover switch 452 is input to the loader selector 451 or the AMP input signal line selector 430-2 or connected to a predetermined DC voltage depending on the operating state of the switching element.

In FIG. 21B, two switching elements are used in the signal line/DC changeover switch 452, but three or more switching elements may be used, and two or three switching elements connected in parallel may perform the same function, in which case they are shown as one switching element, and more switching elements may be used to connect to other states such as floating or Hi-z in addition to DC.

Individual turn-on/turn-off control signals (not shown) provided by the semiconductor IC 400 are connected to the gates of the two switching elements comprising the signal line/DC changeover switch 452 used in FIG. 21B. One of the two switching elements is turned on by the turn-on signal formed by the control signal of one of the individually connected control signals for each switching element. The other side of one of the two switching elements comprising the signal line/DC changeover switch 452 is connected to the loader selector 451 or the AMP input signal line selector 430-2, and the other side of the other switching element is connected to a predetermined DC voltage.

DC is a DC voltage having a predetermined magnitude and includes the GND of the system. In the present invention, the DC potential is preferably GND.

When the signal lines in the floating state output from the deactivated loader 450 are connected to the DC potential by the operation of the signal line/DC switch, they are no longer in the floating state, so the interference caused by the capacitive coupling described above does not occur, and the sensing error of the detection signal line no longer occurs.

The two switching elements comprising the signal line/DC changeover switch 452 can be designed such that one switching element is turned on and the other is turned off in response to a control signal. For example, a simple embodiment is to configure the switch with one NMOS and one PMOS. Alternatively, two switches can be constructed with a combination of NMOS and PMOS, a plurality of NMOS alone can construct two switches with opposite behavior, and a plurality of PMOS alone can construct two switches with opposite behavior. In this specification, two switching elements are referred to as a filled switching element and an unfilled switching element to indicate that the switching elements have opposite operations for a single control signal. Filled switching elements are turned on for a low signal and turned off for a high signal. On the contrary, the switching element that is not filled is turned on for the high of the control signal and turned off for the low.

Controlling two switching elements with one control signal has the advantage of reducing the number of control signal lines provided by the semiconductor IC, thereby reducing the number of output pins of the semiconductor IC, and reducing the cost of the semiconductor IC area.

Since the detection signal line selected by the signal line/DC switch is the output signal of the activated loader 450, it is possible to use LD, the output control signal of the loader, as the turn-on/turn-off control signal of the signal line/DC switch. FIG. 21B is an embodiment of using LD as a control signal for the signal line/DC changeover switch 452, in which LD is used as a common control signal for the signal line/DC changeover switch 452, and the LD signal of the same loader for each group is used for the signal line/DC changeover switch 452.

With this LD connection method, the signal line/DC changeover switch 452 passes the sensing signal output from the activated loader 450 to input to the loader selector or AMP input signal line selector, and the output signal line of the deactivated loader is connected to the DC potential, so the existing floating signal line has a DC potential. In addition, the signal line/DC changeover switch control signal provided by the semiconductor IC is unnecessary, which further contributes to the lightweight (or small dimension) of the semiconductor IC.

As such, the present invention provides that the detection signal lines output from a plurality of loaders 450 are connected in common to a plurality of switching elements comprising a signal line/DC changeover switch 452, and only the output signal of the loader 450 activated by the signal line/DC changeover switch 452 is selected and input to the loader selector 451 or the AMP input signal line selector 430-2, and the output signal of the deactivated loader 450 is connected to a predetermined DC voltage.

Figure 21C:
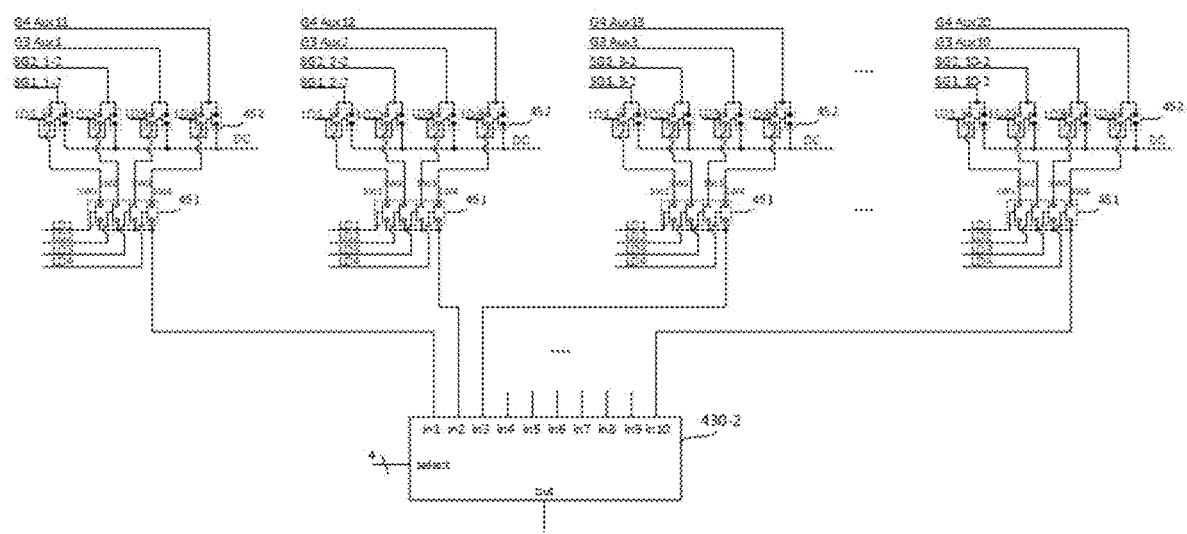
FIG. 21C is an embodiment of the present invention without the use of a loader.

FIG. 21C is an embodiment of the present invention without the use of a loader.

Referring again to FIG. 21B, the signal line/DC changeover switch 452 functions to output or connect the detection signal line input from the four loaders 450 with DC, so the function of outputting the input signal line based on the output control signal is the same as that of the loader 450, and the function of selecting one of the four signal lines to output is the same as combining the four loaders into one. In addition, compared to the existing loader, an improved performance of fixing the floating signal line with DC is added.

Therefore, even if the loader 450 is removed as shown in FIG. 21C, the operation result of the system is the same because the signal line/DC changeover switch 452 plays the same role as the loader.

FIG. 21B is an embodiment in which the sensing signal output from the loader 450 is input to the signal line/DC changeover switch 452, and FIG. 21C is an embodiment in which the sensing signal is input directly from the CDA column to the signal line/DC changeover switch 452. Rather than saying that the loader is removed, it is more appropriate to say that the loader is included in the signal line/DC changeover switch, and the terms loader and signal line/DC changeover switch are used interchangeably herein. If only the loader is used, it should be understood that DC voltage is applied to the floating signal line in the same way as if a signal line/DC changeover switch is used.

The purpose of the loader selector 451 is to disconnect the active sensing signal from the floating sensing signal. Since the signal line/DC changeover switch not only disconnects the detection signal line from the floating signal line, but also fixes the floating signal line to DC, the loader selector may be removed once the signal line/DC changeover switch is placed.

Figure 21D:
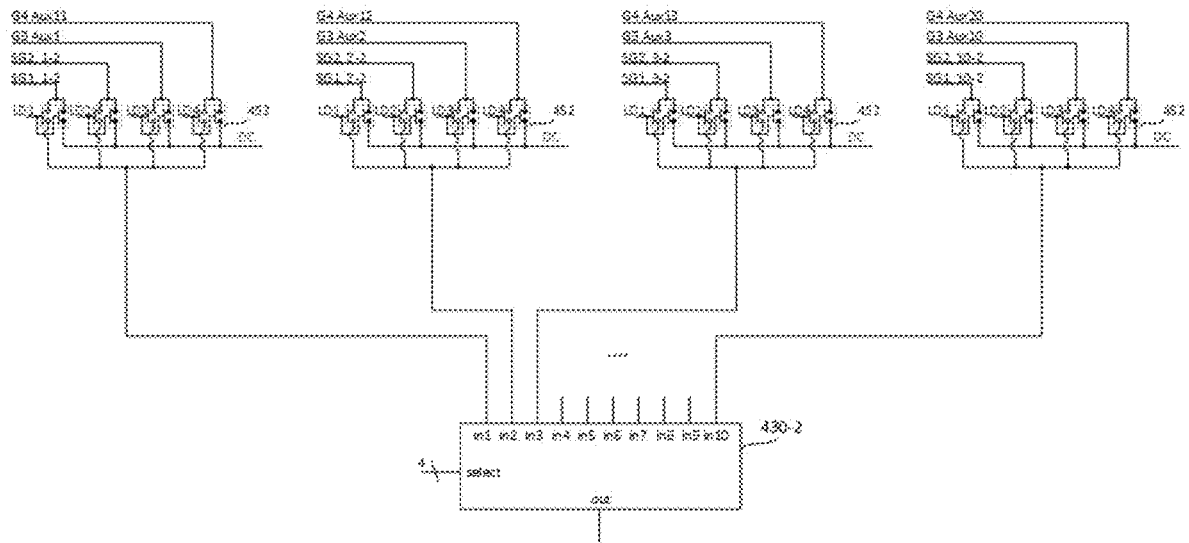
FIG. 21D is an embodiment of the present invention using only a signal line/DC changeover switch.

FIG. 21D is an embodiment of the present invention in which the loader selector 451 is removed and only a signal line/DC changeover switch is used.

Referring to FIG. 21*d*, the signal line/DC switching switch 452 forms a set with detection signal lines that have the same output components. In this set, each detection signal line outputted from each group is commonly inputted to two switching elements that form a unitary switching set. One of the outputs from the two switching elements is commonly connected and inputted to the AMP input signal line selector 430-2 while the output from the other switching element is connected to the DC.

In this way, the present invention can reduce the number of detection signal lines inputted to the AMP input signal line selector and eliminate floating signal lines using only the signal line/DC changeover switch 452. This allows for effective signal detection with fewer components.

The second CDA column of the present invention has the function of transmitting an uplink or Tx signal to the pen. The processing of the Tx transmit signal is performed in the Tx transmit section of the semiconductor IC 400. The Tx signal is transmitted as a digital signal consisting of high and low, and the magnitude of the Tx high voltage and the magnitude of the Tx low voltage are mostly determined as unique values for each pen. When a Tx signal is applied from the second CDA column of the present invention or the longitudinal linear sensor pattern 5*a* or the transverse linear sensor pattern 5*b* of the cited FIG. 2, the receiving part inside the pen detects it, collects information for motivation such as the range of the output frequency for mutual communication or the location or ID of the data at the output frequency, and transmits the Rx signal according to such information.

Depending on the purpose of transmitting Tx or receiving Rx, the second CDA column must be converted into a structure for transmitting Tx signals and connected to a Tx transmitter, or a structure for receiving Rx signals and connected to an Rx receiver for processing Rx signals. Therefore, the present invention introduces a Tx/Rx changeover switch to set the signal line of the second CDA column to a structure for transmitting Tx or a structure for receiving Rx. Furthermore, in the semiconductor IC 400, the CPU or logic connects the signal line of the second CDA column to the Tx transmitter and the Rx receiver according to Tx or Rx.

In this specification, a Tx/Rx changeover switch consists of two switching elements, and each of the two switching elements has a turn-on/turn-off control signal "G3 Tx/Rx changeover switch_Cont1" and "G3 Tx/Rx changeover switch_Cont2" connected to the gate of the switching element. G3 indicates the control signal used for group 3, and if it is a control signal applied to group 4, it is used as "G4 Tx/Rx changeover switch_Contx". This means that the Tx/Rx changeover switch used for group 3 and group 4 can be operated separately, i.e., it is possible to transmit Tx signals or receive Rx signals simultaneously from multiple column groups such as group 3 and group 4, or to transmit Tx signals or receive Rx signals from only one column group, as required.

Since the Tx/Rx changeover switch functions to convert the CDA column into either a structure for Tx transmission or a structure for Rx reception, it can be designed so that one of the two switching elements (SW1 to SW2) is turned on and one is turned off in response to a single turn-on/turn-off control signal.

Figure 24:
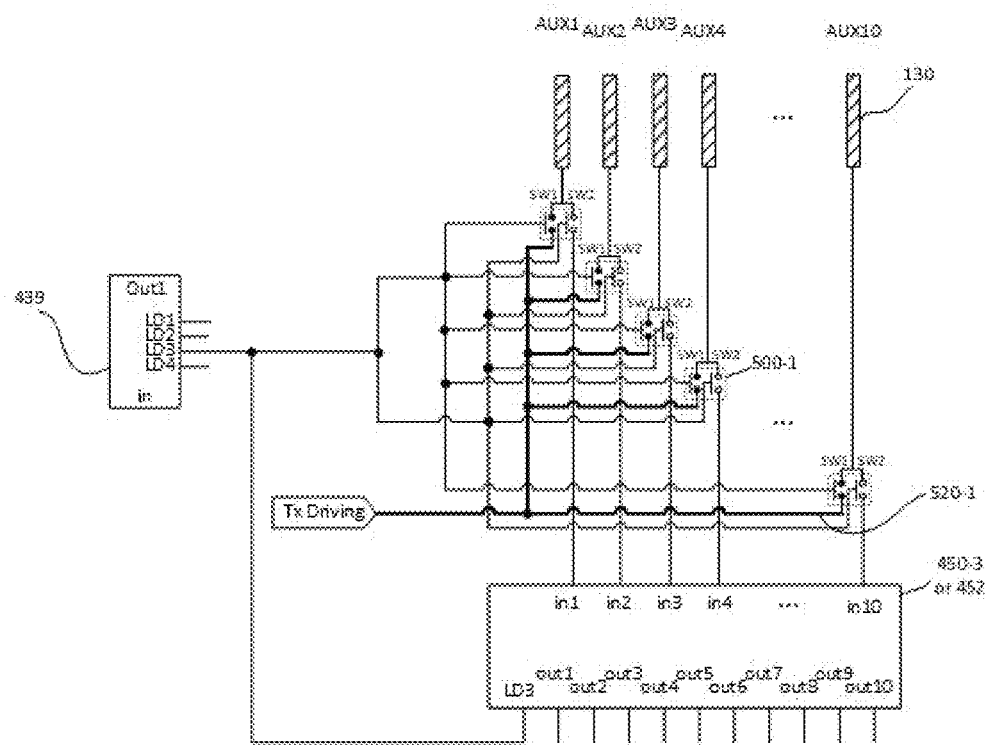
FIG. 24 is an embodiment of the present invention relating to a method of applying one control signal to a Tx/Rx changeover switch1 comprising two switching elements.

The Tx/Rx changeover switch may comprise a switching element that performs the same dynamic operation as the PMOS and NMOS embodiments described above, and alternately performs turn-on and turn-off by one control signal that is commonly connected to the gate. This description is illustrated in FIG. 24, and is equally applicable to FIGS. 22 and 25, where a turn-on/turn-off control signal is applied to each of the two switching elements, since a single control signal can be supplied.

For this function, the input and output terminals of one of the two switching elements are filled, and the input and output terminals of the other switching element are not filled to distinguish them. In the device of the present invention comprising two switching elements that operate dynamically, one switching element is turned on and the other switching element is turned off by a turn-on/turn-off control signal. This has the effect of reducing the two control terminals associated with each switching element to one. Due to this technical idea, "Tx/Rx changeover switch_Cont1" and "Tx/Rx changeover switch_Cont2" of FIG. 25A to FIG. 25C may be replaced by a single control signal such as the LD signal of FIG. 25D.

The signal line of the second CDA column, which is common to the Tx/Rx switch, is selectively connected to the transmit configuration or the Rx receiver depending on the operation of the Tx/Rx switch.

In this specification, the second CDA columns comprise Group 3 and Group 4, of which the second CDA column comprising Group 3 is used as an embodiment. The embodiment of the second CDA column comprising Group 3 is not limited to Group 3 and is equally applicable to Group 4. The same applies to more groups comprising a second CDA column.

Referring to FIG. 22, the Tx/Rx changeover switch of the present invention has a CDA signal line as a common input. Tx/Rx changeover switch1 500-1 is placed on the lower side of the second CDA column, and Tx/Rx changeover switch2 500-2 is placed on the upper side of the second CDA column. Tx/Rx changeover switch1 and Tx/Rx changeover switch2 are merely indicative of being placed in different positions, such as on the top and bottom, and the Tx/Rx changeover switch on the top may be labeled as Tx/Rx changeover switch1 and the Tx/Rx changeover switch on the bottom may be labeled as Tx/Rx changeover switch2. It is also possible to have a Tx/Rx changeover switch on the left or right side of the second CDA column, meaning that the One side and the other side of the second CDA column can have a Tx/Rx changeover switch on either the top or bottom or left or right side.

Tx/Rx changeover switch1 and Tx/Rx changeover switch2 can be used interchangeably as Tx/Rx changeover switch, as long as the meaning is clear.

When the second CDA column of the present invention is composed of a single CDA, when the display device becomes larger, such as 17 inches, the value of the common electrode capacitance Ccm and the interline capacitance Cd formed in the single CDA becomes larger, and as a result, the value of the first detection signal and the second detection signal detected in the detection signal line may be smaller than the CDA comprising the first CDA column, which may cause the coverage of the ADC or DAC to be expanded and the resolution to be reduced. To solve this problem, the CDAs comprising the second CDA column can be separated into multiple CDAs, such as two or three.

When a plurality of CDAs comprise the second CDA column, a detection/driving signal line switch group 437 is added to the second CDA column to separate the plurality of CDAs into a detection signal line and a driving signal line. Also, when transmitting a Tx signal or receiving an Rx signal, the plurality of CDAs can be combined into one by the operation of the switching element not shown. Therefore, when a second CDA column is formed with multiple CDAs, a Tx/Rx changeover switch1 is placed on the lower of CDA and a Tx/Rx changeover switch2 is placed on the upper of CDA. On the other hand, when a second CDA column is formed with one CDA, Tx/Rx changeover switch1 is placed on the signal line connected to the bottom of the CDA, and Tx/Rx changeover switch2 is placed on another signal line connected to the top of the CDA.

Tx/Rx changeover switches are placed in a number equal to or greater than the number of second CDA columns included in a group. When a Tx signal is transmitted, it is desirable that the Tx signal is transmitted simultaneously using all the second CDA columns forming the same group, so all the CDAs forming the second CDA columns of the same group have a common connection at a point and apply the Tx driving signal to the connected point.

One CDA signal line originating from the second CDA column forming one column group is commonly input to the Tx/Rx changeover switch 500-1, and the output signal lines of the first switching element SW1 of the plurality of Tx/Rx changeover switches are all connected to a point and connected to the Tx driving signal line1 520-1.

When the Tx driving signal line1 520-1 is placed in the display device, it is preferably placed in the non-display area between the second CDA column and the semiconductor IC 400.

This has the advantage that the CDA signal line comprising the second CDA column is connected to the Tx driving signal line1 520-1 over the shortest distance, so the line resistance of the CDA signal line does not increase, and the layout is carried out over the shortest distance, minimizing the probability of interference with other signal lines.

If the Tx driving signal line1 520-1 cannot be placed between the second CDA column and the semiconductor IC 400 due to layout problems, it is possible to place it in the non-display area on the left or right side of the display.

When the second CDA column receives the Rx signal from the pen or detects the object capacitance, the first switching element (SW1) of the Tx/Rx changeover switch1 is turned off and the other switching element (SW2) is turned on, and the CDA signal line of the second CDA column is connected to the loader 450 or the signal line/DC changeover switch 452.

Figure 22A:
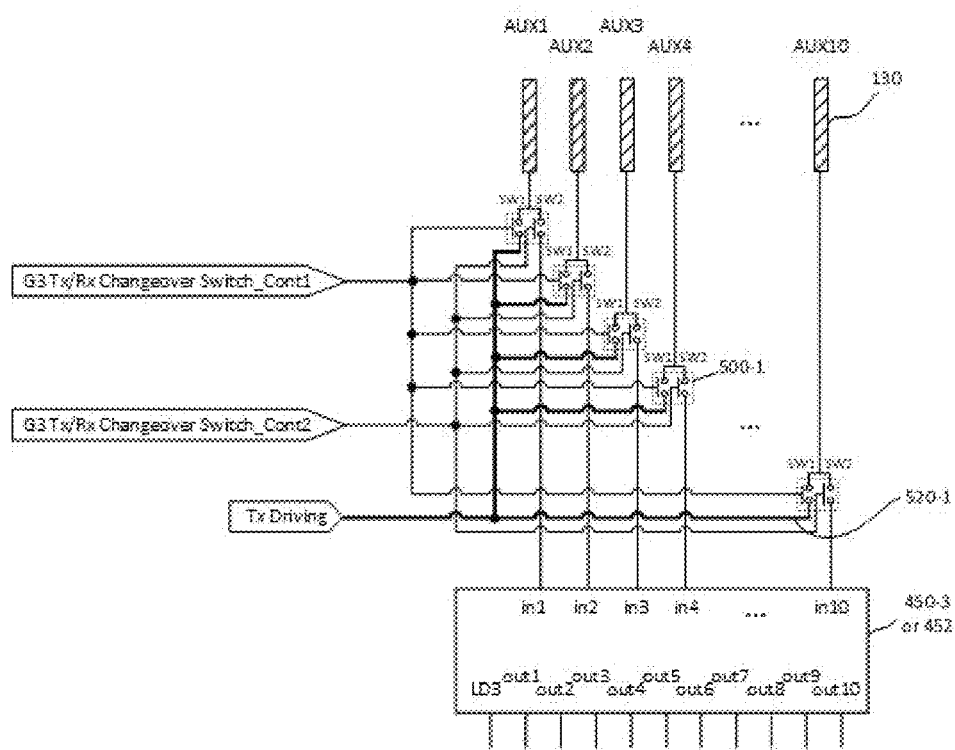
FIG. 22A is an embodiment of the present invention where the Tx/Rx changeover switch is located between the second CDA column and the loader.
Figure 22B:
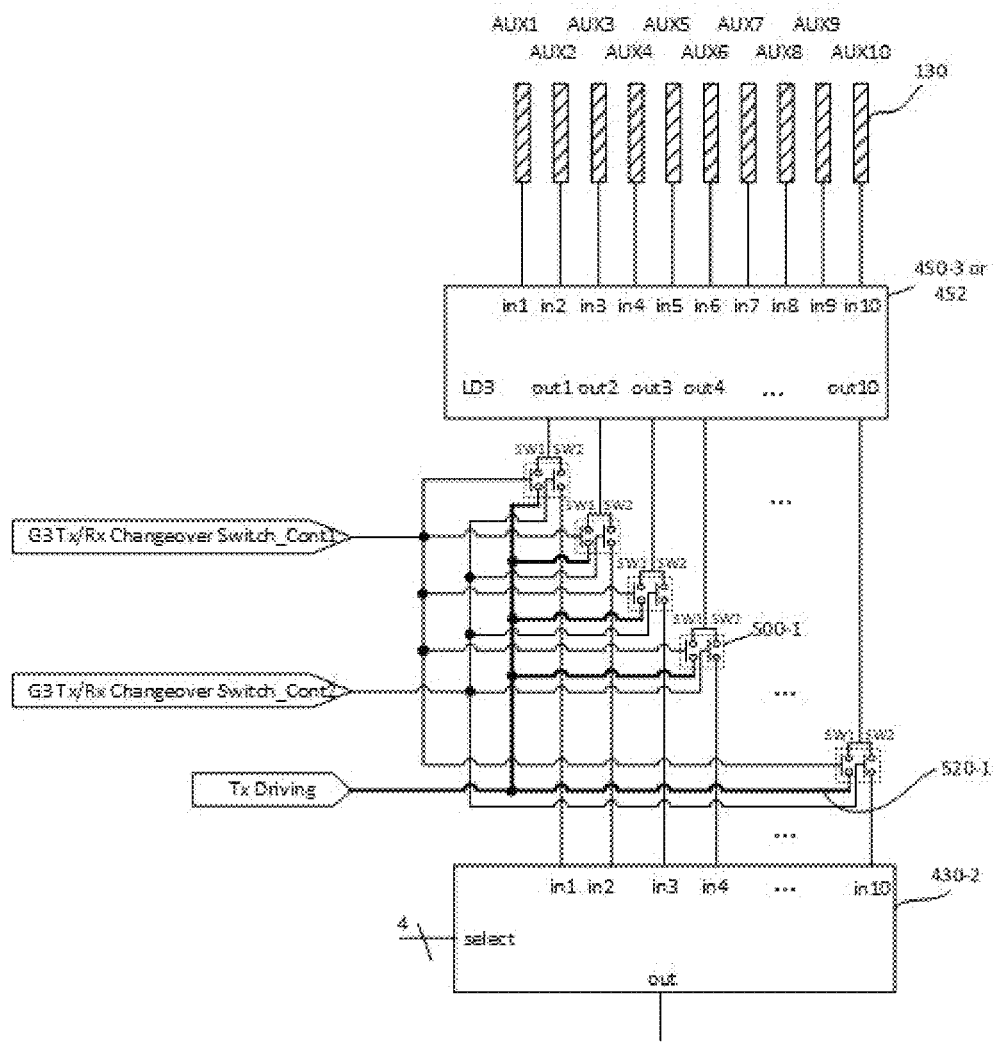
FIG. 22B is an embodiment of the present invention in which the Tx/Rx changeover switch is located between the loader and the AMP input signal line selector.

Meanwhile, the Tx/Rx changeover switch1 may be located between the first CDA2 column and the loader or signal line/DC changeover switch as shown in FIG. 22A, or it may be placed on the lower side of the loader 450 or signal line/DC changeover switch as shown in FIG. 22B. In either case of FIG. 22A or FIG. 22B, the effect is the same in that the Tx drive signal is applied or the floated signal lines are connected to DC, so the required method can be selected according to the ease of layout.

The Tx driving signal line1 in FIG. 22 requires a Tx high voltage and a Tx low voltage to be applied to the Tx signal, and this Tx driving signal is applied through a signal line connected to the semiconductor IC 400. Therefore, the Tx driving signal supplied by the semiconductor IC includes a Tx high voltage and a Tx low voltage that constitute the Tx driving signal. As described later, Tx high boost voltage and Tx low boost voltage can be used for fast rising time and fast falling time of Tx driving signal, and Tx driving voltage supplied by semiconductor IC to Tx driving signal line1 can be applied with four voltages by adding Tx high boost voltage and Tx low boost voltage.

Figure 23:
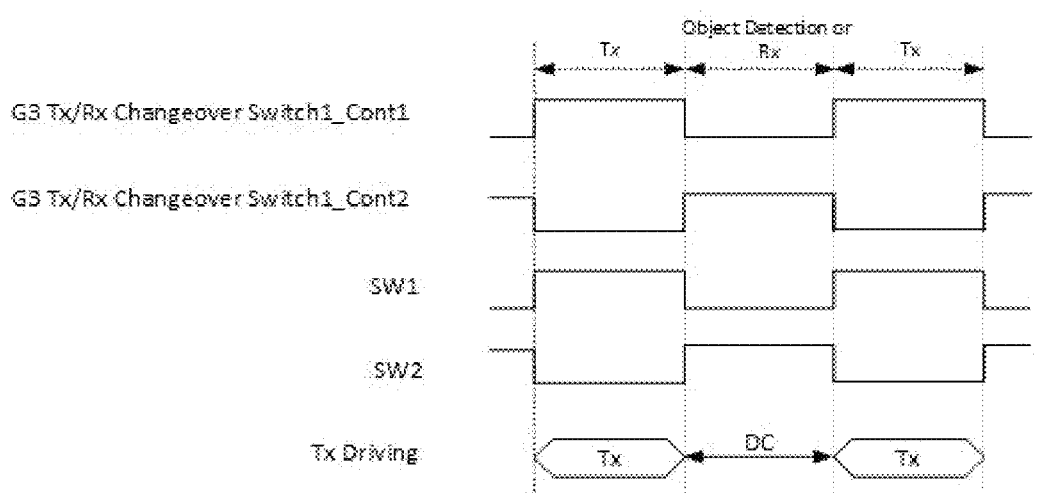
FIG. 23 is an illustration of one embodiment of the present invention regarding a method for applying a Tx signal and a method for detecting an object capacitance.

FIG. 23 is an illustration of one embodiment of the present invention regarding a method for applying a Tx signal and a method for detecting an object capacitance.

Referring to FIG. 23, the control signal (G3 Tx/Rx changeover switch1_Cont1) connected to the gate of all the Tx/Rx changeover switch1 of group 3 becomes high to turn on the switch 1 (SW1) of the Tx/Rx changeover switch1, and thereby all the switches 1 (SW1) comprising the Tx/Rx changeover switch1 of group 3 are turned on. (For reference, in this specification, a switch turned on is indicated by a high state and a switch turned off is indicated by a low state)

The output signals of SW1 of Tx/Rx changeover switch1 of group 3 are all connected to Tx driving signal line1, and it is possible to transmit Tx signals by the driving signal (Tx Driving) provided by the semiconductor IC. Currently, it is possible to transmit Tx signals from one of the groups, either group 3 or group 4, or to transmit Tx signals from group 3 and group 4 simultaneously. In the case of transmitting Tx signals from group 3 or group 4, it is preferable to transmit Tx signals from only one group to reduce the current consumption when it is clearly determined that the pen is on the left or right side of the display. (When receiving Rx signals, the same as when transmitting Tx signals, it is possible to perform in only one group or in both groups).

When the Tx transmission is completed, the Pen transmits the Rx signal according to the protocol written in the Tx signal. To transmit the Tx signal, all CDAs of the second CDA column of Group 3 that are connected to each other are disconnected, and for this purpose, the first switching element (SW1) of the Tx/Rx changeover switch1 is turned off and the other switching element (Sw2) is turned on. In addition, the CDA detection signal line that constitutes the second CDA column inside the semiconductor IC is connected to the Rx receiving part of the semiconductor IC, where the Rx signal analysis and pen position analysis are performed.

Meanwhile, if the Tx driving signal line is floated in the Rx signal reception stage, an error in the sensing signal may occur due to the coupling occurring at the intersection of the detection signal line and the floating signal line as described above, so it is preferable that the Tx driving signal line is connected to a predetermined DC voltage. Since the Tx drive signal is supplied by the semiconductor IC, the semiconductor IC supplies either 0V (Zero Volt), which is the GND potential, or a predetermined DC potential to the drive signal so that the Tx driving signal line1 has a predetermined voltage potential.

If the pen exists, it can be assumed that the Rx signal will be detected, but if the Rx signal is not detected, the pen does not exist, and then to detect whether there is an object such as a finger, the detection signal lines are input to the AMP input signal line selector, and the process is performed to detect the object capacitance. For quick search, the object is detected only in the second CDA column, and a driving voltage consisting of a first stage driving voltage and a second stage driving voltage is applied to the driving signal line enclosing the detection signal line of the second CDA column and the shielding capacitance formed on the detection signal line of the second CDA column. Then, a plurality of detection signal lines input to the AMP input signal line selector 430-2 are sequentially output, and the magnitude of the object capacitance is detected by the operation of the differential amplifier, ADC, and DAC.

At this time, the existence of an object can be known first by a quick search that detects the object capacitance in a short time using only the second CDA column consisting of a minimum number of CDAs such as one or two, and if there is an object, the process of detecting the object capacitance is also carried out in group 1 and group 2 consisting of the first CDA column to obtain the complete coordinates of the object, and if there is no object, the semiconductor IC enters sleep or standby to reduce current consumption.

In FIG. 23, transmitting Tx after Rx reception or object sensing is completed is an embodiment, but it is possible to perform various operations depending on the purpose, such as continuing to receive Rx signals, detecting the coordinates of a pen using Rx signals, detecting the coordinates of an object such as a finger, or entering sleep or standby, as needed.

FIG. 24 is an embodiment of the present invention relating to a method of applying one turn-on/turn-off control signal to a Tx/Rx changeover switch1 comprising two switching elements to achieve the purpose of the device.

The LD signal is an output control signal used for the Loader 450-3 or the signal line/DC changeover switch 452 and is connected to the gates of the two switching elements (SW1 and SW2) that comprise the Tx/Rx changeover switch1. The LD control signal line common to the gates of the switching elements comprising the Tx/Rx changeover switch1 can be replaced by another control signal line supplied by the semiconductor IC, but due to the problem of increasing the number of pins comprising the semiconductor IC, the LD signal is preferably used.

Depending on the voltage level of the turn-on/turn-off control signal (LD) commonly connected to the gate of the switching elements comprising the Tx/Rx changeover switch1, one of the switching elements is turned on and the other is turned off, and the two switching elements operate dynamically.

By this design method, all SW1 of Tx/Rx changeover switch1 is energized by LD, which is a disable signal in a low state, and the CDA signal line of the second CDA column is connected to the Tx driving signal line1 520-1.

Additionally, it is preferable for all signal lines connected to the output terminal of the switching element 2 (SW2) to be connected to the DC potential. Referring to FIG. 21C to 21d, in all groups, a low state of LD is applied. If the LDs (LD1 to LD4) of all groups are in a disable low state, all signal lines connected to the output terminal of the switching element 2 (SW2) are connected to the DC potential due to the operation of the signal line/DC changeover switch.

When LD of Group 3 and Group 4 are both low, all CDAs of Group 3 and Group 4 are connected to Tx driving signal line1 520-1 by the operation of Tx/Rx changeover switch, so Tx Driving signal is applied to all CDAs comprising Group 3 and Group 4 by Tx Driving signal applied to Tx driving signal line1 520-1.

In this way, the present invention allows for the circuit design that can perform various operations by using a single turn-on/turn-off control signal commonly for the Tx/Rx changeover switch and Loader 450 or the signal line/DC changeover switch 452. This design enables changing the structure of the CDA to either apply the Tx signal or detect the Rx signal or fix the floating signal line to DC depending on the purpose.

Meanwhile, if the second CDA column is composed of a small number of CDAs, such as one or two, the value of the common electrode capacitance (Ccm) increases because the area where the display device 10 and the CDAs are facing each other becomes wider. To transmit digital information using the Tx driving signal to the pen, the specifications for the rising time and falling time prescribed by the pen must be satisfied. In one embodiment, the USI (Universal Stylus Initiative) specification suggests 300 ns as the rising time and falling time for uplink based on 80% change. In other words, for a Tx High driving voltage of 3V, the rising time from 0V to 2.4V, which is 80% of 3V, must be within 300 ns, and the falling time from 3V to 0.6V must be within 300 ns to recognize high or low for the Tx signal.

Since the Tx driving signal line1 520-1 must be placed in a narrow invisible area of the display device, it may be difficult to install it in a large area, and the CDA signal line of the second CDA column also requires a certain distance to connect with the Tx driving line, a certain line resistance R_line is formed due to the Tx driving signal line1 and the CDA signal line. In addition, C_total, a composite capacitance including common electrode capacitance (Ccm), interline capacitance (Cd), shielding capacitance (Cin_sd), and other parasitic capacitances, is formed in the CDA, so a time constant (τ) called τ=R_line*C_total is formed in the second CDA column by line resistance R_line and composite capacitance C_total is formed, and the time constant (τ) determines the rising time and falling time of the Tx transmission signal according to [Equation 9] or [Equation 10] as below.

The following [Equation 9] represents the magnitude of the voltage across the second area CDA that constitutes the second CDA column, as the Rising Time(t) elapses for the Tx High driving voltage, Vh.

$$V(t)=Vh(1-e^{-t/\tau})$$ [Equation 9]

Meanwhile, the following [Equation 10] represents the magnitude of the voltage across the second area CDA that constitutes the second CDA column, as the Falling Time(t) elapses for the Tx Low driving voltage, Vl.

$$V(t)=Vl*e^{-t/\tau}$$ [Equation 10]

Referring to [Equation 9] or [Equation 10] above, for the initial voltage Vh or Vl, if t is the same as the time constant τ, it shows a fluctuation rate of about 63.2%, and at 2τ, it shows a fluctuation rate of about 86.5%, so it takes about 2τ to satisfy the Tx High or Tx Low specification in the USI specification that specifies the Tx Rising Time or Falling Time with a signal fluctuation rate of 80%.

Since the time constant (τ) is determined by τ=R_line*C_total, if 2τ does not meet the USI specification for 300 ns, the number of CDAs comprising the second CDA column should be separated from one to two, or three or four to reduce the magnitude of the common-electrode capacitance and interline capacitance, or the magnitude of the resistance R_line should be reduced by widening the width of the Tx driving signal line and widening the width of the CDA signal line.

However, if you increase the number of CDAs that make up the second CDA column, the quick search to determine the presence or absence of an object takes a lot of time and complicates the circuit, and lowering the resistance value is often not possible due to the limitations of the layout.

Figure 25A:
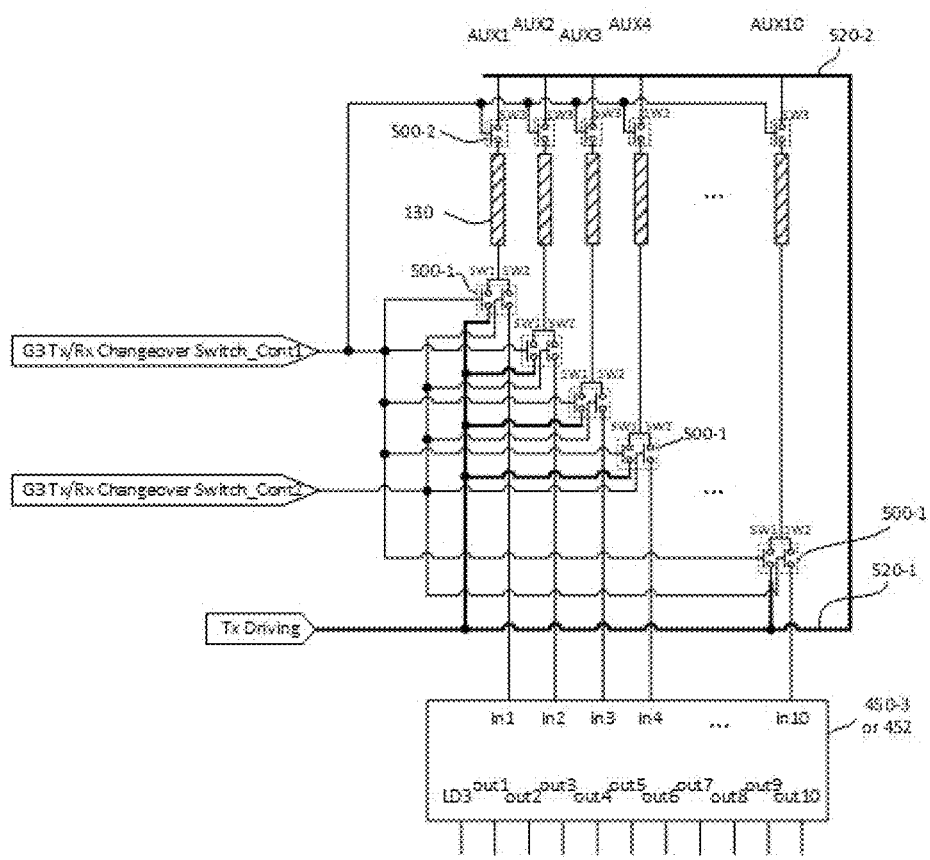
FIG. 25A is an embodiment of the present invention with the addition of a Tx driving signal 2.

FIG. 25 is an embodiment of the present invention that addresses these issues, and FIG. 25A is an embodiment of the present invention with the addition of a Tx driving signal line2.

Referring to FIG. 25A, a Tx driving signal line2 520-2 is added to the non-display area on the other side of the display device facing to the Tx driving signal line1 520-1. The Tx driving signal line2 520-2 may be separated from or connected to the Tx driving signal line1 520-1, and when interconnected, they are interconnected via a connection line placed on one side of the non-display area of the display device.

In the embodiment of FIG. 25A, the Tx driving signal line 2 520-2 is placed in the upper invisible area of the display device facing to the Tx driving signal line1 520-1, and a Tx/Rx changeover switch2 500-2 comprising one or more switching elements SW3 is placed between the CDA comprising the second CDA column and the Tx driving signal line 2.

In the second area CDA that constitutes the second CDA column, two signal lines are drawn up and down, but on the upper side of the CDA, the CDA signal line is drawn in the opposite direction from the CDA signal line drawn from the lower side of the CDA, and is input to the first terminal of the switching element SW3 that constitutes the Tx/Rx changeover switch2 500-2, and the signal line is drawn from the other terminal of the switching element SW3 and connected to the Tx driving signal line2 520-2.

In the embodiment of FIG. 25A, Tx/Rx changeover switch2 500-2 is composed of one switching element (SW3), which is connected to Tx driving signal line2 520-2 when applying a Tx driving signal and disconnected from Tx driving signal line 2 when not applying a Tx drive signal. This behavior is the same as that of SW1, which is a single switching element comprising Tx/Rx changeover switch1.

Therefore, "Tx/Rx changeover switch_Cont1", which is connected to the gate of SW1 comprising Tx/Rx changeover switch1, can also be connected to the gate of SW3 comprising Tx/Rx changeover switch2. In addition, it is possible to connect one control signal (LD3 in this specification) to all gates of Tx/Rx changeover switch1 and Tx/Rx changeover switch2 with one control signal in FIG. 25A, the same as in the embodiment of FIG. 25D, where one control signal line is connected to the gates of two switching elements comprising Tx/Rx changeover switch1.

If a single CDA is used to form a second CDA column, the length of the CDA is 10 cm to 20 cm or more. Since the CDA is made of ITO (Indium Tin Oxide) or Metal Mesh on the top surface of the display, it has a resistive characteristics, so when the Tx driving signal is applied, the common electrode capacitance (Ccm) and the interline capacitance (Cd) are charged sequentially from the place where the signal is applied, and the last part of the CDA with the largest resistance is charged last.

For this reason, when the Tx drive voltage is applied from both sides of the CDA, the resistance of the CDA is separated into two places, reducing its magnitude by approximately 50%. This also results in a decrease of about 50% in the charge quantity of the common electrode capacitance (Ccm) and the interline capacitance (Cd). Therefore, the time constants (T) in Equations 9 and 10 are reduced by 50%, leading to a fourfold improvement in the charging time of the common electrode capacitance (Ccm). That is, applying the Tx drive voltage from both sides of the CDA results in a fourfold improvement in the Tx Rising Time and Falling Time. (However, it's worth noting that this reduction in time is under the assumption that there's almost no shielding capacitance. Since the charge quantity of the shielding capacitance does not change, the time constant becomes greater than 25%). For this reason, the present invention has the effect of improving the rising and falling time by a factor of four by applying a Tx signal in both directions of the CDA signal line comprising the second CDA column, as shown in the embodiment of FIG. 25A.

Figure 25B:
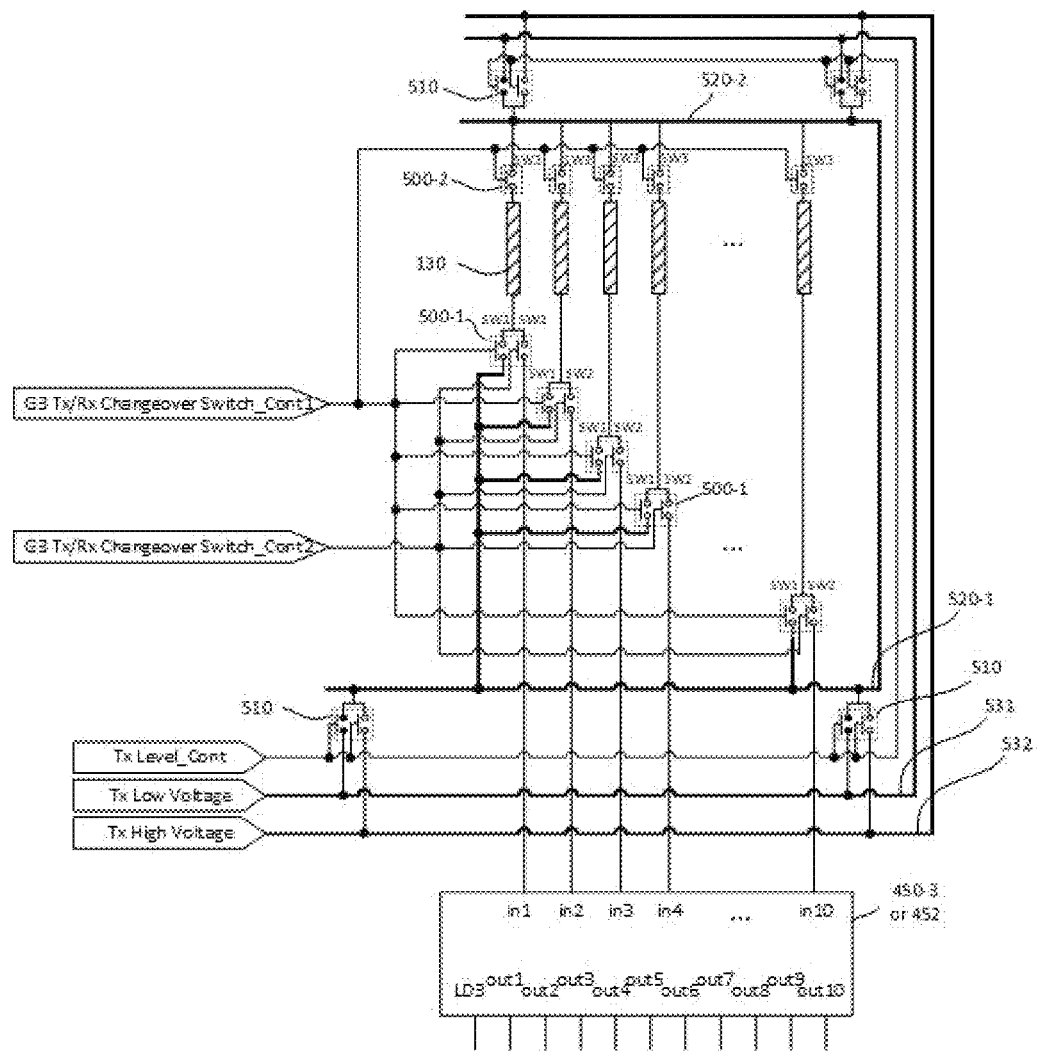
FIG. 25B is an embodiment of the present invention regarding a method for applying a Tx signal using a power line of a Tx low voltage and a Tx high voltage.

In the case that the specification for the rising time and falling time is not achieved even if the Tx driving voltage is applied in both directions of the CDA comprising the second CDA column, the present invention presents a method as shown in FIG. 25B, which applies the Tx signal using the power lines of the Tx low voltage and the Tx high voltage.

Referring to FIG. 25A, the Tx driving signal line 520 is 1) composed of a single line, and 2) the Tx high and Tx low voltages, which are Tx driving signals provided by the semiconductor IC, are supplied to the Tx driving signal line 520 with a single line. This method has the following problems.

1) The Tx driving line 520, which is composed of a single line, requires a charge and discharge time because it needs to operate by alternating high and low voltages. The Tx driving line 520, which is composed of a single line, requires a certain time for charging and discharging due to line resistance and parasitic capacitance. This causes a delay in the Tx drive signal delivered to the CDA.

2) The Tx driving signal provided by the semiconductor IC offers both Tx high voltage and Tx low voltage. Originating from the semiconductor IC and passing through the material for connection 300 to the Tx drive signal line installed in the display device, the length of the signal line transmitting the Tx drive signal provided by the semiconductor IC is designated for Layout (fanout). This length inherently possesses a certain resistance value and includes parasitic capacitance. Due to the resistance value and parasitic capacitance of this signal line, a delay occurs in the Tx drive signal transmitted to the Tx driving signal line 520.

FIG. 25B is an embodiment of the present invention in which a power line having a value of a Tx low voltage and a Tx high voltage is placed on one side of a Tx driving signal line1 520-1 and a Tx driving signal line2 520-2. If the Tx low voltage is 0V, the Tx low voltage with a potential of 0V is supplied to the Tx low-level power line 531, and if the Tx high voltage is 3V, the Tx high voltage with a potential of 3V is supplied to the Tx high-level power line 532. The Tx low-level power line 531 and Tx high-level power line 532 can be placed on one side of the Tx driving signal line1 520-1 or on one side of the Tx driving signal line2 520-2.

A Tx Level Selection Switch 510 is located between the Tx driving signal lines 520-1, 520-2 and the two power lines 531, 532. Two Tx level selection switches 510 are placed in Tx driving signal line1 520-1 and two in Tx driving signal line2 520-2, but more Tx level selection switches 510 may be placed to lower the turn-on resistance [Rds(on)] of the switching elements comprising the Tx level selection switches 510.

To correspond to the two additional power lines, the Tx level selection switch 510 is composed of at least two or more switching elements. If the Tx level selection switch 510 is composed of two switching elements as in the embodiment of FIG. 25B, one control signal (Tx Level_Cont) is connected to the gate of the switching element comprising the Tx level selection switch 510, and a Tx high voltage or a Tx low voltage is applied to the Tx drive signal 520 connected to one side of the Tx level selection switch 510 depending on the high or low state of the control signal.

Different level control signals may be applied to the gates of the switching elements comprising the Tx level selection switch 510, but only one control signal of the Tx level selection switch 510 supplied by the semiconductor IC is preferably used to reduce the number of output pins of the semiconductor IC.

In the embodiment of FIG. 25B, the two switching elements comprising the Tx level selection switch 510 have a common Tx driving signal line, and one of the two switching elements is turned on and one is turned off by a control signal of one or two Tx level selection switches 510 provided by the semiconductor IC 400, and a Tx high voltage or a Tx low voltage is applied to the Tx driving signal line 520, and this voltage is applied to the CDA of the second CDA column, so that a Tx signal to the pen can be transmitted.

The method of placing the Tx low-level power line 531 and the Tx high-level power line 532 on one side of the Tx driving signal line 520 and applying the Tx driving voltage to the Tx drive power line using the Tx level selection switch 510 has the following advantages.

1) As demonstrated in the embodiment of FIG. 25a, when the Tx drive signal is applied at a single point of the Tx drive signal line, a delay due to the line resistance and parasitic capacitance charging and discharging time of the Tx drive signal line occurs. However, since the power lines 531, 532, with a fixed voltage supply a signal power for Tx to the Tx drive signal line 520 from the shortest distance, the line resistance of the Tx driving signal line 520 is reduced. This results in an improved charging and discharging time of the Tx driving signal line 520, consequently speeding up the Rising and Falling Time.

Additionally, when the Tx High Level power line 532, which has a certain DC voltage, is placed opposite to the Tx Low Level power line 531, the charge supply capability of the Tx driving signal line 520 is enhanced due to the capacitance generated on the Tx High Level power line 532. This brings the advantage that there is no voltage drop during the supply of Tx high voltage.

2) Previously, the Tx driving signal provided by the semiconductor IC required a current capability to drive the Tx driving signal line 520, resulting in a delay in signal transmission time through the Tx driving signal line. However, as shown in FIG. 25B, by preserving the driving voltage on the two power lines and only applying the gate turn-on/turn-off signal from the semiconductor IC 400, the input impedance of the switching device, which is theoretically infinite due to its gate characteristic, eliminates current consumption from the signal supplied by the semiconductor IC 400. Additionally, the resistive component of the signal can be neglected, enabling high-speed turn-on/turn-off of the switching device.

As such, the present invention is able to implement the rising and falling time of the Tx signal at a faster speed by improving the time delay of the control signal provided by the semiconductor IC and improving the delay of the charging and discharging time due to the line resistance of the Tx driving signal line by using the power line and the Tx level selection switch 510 that provide the dedicated Tx low voltage and Tx high voltage that constitute the Tx driving signal.

Figure 25C:
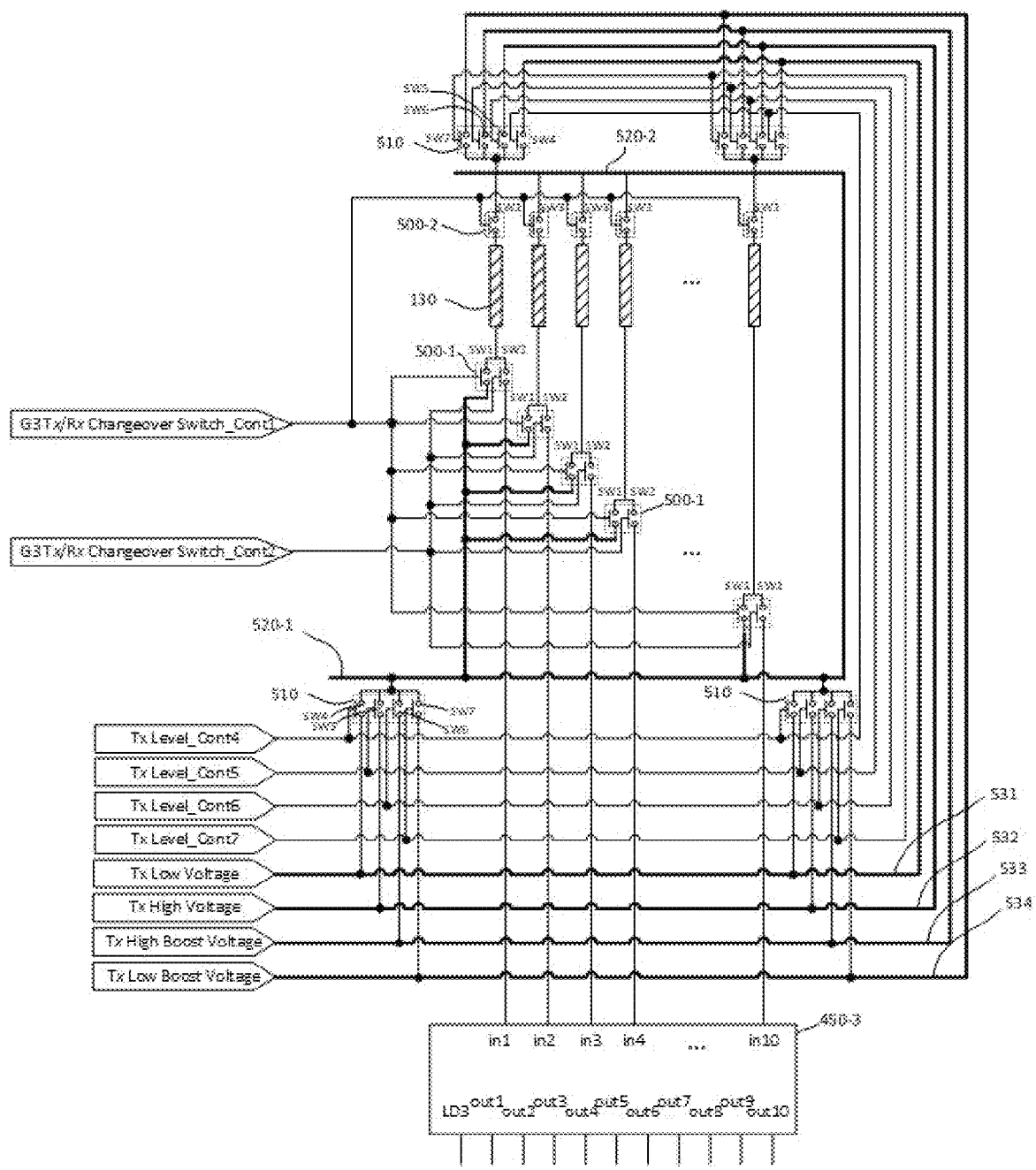
FIG. 25C is an embodiment of the present invention regarding a method for improving the speed of the rise and fall times of a Tx waveform using a Tx low voltage and a Tx high voltage and a Tx high boost voltage and a Tx low boost voltage.

There are cases in which the rising and falling time of the Tx is not improved by applying the Tx drive signal with two Tx driving signal lines as shown in FIG. 25A or by applying the Tx drive signal using two separate power lines as shown in FIG. 25B, and these problems can be solved by using a boost voltage as shown in FIG. 25C.

FIG. 25C is an embodiment of the present invention regarding a method of improving the speed for the rising and falling of a Tx waveform using a Tx low voltage and a Tx high voltage and a Tx high boost voltage and a Tx low boost voltage.

Referring to FIG. 25C, a Tx high-level boost power line 533 and a Tx low-level boost power line 534 are placed adjacent to the Tx low-level power line 531 and the Tx high-level power line 532.

Referring to [Equation 9], the Tx Rising Time is represented by the value of t in $$V(t) = Vbt\left(1 - e^{-\frac{t}{\tau}}\right),$$

and for the USI standard as an example, it is 300 ns. In [Equation 9], the Tx high-level voltage is 3V, and assuming $\tau=800*10^{-9}$, using the USI standard's Rising Time of $t=300*10^{-9}$, using these values, the value of Vbt is determined. As shown in FIG. 25C, Vbt is the boost voltage applied to the Tx driving signal line before the Tx high signal is applied, and in this specification, it is referred to as the Tx High Boost Voltage. Interpreting equation $$(t) = Vbt\left(1 - e^{-\frac{t}{\tau}}\right)$$

qualitatively, it means that an initial boost voltage Vbt is applied to the Tx driving signal line 520, and after the Rising time of 300 ns, the magnitude of the voltage V(t) formed on the driving signal line 520 is 3V.
As $$Vbt = \frac{V(t)}{1 - e^{-t/\tau}},$$

if V(t)=3V, t=300 ns, and τ=800 ns are substituted into the formula, Vbt is about 9.6V. This means that if 9.6V is applied to the Tx driving line 520 to form a Tx high signal of 3V within 300 ns, the voltage formed on the CDAs comprising the second CDA column after 300 ns will be 3V.

The Tx high boost voltage is selected by the Tx level selection switch 510. The Tx level selection switch 510 comprises at least four or more switching elements for the four power lines, and four switching elements are assumed to be used in the present invention. Since four power lines are used, including the Tx low boost voltage described later, and only one power line is selected from among them, the control signals connected to the gates of the Tx level selection switch 510 must be provided to all switching elements individually. Therefore, four switch control signals are required for the Tx level selection switch 510, and although four control signals can be supplied by the semiconductor IC 400, it is possible to supply only two control signals to reduce the number of pins of the semiconductor IC, generate four control signals using the decoder 436 placed in the display device, and supply the four generated signals to each of the four switching elements.

The Tx driving signal line 520 is connected in common to the input terminals of the four switching elements SW4 to SW7 comprising the Tx level selection switch 510, and the output terminals of the four switching elements are connected to power lines supplying Tx low voltage, Tx high voltage, Tx high boost voltage, and Tx low booth power, respectively, and one switching element is turned on by a turn-on signal of one of four turn-on/turn-off control signals provided to each of the four switching elements and connected to one of the four power lines.

To expedite the Tx Rising Time, the Tx High Boost voltage is supplied to the Tx driving signal line 520. Once the Tx High voltage is formed on the CDA and the transmission of the Tx High signal is completed within the desired time, there is no further need for the Tx High Boost voltage. Once the Tx High voltage is established on the CDA, the Tx High Boost voltage is removed from the Tx driving signal line and the Tx High voltage is applied. In such an embodiment, the switching element of the Tx level selection switch 510 initially has SW4 in the turn-on state (initial Tx Low state). When SW4 is turned off and SW6 is turned on, the Tx High Boost voltage, based on the Tx Low voltage, is supplied to the Tx driving signal line. After the Rising Time of 300 ns cited in this example from the USI, when SW6 is turned off and SW5 is turned on, the Tx High voltage is applied to the Tx driving signal line, and SW5 maintains the turn-on state for the required Tx High hold time.

Subsequently, the Tx Falling time must also be executed within the same example duration of 300 ns. Thus, SW5 is turned off and SW7 is turned on, supplying the Tx Low Boost voltage to the Tx driving signal line for 300 ns. Afterward, SW7 is turned off and SW4 is turned on, applying the Tx Low voltage.

In order for the falling time to be the same 300 ns as the rising time, the magnitude of the Tx low boost voltage must be 9.6V, the same as the magnitude of the Tx high boost voltage, and a power source with a negative magnitude of −6.6V [3V−(−6.6V)=9.6V] must be supplied to the Tx low boost voltage to cause the Tx high voltage state of 3V to fall to the Tx low voltage of 0V. Since the same time constant (τ) applies to the rising and falling times in a system, adjusting the rising time, t(r), or the falling time, t(f), is possible by changing the magnitude of the Tx high boost voltage or the Tx low boost voltage.

In one example, in order to generate a Tx low boost voltage of −6.6V from 3.0V, which is used as the supply voltage of the semiconductor IC 400, the power supply must first generate −9V, which is −3 times 3.0V, and then use the −9V to generate −6.6V. The difference between −9V and −6.6V determines the efficiency of the power supply, so there is a problem that the efficiency of the power supply is reduced, and excessive power consumption is wasted. For this reason, 3.0V is used to generate 6V, which is −2 times, and then about −5V is determined as the Tx low boost voltage in consideration of the efficiency and stability of the power supply. If the above time constant is smaller than 800 ns in one embodiment, the falling time specification can be satisfied with a voltage of −5V. However, if the time constant is larger than 800 ns, it is desirable to generate the Tx low boost voltage close to −9V to shorten the application time of the Tx low boost voltage and thereby shorten the t(f) time to reduce the current consumption.

Since the Tx high boost voltage and Tx low boost voltage must be supplied to the Tx drive signal 520 in a stable manner, when the Tx high boost voltage and Tx low boost voltage originate from the power supply or drive part of the semiconductor IC and are supplied to the display unit through the material for connection 300, a capacitor is attached to the boost power line of the material for connection to minimize ripple in response to fluctuations in the boost voltage. Additionally, for the power lines in the display device supplying the Tx High Boost voltage and Tx Low Boost voltage, they are positioned opposite to another power line with an arbitrary DC voltage applied, creating a capacitor between the two power lines. It is preferable to apply the Tx Low voltage or the system's ground voltage to the power line that forms a capacitor opposite to the power line supplying the Tx High Boost voltage and Tx Low Boost voltage.

Meanwhile, it may be difficult to accurately calculate the magnitude of the equivalent line resistance and equivalent capacitance between the CDA transmitting the Tx and the Tx driving signal line with the boost voltage applied, and the magnitude of t(r) and t(f) measured at the CDA emitting the Tx signal after applying the Tx boost voltage may differ from the predicted value by the magnitude of the calculated time constant. In this case, it is possible to adjust the magnitude of t(r) or t(f) by a calibration that adjusts the magnitude of the Tx boost voltage.

The Tx boost voltage is set to various values depending on the value of the time constant (τ) and the specification of t(r)

or t(f). The larger the magnitude of the time constant τ, the larger the magnitude of the Tx boost voltage, so the Tx boost voltage should be designed to have various magnitudes. In one embodiment, the value of the voltage output from the voltage regulator is determined by the feedback voltage of the output voltage, so it is possible to vary the value of the Tx boost voltage by varying the resistor ratio that outputs the feedback voltage.

In [Equation 9], the time constant (τ) is defined as the value when the voltage detected at R is 63.2% of Vh when the initial voltage Vh is applied to the RC circuit. In the present invention, by setting the rising time t(r) at least equal to the time constant (τ), the boost voltage Vbt is applied and after the time constant (t) elapses, the Tx high voltage in the CDA comprising the second CDA column becomes 3V in one embodiment. For this purpose, if t=, in [Equation 9] is set and V(t) is set to 3 V, Vh is determined to be a voltage that is approximately 1.5 times greater than V(t). In this way, if the Tx high boost voltage is set to about 1.5 times the Tx high voltage and the voltage is applied, it is easy to calculate the time constant (t) of the system, and the desired rising time is set based on the calculated time constant to determine the value of the Tx high boost voltage, and the same process is applied to determine the value of the Tx low boost voltage.

As such, the present invention preferably sets the magnitude of the Tx boost high voltage to a voltage that is at least 1.5 times greater than the magnitude of the Tx high voltage. The present invention also has a negative power source for applying the Tx low boost voltage.

As described above, the second CDA column is used for various purposes, such as transmitting Tx signals, receiving Rx signals, or detecting an object capacitance. Since the Tx boost voltage is required only for the transmission of Tx, it is desirable that the power supply part that generates the Tx boost voltage is activated to generate the Tx boost voltage when the Tx signal is transmitted, and the power supply part that generates the Tx boost voltage is turned off to reduce the current consumption when the Tx signal is not transmitted.

When no Tx signal is transmitted, a swinging Tx drive signal is not authorized on the Tx driving signal line. Since the Tx driving signal line intersects with the detection signal line of the second CDA column at various points, if the Tx driving signal line is floating, the signal detected by the detection signal line may be noisy and cause a sensing error. To prevent this problem, it is preferable that a certain DC level is supplied to the Tx driving signal line 500. Preferably, the Tx low level (0V), which is the system ground power, is supplied, and for this purpose, SW4, which supplies GND from the Tx level selection switch 510, is preferably turned on.

Figure 25D:
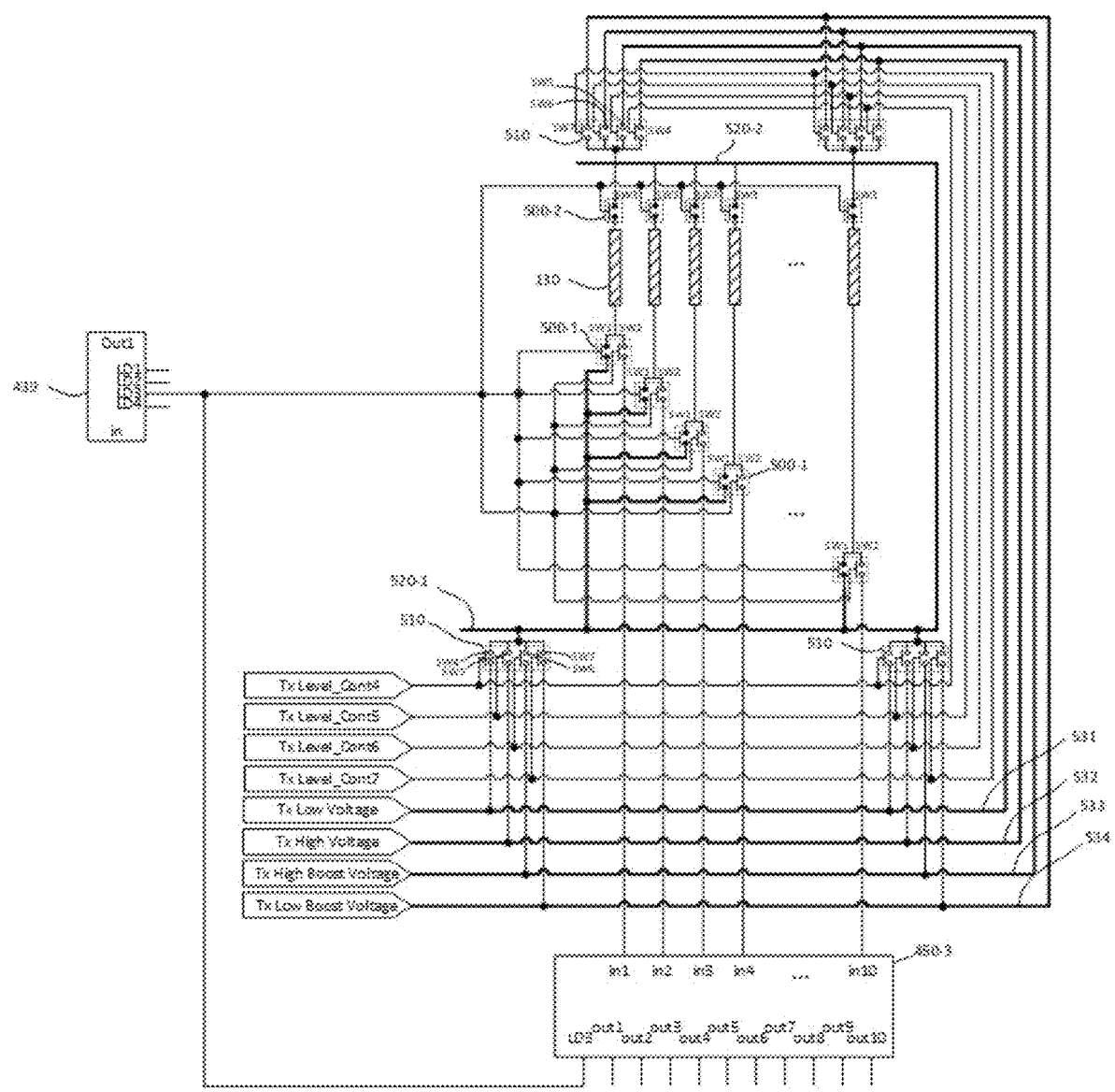
FIG. 25D is an embodiment of the present invention in which a single control signal (LD) is used in place of the two control signals used as turn-on/turn-off control signals of the Tx/Rx changeover switch in the embodiment of FIG. 25C.

FIG. 25D is an embodiment of the present invention in which one control signal (LD), which is an output control signal of a loader or a signal line/DC switch, is used in place of the two control signals used as turn-on/turn-off control signals of the Tx/Rx changeover switch in the embodiment of FIG. 25C.

Referring to FIG. 25D, the output control signal (LD) of the loader or the signal line/DC changeover switch is provided with a low disable state to transmit the Tx signal, and SW1 of Tx/Rx changeover switch1 and SW3 of Tx/Rx changeover switch2 are turned on together to connect the second column CDA with the Tx driving signal lines 520-1,520-2. To transmit the Tx signal, another group (group 4 in this specification) consisting of the second CDA column is also provided with a low LD in a disabled state. As a result, the CDA of the second CDA column comprising group 4 is also connected to the Tx driving signal line 520 by turning on SW1 and SW3 of the Tx/Rx changeover switch 500. The 10 CDAs of group 3 and the 10 CDAs of group 4 connected to the Tx driving signal line 520 are supplied with Tx low voltage or Tx high voltage or Tx high boost voltage or Tx low boost voltage by the control signal of the Tx level selection switch 510 provided by the semiconductor IC 400, and the CDAs form the Tx high signal or Tx low signal to the desired Tx digital data value and transmit Tx to the pen.

Group 1 and Group 2, comprising the first CDA column, do not transmit Tx signals, so there is no Tx/Rx changeover switch, and when LD is supplied in the low state, the filled switch of the signal line/DC changeover switch is turned on (see FIG. 21B), and the 20 signal lines originating from each of the 10 CDA columns of Group 1 and Group 2 are connected to DC to prevent the floating state.

Another method of improving the speed of the rising and falling time for the Tx transmission described above is to apply a Tx drive signal to the line capacitance of the CDA comprising the second CDA column. According to one embodiment of FIG. 19B, the CDAs comprising the second CDA column are surrounded by a driving signal line, and a interline capacitance (Cd) is formed between the surrounded CDAs and the driving signal line. When a signal for Tx transmission is supplied to the CDA of the second CDA column, if the same voltage as the Tx signal supplied to the surrounded CDA is applied to the driving signal line surrounding the CDA transmitting the Tx signal, the surrounded CDA and the driving signal line surrounding the CDA are in the same potential state, and the interline capacitance formed between them is canceled, and the time constant (τ) is accelerated, thereby improving the speed of the rising and falling time for Tx transmission.

In one embodiment of the present invention, the first CDA column consisting of 25 CDAs can also be reconfigured into one or three or four CDAs, the same as the second CDA column, and used to transmit Tx signals, receive Rx signals, or perform quick search for objects. The CDAs of the first CDA column of 25 or more or fewer CDAs can be configured into one or more desired number of re-made CDAs by the Tx/Rx changeover switch 500, a device of the present invention placed before the sensing/driving signal line switch group 437. In one embodiment, a CDA column of 25 CDAs may be composed of five Re-made CDAs configured by interconnecting five CDAs, or all 25 CDAs may be interconnected to form a single Re-made CDA column.

In one embodiment, a first CDA column with 25 CDAs interconnected and acting as a single CDA can be connected to a Tx driving signal line to transmit Tx signals. However, in this case, the signal line connected to the farthest CDA may be longer than 10 cm or 20 cm, so there is a problem that the line resistance increases significantly depending on the length of the CDA signal line. This makes it difficult to keep the rising time and falling time within the specified standards.

Figure 26:
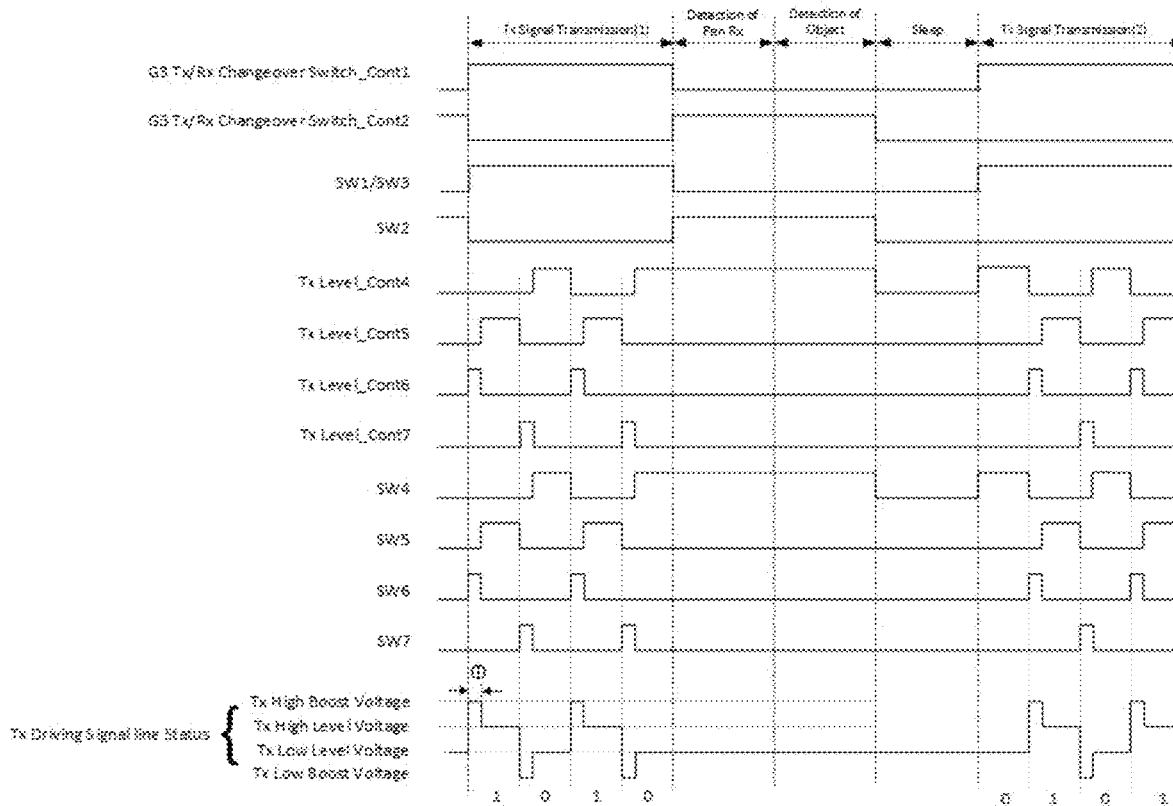
FIG. 26 illustrates one embodiment of an object capacitance sensing method of the present invention.

FIG. 26 is one embodiment of an object capacitance sensing method based on FIG. 25C.

Referring to FIG. 26, the Tx signal transmission step 1 applies a Tx signal to the second CDA column comprising group 3 and/or group 4, and all CDAs of the second CDA column are connected to the Tx driving signal line by operating the Tx/Rx changeover switch1 500-1 and the Tx/Rx changeover switch2 500-2. For this purpose, a high voltage is applied to Tx/Rx changeover switch_Cont1 to turn on SW1 of Tx/Rx switch1 and SW3 of Tx/Rx switch2.

In addition, a low voltage is applied to Tx/Rx transition switch_Cont2, which turns off SW2 of Tx/Rx transition switch1.

For the transmission of Tx signals, special signals such as beacon signals are prescribed according to the pen, but in the embodiment of the present invention, a signal called 1010 or 0101 is supplied. By operating the Tx/Rx switch, the CDAs of the second CDA column are connected to the Tx driving signal line 520 by common connection, and the Tx driving signal line is supplied with Tx high voltage and Tx low voltage by operating the Tx level selection switch.

The Tx level selection switch 510 is selectively turned on by four switching elements (SW4 to SW7) and switching element turn-on and turn-off control signals, Tx Level_Cont4 to Tx Level_Cont7. SW4 is turned on by the high voltage of Tx Level_Cont4, SW5 is turned on by the high voltage of Tx Level_Cont5, SW6 is turned on by Tx Level_Cont6, and SW7 is turned on by the high voltage of Tx Level_Cont7.

A common Tx drive signal 520 is connected to the first input terminal of SW4 to SW7, a power line supplying Tx low voltage is connected to the other side of SW4, a Tx high voltage is connected to the other side of SW5, a Tx high boost voltage is connected to the other side of SW6, and a Tx low boost voltage is connected to the other side of SW7.

In one embodiment of the Tx transmit signal, when transmitting "1010", prior to turning on SW5 for the purpose of supplying the Tx high voltage, SW6 is turned on for the purpose of applying the Tx high boost voltage, which causes a high voltage to be applied to Tx Level_Cont6. After the Tx high boost voltage is applied, Tx Level_Cont5 is pulled high, SW5 is turned on, and SW6 is turned off because the Tx high voltage must be applied after a time <D (shown in FIG. 26).

Φ is the time it takes for the voltage formed on the CDA to become the Tx high voltage after applying the Tx high boost voltage, and various preset times can be selected. These time settings can be realized by a register of the semiconductor IC and the desired time can be selected by selecting the register.

Next, a Tx low boost voltage is applied to transmit a Tx signal about zero. For this purpose, a high voltage is applied to Tx Level_Cont7 and SW7 is turned on. After the predetermined time elapses, SW7 is turned off to supply the Tx low voltage, and when a high voltage is applied to Tx Level_Cont4, SW4 is turned on accordingly. The Tx signals for 1 and 0 are then transmitted through the CDA in the same way.

After sending a Tx signal to the pen, the pen sends an ACK signal or Rx signal in response to the Tx signal, so the second CDA column must be configured to receive the Rx signal. For this purpose, a low voltage is applied to Tx/Rx changeover switch_Cont1, and SW1 of Tx/Rx changeover switch1 and SW3 of Tx/Rx changeover switch2 are turned off to disconnect the CDA connection line that was connected to the Tx driving signal line. High voltage is applied to Tx/Rx changeover switch_Cont2, SW2 of Tx/Rx changeover switch1 is turned on, and the detection signal line of the second CDA column is input to the signal line/DC changeover switch or loader. At this time, if the Tx drive signal 520 is in a floating state, a problem of signal interference occurs, so it is desirable that a Tx low voltage of 0V, which is the system GND, is applied to the Tx drive signal 520, and for this purpose, SW4 is kept in the turn-on state.

The sensing signal input to the signal line/DC changeover switch or loader is input to the Rx receiver of the semiconductor IC and analyzed for the presence of an input signal. The Rx receiving part of the semiconductor IC is composed of a charge AMP or a comparator, etc. and does not use an ADC, so it is possible to analyze the 10 signal lines of Group 3 simultaneously, so it is possible to analyze whether the Rx signal is input and the information about the input signal in a short time.

In this case, It is possible to detect the Rx signal from the Pen quickly in the Group 3 and/or Group 4's second CDA column composed of a single CDA, but in order to detect the Rx signal in Group 1 or Group 2 consisting of a large number of CDAs, it is necessary to continuously scan the position of the pen and detect the Rx of the pen in the row containing the CDA where the pen signal is detected, which takes a lot of time due to continuous scanning.

When the Rx signal of the Pen is received by Group 3 and/or Group 4, the coordinates of the Pen or the coordinates of the finger should be extracted. If the Pen's Rx signal is detected on the left side of the display belonging to Group 3 or on the right side of the display belonging to Group 4, only the Group at the detected location is activated and the sensing time is reduced by detecting the object capacitance.

To extract the coordinates of the finger, a scan of all CDAs in groups 1 to 4 is performed using the driving voltage application method of the present invention for detecting the object capacitance, and the coordinates of the finger are extracted based on the magnitude of the extracted object capacitance in all groups. In addition, to extract the coordinates of the pen, a charge AMP is preferably used, and it is possible to determine whether the second detection signal detected by the charge AMP for all groups of CDAs is different from the first detection signal, and to detect the coordinates of the pen based on the difference.

In this way, when the Rx signal of the pen is received or an object is detected, the coordinate extraction is repeated to continuously identify the coordinate change of the pen or finger, but if there is no pen or no object is detected, the device of the present invention enters a sleep or standby state.

Sleep or Standby state is a state in which the CPU stops working, the power supply stops working, and only the minimum functions for Timer Interrupt are working, and there is almost no current consumption. Currently, all signals maintain the preset value, or all maintain the GND state, and it is assumed that all signals maintain the GND state in this invention.

After the preset time elapses by the timer interrupt, the system reboots and runs again, so a new Sequence starts again, starting with the transmission of the Tx signal to detect the pen.

Figure 27:
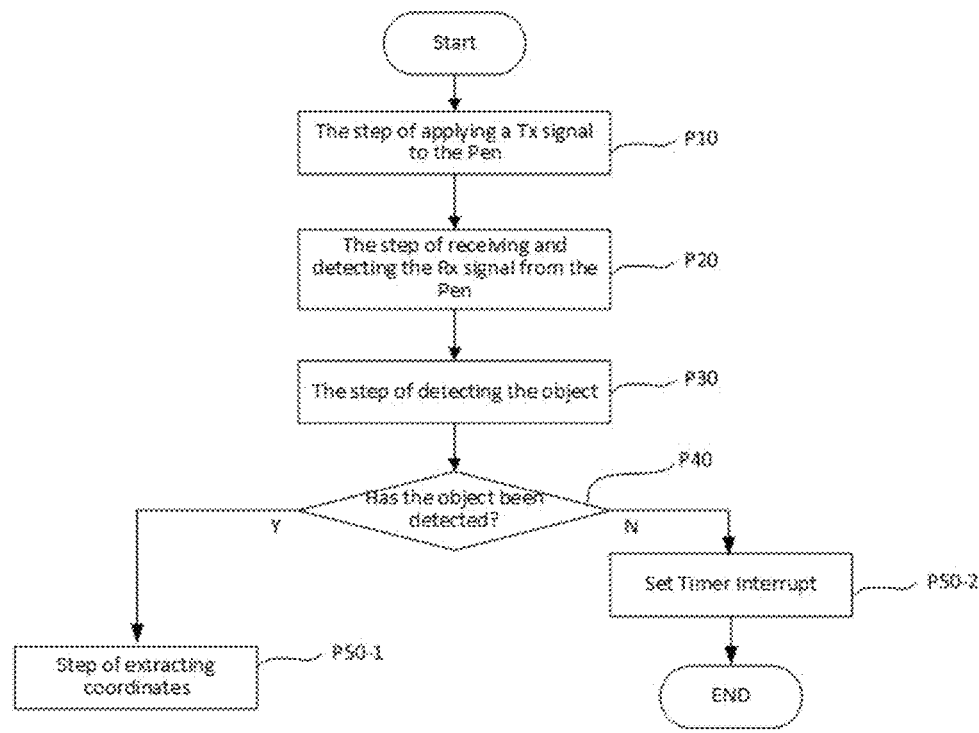
FIG. 27 is a flowchart illustrating a capacitance sensing method, according to one embodiment of the present invention.

FIG. 27 is a flowchart illustrating a capacitance sensing method, according to one embodiment of the present invention.

Referring to FIG. 27, the first step P10 is to apply a Tx signal to the pen, and for this purpose, all CDA signal lines originating from the second CDA column are connected to a common connection to apply a Tx signal. Currently, a Tx signal is output from one group consisting of the second CDA column or all groups consisting of the second CDA column.

The second step P20 is the stage of receiving the Rx signal from the Pen and detecting the pen. The CDAs of the second CDA column, which were connected in the first step P10, are disassembled individually and connected to the Rx receiver. The Rx receiving part consists of a charge AMP or a comparator, etc., which is individually placed on all detection signal lines to simultaneously detect Rx signals for all detection signal lines originating from CDA columns belonging to one group.

In the third step P30, the object is detected. The sensing of the pen is determined by the sensing of the Rx signal in the second step. To detect a finger, a driving voltage is applied to the second CDA column to detect the object capacitance using the difference between the first sensing voltage according to [Equation 4] and the second sensing voltage according to [Equation 5], and the difference between the first and second sensing voltages is detected by a differential amplifier.

Quick Search, in which a finger is detected by a single CDA in the second CDA column, has the effect of saving sensing time and reducing current consumption compared to detecting a finger in the first CDA column consisting of a large number of CDAs.

In the fourth step P40, the object sensing is determined. In the second step P20, a valid Rx signal of a pen is detected, and if a pen is detected, a circuit part for detecting coordinates by the pen signal is operated, and if a finger is detected in the third step P30, a circuit part for detecting coordinates of the finger is operated.

Since the pen typically moves faster than the finger to write, the pen's coordinates should be detected more often than the finger's coordinates and reported to the CPU, which utilizes the pen's coordinates. Typically, pen coordinates are reported 4-5 times faster than finger coordinates. For this reason, pen coordinates should be extracted first.

The fifth step P50-1 is the coordinate extraction step, and the coordinates of the pen are extracted first. Extracting the coordinates of the pen preferably proceeds as follows.

a) In the second step P20, the Rx signal detected in the group 3 of the left side or the group 4 of the right side comprising the second CDA column indicates whether the pen is located on the left side or the right side of the display.

b) Activate the first CDA column at the location where the Rx signal of the pen is detected and scan the CDA to detect the magnitude of the signal output from the pen in synchronization with the Rx signal of the pen. At this time, the Charge AMP is used, and the magnitude of the voltage detected by the Charge AMP is different for each CDA due to the capacitance formed between the CDA and the pen as the pen is placed on the top surface of the CDA. The voltage detected based on the Rx signal of the pen in the first CDA column and the voltage detected based on the Rx signal of the pen in the second CDA column are used to extract the coordinates of the pen.

c) After the completion of pen coordinate extraction, the coordinates of the finger are extracted. To extract the coordinates of the finger, the drive voltage formed by the first and second stage drive voltages is applied to the interline capacitance (Cd) and the shielding capacitance (Cin_sd) to detect the object capacitance. In the third step P30 mentioned above, it is possible to know whether the finger is located on the left or right side of the display device, so only the group where the finger is located is activated to detect the finger. If the finger is in the center of the display device, all groups must be activated to detect the magnitude of the capacitance caused by the finger.

In one embodiment, when a finger is located on the left side of the display, the coordinates of the finger are extracted by activating only group 1 and group 3. For the coordinates of the finger, it is possible to detect the relative value of the object capacitance for each CDA as the difference between the first sensing voltage based on [Equation 4] and the second sensing voltage based on [Equation 5] using a method of sequentially applying a driving voltage to a plurality of CDAs of the first CDA column comprising group 1. In addition, the value of the object capacitance is extracted by applying the driving voltage for group 3, but if the second CDA column of group 3 consists of one CDA, the relative value of the object capacitance is detected by applying the driving voltage once.

Extract the coordinates of the finger based on the magnitude of the object capacitance detected in groups 1 and 3.

Assuming that coordinates are detected from Group 1 and Group 3 in steps c) and d) above, the area of the CDA comprising Group 1 and the area of the CDA comprising Group 3 are different, so the magnitudes of the common electrode capacitance and line capacitance of the CDA comprising Group 1 and the CDA comprising Group 3 are different. Therefore, when the voltage extracted from Group 1 and Group 3 is used to obtain the position of the object, the detected voltage value must be corrected to reflect the difference in magnitude of the common electrode capacitance and line capacitance to obtain the coordinates.

In another fifth step P50-2, a timer interrupt is set. If the object is not detected in the fourth step P40, the semiconductor IC 400 typically detects the object again after tens of milliseconds. During tens of ms, the semiconductor IC enters a sleep or standby state to save current consumption. If a timer interrupt is set for wake-up after tens of ms, the semiconductor IC wakes up by a timer interrupt occurring after the set time and restarts from step 1 P10 after a predetermined period such as power stabilization.

According to one embodiment of the present invention, a second CDA column consisting of one CDA is placed adjacent to a first CDA column in the form of a plurality of independent islands, and the transmission of Tx signals and reception of Rx signals are performed in a short time by the second CDA column, and the object capacitance is quickly detected, thereby reducing current consumption.

The effects of the invention are not limited to those described above but are to be understood to include all effects that can be inferred from the detailed description of the invention or the composition of the invention as recited in the patent claims.

The foregoing description of the invention is by way of example, and one having ordinary knowledge in the technical field to which the invention belongs will understand that it can be readily adapted to other specific forms without altering the technical idea or essential features of the invention.

Therefore, the embodiments described above are exemplary in all respects and should be understood as non-limiting. For example, individual devices described in a single form may be combined with each other to form a comprehensive device, and similarly, a comprehensive device may be a combination of individual devices not described. The scope of the invention is indicated by the following patent claims, which shall be construed to include the meaning and scope of the claims and all modifications or variations derived from their equivalents.

EXPLANATION OF SYMBOLS

3: Common Electrode
4: Color Layer
5: color Filter Glass
7: Protective Layer
10: Display device
20: Object
100: Capacitor Detect Area (CDA) Group 120: first area CDA
130: 2nd Area CDA
150: Empty area
200: CDA signal line
200-1: Pin input signal line
210: Column1 sensing signal line
410: Signal Detection unit
420: Driving Unit
430-1: Differential Amplifier
430-2: AMP Input Signal Line Selector
436: Decoder
437: Detection/Drive Signal Line Switch
437-1: Sensing Signal Line Switch Group
437-2: Driving Signal Line Switch Group
439: Level Shifter
450: Loader
450-1: First Group Loader
450-2: Second Group Loader
210-1: Column1 Driving Signal line.
220: Column2 sensing signal line
220-1: Column2 driving signal line.
230: Column3 sensing signal line
230-1: Column3 driving signal line.
240: Column4 sensing signal line
240-1: Column4 driving signal line.
250-1: Group 1 sensing signal line
250-2: Group 2 sensing signal line
270-1: Group1 Loading Signal line (LD Signal Line)
270-2: Group2 Loading Signal Line (LD Signal Line)
300: material for connection
400: Semiconductor IC
401: Signal Line Input Pin
534: Tx Low Level Boost power line
450-3: Third Group Loader
450-4: 4th Group Loader
451: Loader Selector
452: Signal Line/DC Changeover Switch
460: CPU
461: Substrate
462: insulating layer
464: first signal layer
500-1: Tx/Rx changeover Switch1
500-2: Tx/Rx changeover Switch2
510: Tx Level selection Switch
520-1: Tx driving signal line1.
520-2: Tx driving signal line2.
531: Tx Low Level Power Line
532: Tx High Level Power Line
533: Tx High Level Boost power line

What is claimed is:

1. An object capacitance detection apparatus comprising:
a plurality of first area Capacitor Detect Areas (CDAs) configured to locate on one side of a display device and connected respectively at one side to a plurality of first CDA signal lines, wherein other side of the plurality of first area CDAs is not connected to other signals;
a first CDA column comprising the plurality of first area CDAs stacked vertically;
a plurality of second CDA signal lines arranged in the same direction as the plurality of first CDA signal lines and not connected to other signal lines;
a plurality of second area CDAs connected respectively at one side to the plurality of second CDA signal lines, wherein other side of the plurality of second area CDAs is not connected to other signals; and
a second CDA column comprising one or more second area CDAs;
wherein the plurality of second area CDAs is capable of transmitting a signal Tx to a Pen or/and receiving a signal Rx from the Pen,
wherein, when an nth detection signal line in the first CDA column is selected, either (n−1) or (n+1), or both (n−1) and (n+1) are selected as driving signal lines within the first CDA column, the first CDA column and the second CDA column do not share an electrical signal input/output relationship, and the second CDA column is positioned adjacent to the first CDA column,
wherein, the plurality of first CDA signal lines is included in the first CDA column, arranged in the same direction, and not connected to other signal lines,
wherein, the first CDA column includes a detection signal line switch group comprising a plurality of switching elements and a plurality of driving signal line switch groups comprising the plurality of switching elements, and all the plurality of first CDA signal lines of the first CDA column are input to the detection signal line switch group and the plurality of driving signal line switch groups,
wherein, in the detection signal line switch group, the nth detection signal line is selected by one turned-on switching element, and in the plurality of driving signal line switch groups, either (n−1) or/and (n+1) driving signal lines is selected by respective turned-on switching elements, and
wherein one of the plurality of first area CDAs included in the first CDA column is sequentially selected as a detection signal line based on a preset order to detect an object capacitance or an Rx signal transmitted from the pen, and when detecting an object that does not transmit a signal, the detection signal line is input to one input terminal of a differential amplifier, and a driving voltage is applied to an adjacent driving signal line to detect the size of the object capacitance, and when detecting an Rx signal transmitted from an object like the pen that transmits a signal, the detection signal line is connected to a Charge Amplifier, and a frequency transmitted by the pen is detected, or a voltage is detected based on a ratio between a capacitance formed between the pen and a CDA, and a feedback capacitance of the Charge Amplifier.

2. The object capacitance detection apparatus of claim 1, wherein:
the nth detection signal line, selected from the first CDA column, is connected to a semiconductor IC that calculates the size of an object capacitance, within the semiconductor IC, when a driving voltage is applied to a shielding area formed in opposition to a detection signal line and to either the (n−1) or (n+1) driving signal lines, or both the (n−1) and (n+1) driving signal lines, the detection voltage from the nth detection signal line is [Equation1] in the absence of an object and [Equation2] in the presence of an object, the object is detected based on the difference between [Equation1] and [Equation2], wherein:

$$V1 = \frac{(Vd2 - Vd1)*Cd + (Vcin2 - Vcin1)*\text{Cin\_sd}}{Cd + \text{Cin\_sd} + Ccm} \quad \text{[Equation 1]}$$

$$V2 = \frac{(Vd2 - Vd1)*Cd + (Vcin2 - Vcin1)*\text{Cin\_sd}}{Cd + \text{Cin\_sd} + Ccm + Cobj} \quad \text{[Equation 2]}$$

a) Vd1 is a first stage driving voltage applied to either (n−1) or/and (n+1) driving signal lines, b) Vd2 is a second stage driving voltage applied to either (n−1) or/and (n+1) driving signal lines,
c) Vcin1 is the first stage driving voltage applied to the shielding area formed opposite a plurality of CDA signal lines inside the semiconductor IC,
d) Vcin2 is the second stage driving voltage applied to the shielding area formed opposite the plurality of CDA signal lines inside the semiconductor IC,
e) Cd is a capacitance between lines formed between the nth detection signal line and either (n−1) or/and (n+1) driving signal lines,
f) Cin_sd is a shielding capacitance formed between the detection signal line and the shielding area formed opposite the detection signal line inside the semiconductor IC,
g) Ccm is a common electrode capacitance formed between an area combined by an nth CDA and the detection signal line connected to the nth CDA, and the display device, and
h) Cobj is the object capacitance formed when the object and a CDA face each other at a certain area and distance.

3. The object capacitance detection apparatus of claim 1, wherein:
the other side of the plurality of second CDA signal lines is collectively connected to input terminals of a plurality of switching elements of a Tx/Rx changeover switch 1 comprising at least two switching elements, and a signal line output from a first switching element of the Tx/Rx changeover switch 1 is connected to a Loader comprising the plurality of switching elements or a signal line/DC changeover switch comprising the plurality of switching elements or an AMP input signal line selector that chooses one output from multiple inputs or a Charge Amplifier or a comparator, and the signal line output from a second switching element of the Tx/Rx changeover switch 1 is connected to a Tx driving signal line 1, or/and the plurality of second area CDAs is connected on the other side to another plurality of second CDA signal lines, and the other side of the another plurality of second CDA signal lines is connected to one side terminal of a Tx/Rx changeover switch 2 composed of switching element, and the other side terminal of the Tx/Rx changeover switch 2 is connected to a Tx driving signal line 2.

4. The object capacitance detection apparatus of claim 3 wherein:
the Tx/Rx changeover switch 1 and the Tx/Rx changeover switch 2 are individually turned on or turned off by a switch control signal connected to each switching element that constitutes them.

5. The object capacitance detection apparatus of claim 3, wherein:
a signal line connected from the first switching element of the Tx/Rx changeover switch 1 to the Charge Amplifier in an Rx receiver part inside a semiconductor IC detects voltage and frequency based on an Rx signal transmitted by the Pen.

6. The object capacitance detection apparatus of claim 3, wherein:
the Tx driving signal line 1 and the Tx driving signal line 2 are connected to a power line provided by a semiconductor IC for transmitting a Tx signal, characterized in that the power line alternately provides Tx High voltage and Tx Low voltage based on a power level of the Tx signal.

7. The object capacitance detection apparatus of claim 3, wherein:
on one end of either the Tx driving signal line 1 and/or the Tx driving signal line 2, separate power lines are installed: one supplying Tx Low voltage and another supplying Tx High voltage, a Tx driving signal line alternately connects to either the Tx Low voltage or the Tx High voltage.

8. The object capacitance detection apparatus of claim 3, wherein:
one side of the Tx driving signal line 1 and the Tx driving signal line 2 is equipped with a separate power line supplying a Tx Low voltage and a Tx High voltage that satisfies a power level of a Tx signal;
one side of the separate power line is additionally equipped with a power line supplying a Tx High Boost voltage or a power line supplying a Tx Low Boost voltage with a negative magnitude; and
the Tx driving signal line 1 and/or the Tx driving signal line 2 alternately connects to one of the Tx Low voltage, Tx High voltage, Tx High Boost voltage, or Tx Low Boost voltage to transmit the Tx signal.

9. The object capacitance detection apparatus of claim 8, wherein:
between the Tx driving signal line 1, the Tx driving signal line 2, and the separate power line, a Tx level selection switch composed of a plurality of switching elements is installed;
one side of the plurality of switching elements constituting the Tx level selection switch is collectively connected to a Tx driving signal line;
the other side of a first switching element constituting the Tx level selection switch is connected to the Tx Low voltage;
the other side of the second switching element is connected to the Tx High voltage;
the other side of a third switching element is connected to the Tx High Boost voltage;
the other side of a fourth switching element is connected to the Tx Low Boost voltage; and
based on a turn-on/turn-off voltage of multiple Tx level selection switch control signals provided by a semiconductor IC, the Tx driving signal line 1 and/or the Tx driving signal line 2 alternately connects to one of the Tx High voltage, Tx Low voltage, Tx High Boost voltage, or Tx Low Boost voltage to transmit the Tx signal.

10. The object capacitance detection apparatus of claim 9, wherein:
the Tx High Boost voltage is first applied to the Tx driving signal line, followed by an application of the Tx High voltage after a predetermined time.

11. The object capacitance detection apparatus of claim 9, wherein:
the Tx Low Boost voltage is first applied to the Tx driving signal line, followed by an application of the Tx Low voltage after a predetermined time.

12. The object capacitance detection apparatus of claim 8, wherein:
the transmission of the Tx signal from the plurality of second area CDAs connected to the Tx driving signal line is carried out either only by the plurality of second area CDAs included in a single second CDA column group or a plurality of second CDA column groups.

13. The object capacitance detection apparatus of claim 8, wherein:
the Tx High Boost voltage is characterized by being at least 1.5 times the magnitude of the Tx High voltage.

14. The object capacitance detection apparatus of claim 2, wherein:
by a Tx/Rx changeover switch installed between the plurality of first area CDAs constituting the first CDA column and a detection/driving signal line switch group, the plurality of first area CDAs are interconnected and reconfigured into a Re-made CDA operating as a single CDA to transmit a Tx signal.

15. The object capacitance detection apparatus of claim 1, wherein:
during a process in which the second CDA column performs Tx or Rx, a process for detecting an object capacitance is carried out;
during this time, a plurality of CDA signal lines constituting the second CDA column is connected to a Differential amplifier;
a driving voltage is applied to a dedicated driving signal line installed adjacent to and surrounding the second CDA column to detect an object.

16. The object capacitance detection apparatus of claim 15, wherein:
a driving voltage is applied to a dedicated driving signal line that individually surrounds either the second CDA column constituting a single second CDA column group or a plurality of second CDA column groups, to detect the object.

17. The object capacitance detection apparatus of claim 15, wherein:
when the second CDA column transmits a Tx signal, the Tx signal applied to the second CDA column is also applied to the dedicated driving signal line.

18. The object capacitance detection apparatus of claim 3, wherein:
a Loader or signal line/DC changeover switch or detection/driving signal line switch group or Tx/Rx changeover switch 1 or Tx/Rx changeover switch 2 is characterized by being installed in the display device and the Loader or signal line/DC changeover switch or detection/driving signal line switch group or Tx/Rx changeover switch 1 or Tx/Rx changeover switch 2 is manufactured in the same manufacturing process using a mask used to manufacture the switching element in the display device that outputs pixel data or the switching element in the display device that outputs a gate turn-on/turn-off voltage.

19. The object capacitance detection apparatus of claim 9, wherein:
the Tx level selection switch is characterized by being installed in the display device and the Tx level selection switch is manufactured in the same manufacturing process using a mask used to manufacture the switching element in the display device that outputs pixel data or the switching element in the display device that outputs a gate turn-on/turn-off voltage.

20. The object capacitance detection apparatus of claim 3, wherein:
the Tx driving signal line 1 is characterized by being installed in a non-display area of a top, bottom, left, or right of the display device and the Tx driving signal line 2 is characterized by being installed on one side of the display device opposite the Tx driving signal line 1 installed on the other side.

21. The object capacitance detection apparatus of claim 1, wherein:
the width of a CDA constituting the second CDA column is characterized by being narrower than the width of a CDA constituting the first CDA column.

* * * * *